US011747965B2

(12) United States Patent
D'Amore et al.

(10) Patent No.: US 11,747,965 B2
(45) Date of Patent: *Sep. 5, 2023

(54) SYSTEMS AND METHODS OF CREATIVE WORK COLLABORATIVE SYSTEMS

(71) Applicants: Brandon E. D'Amore, Sherman Oaks, CA (US); Joel P. Thatcher, Oroville, WA (US); Gregory A. Piccionelli, Westlake Village, CA (US)

(72) Inventors: Brandon E. D'Amore, Sherman Oaks, CA (US); Joel P. Thatcher, Oroville, WA (US); Gregory A. Piccionelli, Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,294

(22) Filed: Jun. 1, 2021

(65) Prior Publication Data
US 2021/0286490 A1  Sep. 16, 2021

Related U.S. Application Data

(63) Continuation of application No. 16/841,420, filed on Apr. 6, 2020, now Pat. No. 11,023,108, which is a continuation of application No. 15/926,045, filed on Mar. 20, 2018, now Pat. No. 10,613,716, which is a continuation of application No. 14/817,156, filed on Aug. 3, 2015, now Pat. No. 10,007,405, which is a continuation-in-part of application No. 14/004,149, filed as application No. PCT/US2012/072176 on Dec. 28, 2012, now Pat. No. 9,100,444.

(60) Provisional application No. 61/733,801, filed on Dec. 5, 2012, provisional application No. 61/581,585, filed on Dec. 29, 2011.

(51) Int. Cl.
| G06Q 10/10 | (2012.01) |
| G06F 3/0484 | (2022.01) |
| G06Q 10/101 | (2023.01) |
| G06Q 10/06 | (2023.01) |
| H04L 67/104 | (2022.01) |

(52) U.S. Cl.
CPC .......... *G06F 3/0484* (2013.01); *G06Q 10/06* (2013.01); *G06Q 10/101* (2013.01); *H04L 67/104* (2013.01)

(58) Field of Classification Search
CPC ........ G06F 3/484; G06Q 10/16; G06Q 10/06; H04L 67/104
USPC .......................................... 709/204
See application file for complete search history.

(56) References Cited

U.S. PATENT DOCUMENTS

2014/0025667 A1* 1/2014 Lowe .................... G06F 16/954
  707/723

* cited by examiner

*Primary Examiner* — Glenford J Madamba
(74) *Attorney, Agent, or Firm* — Gregory B. Gulliver

(57) ABSTRACT

A collaborative system that securely enables the tracking of changes in an agreement.

21 Claims, 15 Drawing Sheets (Image CWCS 1)

FIG. 4 (Image CWCS 1)

(Image I1)
Inviter Example (Image I2)
Inviter Example (Image WP2)
Working Profile Example (Image WP3)
Working Profile Example (Image CC4b-6b)
Example of Collaborations Choices 4b thru 6b Example of Collaborations
Choices 7 thru 9
(Image CC7-9)

FIG. 13 (Image CC7b-9b) Example of Collaborations Choices 7b thru 9b

FIG. 14 (Image ESP1)

SYSTEMS AND METHODS OF CREATIVE WORK COLLABORATIVE SYSTEMS

CROSS-REFERENCE TO RELATED APPLICATIONS

This application is a continuation of U.S. patent application Ser. No. 16/841,420, filed on Apr. 6, 2020, titled "SYSTEMS AND METHODS OF CREATIVE WORK COLLABORATIVE SYSTEMS," that issued as U.S. Pat. No. 11,023,108, that is a continuation of U.S. patent application Ser. No. 15/296,045 filed on Mar. 20, 2018, titled "SYSTEM AND METHODS OF CREATIVE WORK COLLABORATIVE SYSTEMS," that claims priority to U.S. patent application Ser. No. 14/817,156, filed on Aug. 3, 2015, which is a continuation-in-part of U.S. patent application Ser. No. 14/004,149 filed Sep. 9, 2013, which is incorporated herein by reference in its entirety, and which is a U.S. National Stage of PCT Application No. PCT/US2012/072176, filed Dec. 28, 2012, which is incorporated herein by reference in its entirety and which relates to and claims the benefit of U.S. Provisional Application 61/581,585, filed Dec. 29, 2011 and entitled "CREATIVE WORK COLLABORATIVE SYSTEM", and U.S. Provisional Application 61/733,801, filed Dec. 5, 2012, and titled "CREATIVE WORK COLLABORATIVE SYSTEM", the entirety of each of the above applications is hereby incorporated by reference and priority claim is made. This application is also a continuation-in-part of U.S. patent application Ser. No. 14/718,003 filed May 20, 2015, which is a divisional application of U.S. patent application Ser. No. 14/004,149 filed Sep. 9, 2013, which is incorporated herein by reference in its entirety, and which is a U.S. National Stage of PCT Application No. PCT/US2012/072176, filed Dec. 28, 2012, which is incorporated herein by reference in its entirety and which relates to and claims the benefit of U.S. Provisional Application 61/581,585, filed Dec. 29, 2011 and entitled "CREATIVE WORK COLLABORATIVE SYSTEM", and U.S. Provisional Application 61/733,801, filed Dec. 5, 2012, and titled "CREATIVE WORK COLLABORATIVE SYSTEM", the entirety of each of the above applications is hereby incorporated by reference and priority claim is made. This application is also a continuation-in-part of U.S. patent application Ser. No. 14/719,300 filed May 21, 2015, which is a continuation-in-part of U.S. patent application Ser. No. 14/004,149 filed Sep. 9, 2013, which is incorporated herein by reference in its entirety, and which is a U.S. National Stage of PCT Application No. PCT/US2012/072176, filed Dec. 28, 2012, which is incorporated herein by reference in its entirety and which relates to and claims the benefit of U.S. Provisional Application 61/581,585, filed Dec. 29, 2011 and entitled "CREATIVE WORK COLLABORATIVE SYSTEM", and U.S. Provisional Application 61/733,801, filed Dec. 5, 2012 and titled "CREATIVE WORK COLLABORATIVE SYSTEM", the entirety of each of the above applications is hereby incorporated by reference and priority claim made.

TECHNICAL FIELD

The present invention relates generally to tracking agreements and more particularly with tracking and securing electronic agreements in a network.

SUMMARY

Aspects of the systems, methods, tangible, computer-readable storage media and apparatuses for tracking collaboration are described herein.

One aspect of the present application is a method for tracking collaboration. The method includes providing, using a processor, an environment for collaboration between users; and tracking, using the processor, information regarding the collaboration; such that the tracked information includes rights information regarding rights of the collaborating users.

Some further embodiments of the method include storing, in a non-transient, computer-readable storage medium, the rights information. According to some still further embodiments, storing the rights information includes at least one of an assignment of rights document, a use agreement, a creative contribution authorization, an investment agreement, a financing agreement, a crowdfunding agreement, or a contribution credit.

Some further embodiments of the method include determining compensation for at least one user based on the rights information. Some further embodiments include storing, in a non-transient, computer-readable storage medium, at least one of a working draft, derivative work related to the collaboration, or accounting data. Some further embodiments include providing access to the tracked information to at least one user who did not participate in the collaboration. Some further embodiments include limiting a contribution made by a user based on one or more collaboration criteria.

Some further embodiments of the method include: receiving, using the processor, a creative work; and storing, in a non-transient, computer-readable storage medium, the creative work.

Some further embodiments of the method include: storing, in a non-transient, computer-readable storage medium, initial content; and storing, in the storage medium, additional content, such that the additional content builds on the initial content. In some still further embodiments, the initial content includes at least one of audio work, a video work, an audiovisual work, a written work, a computer game, software, a photographic work, an artistic image, a log, a synthespian work, a virtual product, a live-work, a trademark, an invention, or a business or company formation.

Some further embodiments of the method include: storing, in a non-transient, computer-readable storage medium, initial content; and closing the collaboration so that additional content will not be stored with the initial content.

Some further embodiments of the method include: receiving, by the processor, from each of at least two user devices that are in close proximity to each other, a live musical work.

Another aspect of the present invention is a computer system for tracking collaboration. The computer system includes: memory hardware storing program instructions, and one or more processors in data communication with the memory hardware and configured to execute the program instructions, and upon execution the program instructions cause the one or more processors to perform operations. In various embodiments, the operations may include the steps of an embodiment of the method described above.

Yet another aspect of the present application is a tangible computer-readable storage medium for tracking collaboration. The tangible computer-readable storage medium has instructions encoded thereon. The instructions, when processed by a processing circuit, perform method steps. In various embodiments, the method steps may include the steps of an embodiment of the method described above.

Still, yet another aspect of the present application is an apparatus for tracking collaboration. This includes a processor configured to execute instructions for the performance of method steps. In various embodiments, the method steps may include the steps of an embodiment of the method described above.

Other devices, apparatus, systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

The systems, methods, and tangible, computer-readable storage medium of the present invention provide a way of tracking collaboration. Nearly ubiquitous broadband Internet access currently provides extraordinary opportunities to assist in the initiation and effectuation or collaborative efforts by a plurality of persons to create collaborative works such as music, video, text, software, inventions, businesses, companies, etc. The existing process of online content creation can be characterized as a "free for all" in which participants can take, repurpose, combine, and otherwise use another's online intellectual property without permission, enforceable terms of use, or rights ownership tracking. As a result, copyright infringement and other violations of intellectual property rights have become rampant. Various embodiments of the present invention solve this problem by providing a content-centric (as opposed to author-centric) system, method, or computer-readable storage medium, referred to herein as Creative Works Collaborative System ("CWCS"), to initiate and effectuate the creation of collaborative works and to authorize and track their use and rights related to the collaborative works.

The present invention is useful in a variety of scenarios. For example, some embodiments would be useful for collaborating on a song, software, a design for a building, or any other creative, logical, or any other type of collaborative situation. In various embodiments, the participation in the collaboration is tracked so that those who submitted ideas can be rewarded with rights, such as a right to be compensated for their idea(s). This can encourage a stranger to collaborate with other stranger(s) because their ideas will be rewarded.

Various embodiments of methods of the present invention are envisioned to be carried out on a computer system, which includes one or more integrated circuits or other processors. Various embodiments of such systems include programmable or special-purpose devices. Some embodiments of the system include one or more memory devices. Various embodiments include persistent memory, non-persistent, or a combination of persistent and non-persistent memory. Some embodiments include dynamic or static random access memories, flash memories, electronically erasable programmable memories, or the like. Some embodiments include memory that has instructions embedded therein, such that if executed by a programmable device, the instructions will carry out methods as described herein to form systems and devices having functions as described herein.

Figure 1:
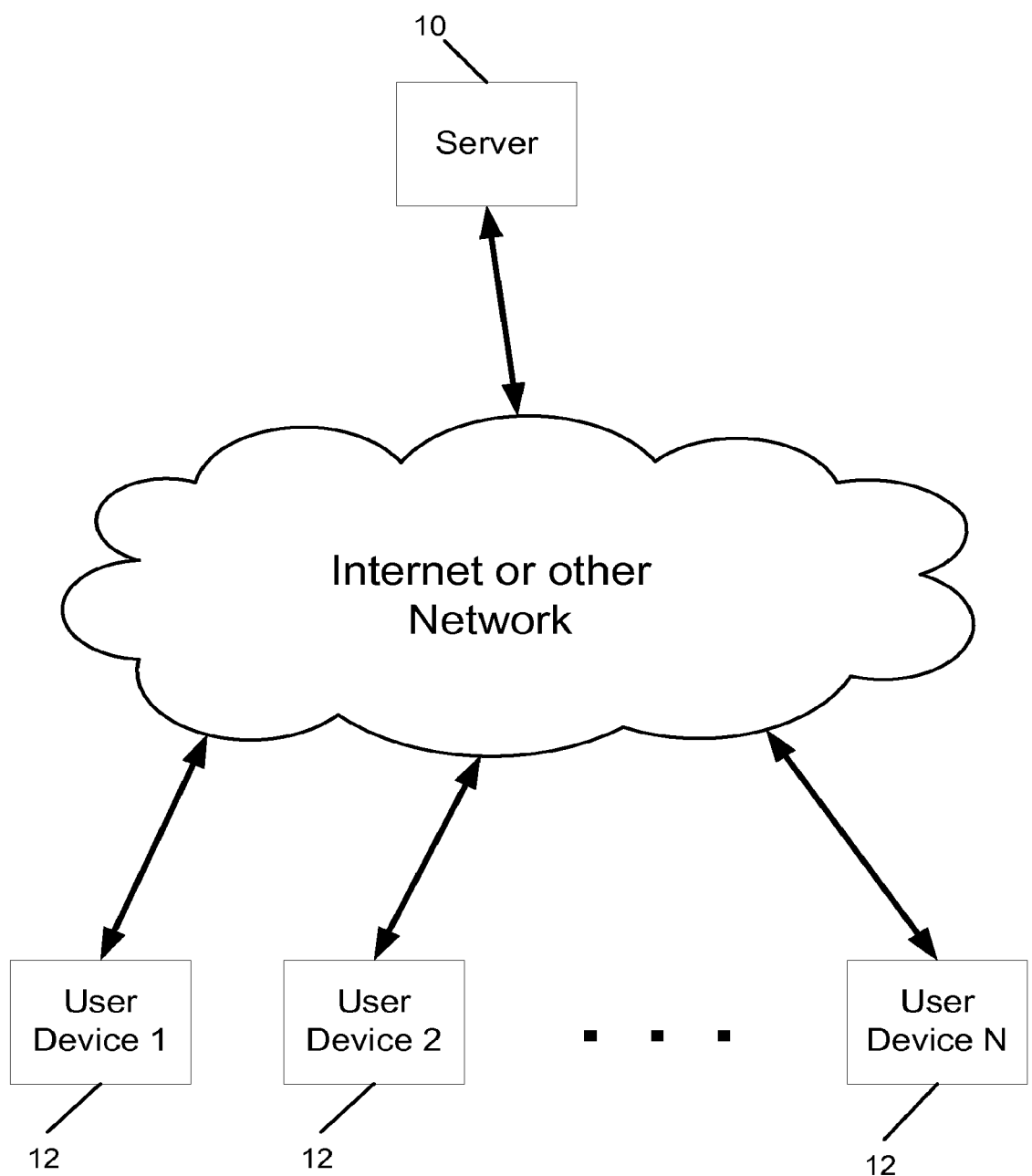
FIG. 1 is a schematic diagram of a system, according to an exemplary embodiment.

In FIG. 1 a system is illustrated according to some embodiments of the present invention. As shown in FIG. 1, an exemplary networked system for implementing process(es) according to embodiments of the present invention may include, but is not limited to, a general-purpose computing device 10 that interacts with users through a network, such as, but not limited to, the Internet. In various embodiments, one or more computing devices 10 may be the CWCS or may host the CWCS. The computing device 10 may be a server 10 that communicates over a network with user devices 12, which include, but are not limited to, general-purpose computers, special-purpose computers, mainframes, gaming devices, tablet computers, smartphones, PDAs, audio players, audio editors, text readers, text editors, video players, video editors, image/graphic readers, image/graphic editors, a processor-based device, and the like. User devices 12 may communicate with a server 10 through a web site or another type of software interface. The user devices 12 may be mobile devices and the web site may be a mobile web site, intended to be accessed through mobile devices. The user devices 12 may communicate with a server 10 through one or more applications including computer-executable instructions. Alternative embodiments may not involve a network at all, and may instead be implemented on a standalone device 10 used by the user(s). In some alternate embodiments, user devices 12 communicate with each other in a peer-to-peer manner, without requiring a server 10.

The server 10 may be implemented as a network of computer processors. In some implementations, the server may be multiple servers, mainframe computers, networked computers, a processor-based device, or a similar type of system or device. In some implementations, the server 10 may be a server farm or data center. The server 10 may receive connections through a load-balancing server or servers. In some implementations, a task may be divided among multiple servers 10 that are working together cooperatively.

Figure 2:
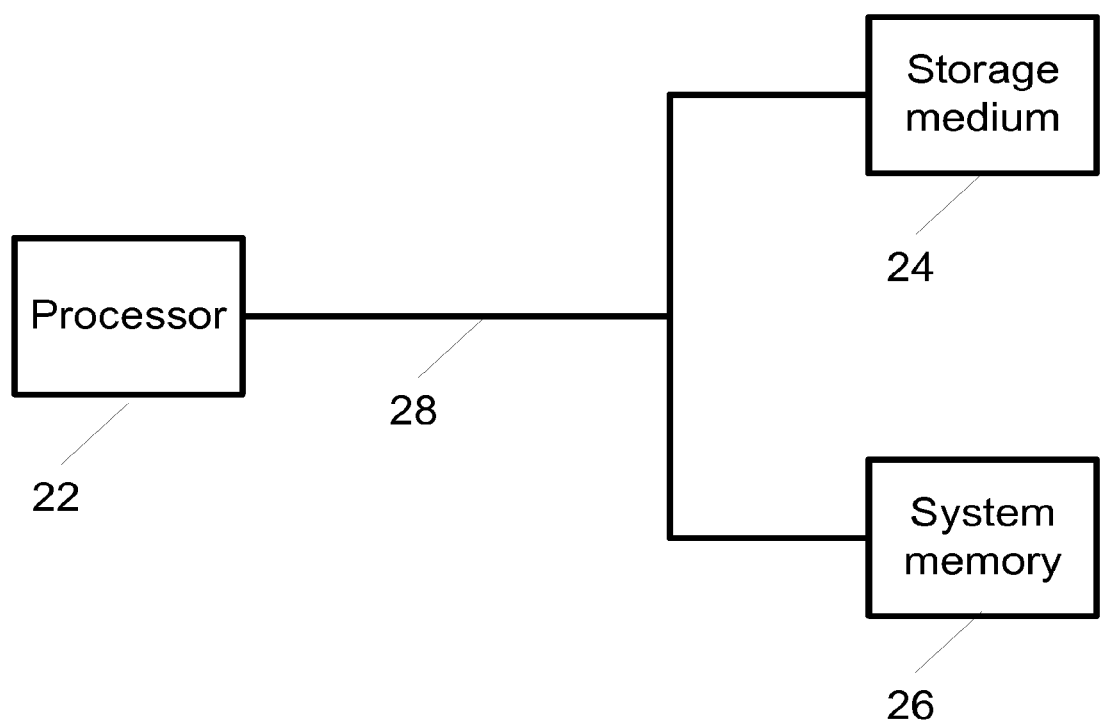
FIG. 2 illustrates a computer system for implementing a method of providing secure access to information, according to an exemplary embodiment.

Turning to FIG. 2, a system is illustrated in accordance with an exemplary embodiment of the present invention. As shown in FIG. 2, an exemplary system for implementing the method(s) discussed includes (but is not limited to) a general-purpose computing device in the form of a conventional computer, including a processing unit 22 or processor, a system memory 26, and a system bus 28 that couples various system components including the system memory 26 to the processing unit 22. The system memory 26 may include one or more suitable memory devices such as, but not limited to, RAM. The computer may include a storage medium 24, such as but not limited to, a solid-state storage device and/or a magnetic hard disk drive ("HDD") for reading from and writing to a magnetic hard disk, a magnetic disk drive for reading from or writing to a removable magnetic disk, and an optical disk drive for reading from or writing to removable optical disk such as a CD-RW or other optical media, flash memory, etc. A storage medium 24 may be external to the computer, such as external drive(s), external server(s) including database(s), or the like. The drives and their associated computer-readable media may provide non-transient, non-volatile storage of computer-executable instructions, data structures, program modules, and other data for the computer to function in the manner described herein. Various embodiments employing software and/or Web implementations are accomplished with standard programming techniques.

According to various embodiments, computer-executable instructions may encode a process of securely sharing access to information. The instructions may be executable as a standalone, computer-executable program, as multiple programs, may be executable as a script that is executable by another program, or the like.

Figure 3:
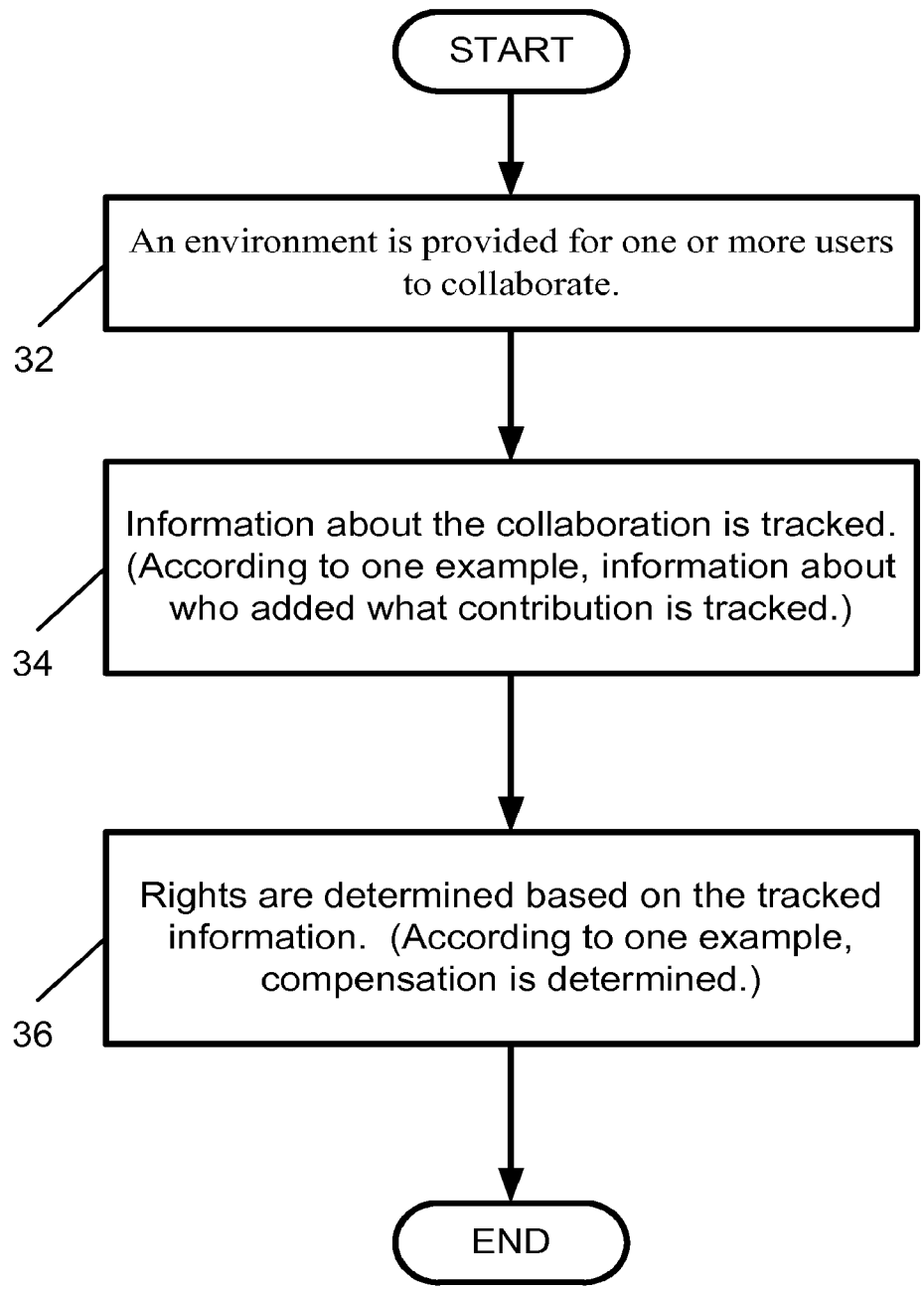
FIG. 3 is a flowchart of a method according to an exemplary embodiment, such that user collaboration is tracked and rights are determined based on the tracked collaboration.

In FIG. 3, a method of tracking collaboration according to various embodiments is implemented by a computer system (see FIG. 2) according to a process depicted in FIG. 3. A processor 22 executes instructions that instruct that information be saved to a storage medium 24 (see FIG. 2).

In step 32, the computer system provides an environment, using a processor 22, for one or more users to collaborate. In some embodiments, the environment is configured so that multiple users can collaborate. In some embodiments, the environment is configured so that a single user collaborates. For example, according to an exemplary embodiment, the single user can add to or subtract from an existing work(s) or create a new work(s). In such cases, the term "collaboration" as used herein includes the situation that the single user is "collaborating."

A "user", as used herein, in some embodiments, is a single user or a group of users. A "user," in some embodiments, is a human user, a machine, a virtual machine, or a combination of any number of those. In various embodiments, a user means a user of the system of FIG. 1. In various embodiments, a user is one or more persons, groups, entities, communities, CWCS Communities, networks, machines and/or user devices 12, businesses, companies, or other entities, enterprise or endeavors including or otherwise involving (a) a plurality of persons and/or computers or other devices (such as artificial intelligence devices), (b) one or more communities or networks. A "Member" as used herein is a person or entity that is a member of or otherwise belongs to the CWCS Community, an authorized user of the CWCS, and/or an authorized user of one or more CWCS Software Plug-ins. In some embodiments, the terms "Member", "User," "user," and "party" are synonymous.

In some embodiments, a "CWCS Community" is a social network that uses the CWCS to enable collaborative efforts of all kinds. In some embodiments, the CWCS uses, communicates with, links to, or otherwise supports, a plurality of CWCS Communities. A CWCS Community, in some embodiments, includes (i) all of the members of CWCS, (ii) all such members plus visitors to the CWCS, (iii) a subset of users of the CWCS, such as venders of content available at or through CWCS, (iv) licensors interested in licensing content via the CWCS and/or from Members thereof, (v) persons associated with websites affiliated with the CWCS, or (vi) any combination of all or part of the foregoing.

The term "person" or "persons" as used herein, shall mean human beings and, where appropriate, can also mean computers and the like, cyborgs, any machine or device using, incorporating or displaying, artificial intelligence, or the like, and/or any combination of the foregoing capable of engaging in any kind of collaborative effort, alone or with one or more other persons, to create, in whole or in part, one or more Collaborative Works of any kind. In some embodiments, the environment is an online environment. For example, an online environment, in some embodiments, includes that a user device 12 accesses a server 10 or another user device 12 over a network. In some embodiments, the environment is an offline environment accessible through a user device 12. For example, an offline environment, in some embodiments, includes a copy of a work on a user device 12 that can be updated by a server 10 upon or after the user device 12 becomes connected to the server 10.

In some embodiments, the environment provides for direct collaboration between users. According to some further embodiments, users interact with each other through the environments in real-time, through messaging that is not necessarily received in real-time or the like. In alternative embodiments, the environment provides for indirect collaboration. For example, in some embodiments, work is provided by someone who is not a user of the environment.

In some embodiments, the collaboration regards to content that includes any type of updatable content. In some preferred embodiments, work includes one or more digital files. According to some exemplary embodiments, works include digital recordings or the like. In some embodiments, a work includes creative content, such as music, audio works, video works, audiovisual works, game works, photographs, textual works, graphical works, software, live works, inventions, designs, software, computer applications, trademarks, businesses, companies, and other endeavors amenable to a collaborative effort by one or a plurality of persons, entities, communities, networks, computers and/or other devices, including without limitation, robots and AI devices. A "Collaborative Work" as used herein is a non-transient manifestation of collaborative creative effort by one or more individuals and one or more other individuals and/or computers or other devices programmed to collaborate with one or more persons, computers or other devices. For example, in some preferred embodiments, a "Collaborative Work" results from a Source Work. The terms "Collaborative Work," "Collaboration Work," "work," and "Creative Work" are used herein interchangeably and have the same meaning.

"Source Work" as used herein is an original or particular version of a work that is the starting basis for the collaboration. In some embodiments, a Source Work is a song, a sound recording or other audio work, a video work, a written work, an artistic image, a photograph or other visual work, a textual work, a design, a logo, a trademark, software, an invention, a computer application, a synthespian work, a virtual product, such as a virtual version of a real object, such as garments for an avatar, a live work, a business or company formation, or any other type of project, work, matter, and/or set of rights associated therewith, of any kind, directly or indirectly amenable to creation, synthesis, modification, improvement, exploitation or derivation by, through or in association with, collaborative effort by a user, amenable to creation, or modification by, collaborative effort that is made available for collaboration via the CWCS; or any other kind of work or project made available to users of the CWCS for collaboration In some embodiments a Collaborative Work is the Source Work for the creation of one or more subsequent or other Collaborative Works therefrom.

According to various embodiments, one or more works are stored non-transiently, in a storage medium 24. In various further embodiments, updates to the work(s) are stored. In still further various embodiments, information about the user who provided the update is stored.

In step 34, the computer system tracks information about the collaboration. According to various embodiments, tracked information is stored, non-transiently, in a storage medium 24.

In some preferred embodiments, the CWCS tracks the legacy and various versions and other incarnations of a Source Work, for example, as it develops through the collaboration process to generate one or more Collaboration Works. In some preferred embodiments, one or more individuals (users, members, etc.) or Groups collaborate and share creative works to create one or more derivative works from the Source Work, and/or derivative works of such derivative works, and so on, etc. The Source Work and all derivative works thereof collaboratively created by or through the CWCS, or imported into the CWCS, or updated with the Master Profile and the CWCS File through the CWCS Software Plug-in, including without limitation, various Collaboration Works, reside in, or are otherwise associated, linked or in communication with, the CWCS. In some embodiments of the CWCS, an authorized user, member, group, group member, etc., can locate legal documents associated with the Source Work and/or Collaboration Works associated therewith. In some exemplary embodiments, information about which user added what contribution is tracked.

In various embodiments, the tracked information includes one or more documents. In some embodiments, a document describes and/or evinces rights. In some embodiments, such documents include an assignment of rights document, other rights and use agreements pertaining to the Source Work and associated Collaboration Works, creative contribution authorizations, investment agreements, crowdfunding agreements, descriptive terms, contribution credits, work drafts, other creations and derivations of the Source Work and/or Collaboration Works, accounting data and other information pertaining to the Source Work and/or related Collaboration Works. In some embodiments, documents and other data regarding rights, licenses, use agreements, and financing agreements associated with the Source Work, Collaboration Works, and recordings thereof are associated with the Source Work and Source Work-related Collaboration Work(s) (if any).

Some further embodiments include storing as the collaboration Work, in a non-transient, computer-readable storage medium, the rights information. According to some still further embodiments, storing the rights information includes, at least one of: an assignment of rights document, a use agreement, a creative contribution authorization, an investment agreement, a financing agreement, a crowd funding agreement, or a contribution credit. The collaborative work of an assignment of rights document, a use agreement, a creative contribution authorization, an investment agreement, a financing agreement, a crowd funding agreement, or a contribution credit and are examples of documents that are commonly referred to as contracts.

In step 36, the computer system determines rights based on the tracked information. According to various embodiments, information regarding the determined rights is stored, non-transiently, in a storage medium 24. In some exemplary embodiments, compensation is determined. For example, a right to compensation is determined. In some embodiments, compensation information is determined regarding all or a portion of the users who collaborated on the work.

In various embodiments, rights information is tracked related to the type, nature, or extent of one or more users' individual contribution(s).

In some embodiments, all or substantially all derivations of the Source Work and other incarnations of related works created through the use of, or imported into the CWCS are housed in a profile ("Master Profile"). According to various embodiments, a Master Profile is stored in a database, file, or other similar data storage entity capable of being stored in non-transient memory. In various embodiments, a Master Profile is stored in a storage medium 24. In various embodiments, a Master Profile is accessible via a user interface provided by the CWCS.

Figure 4:
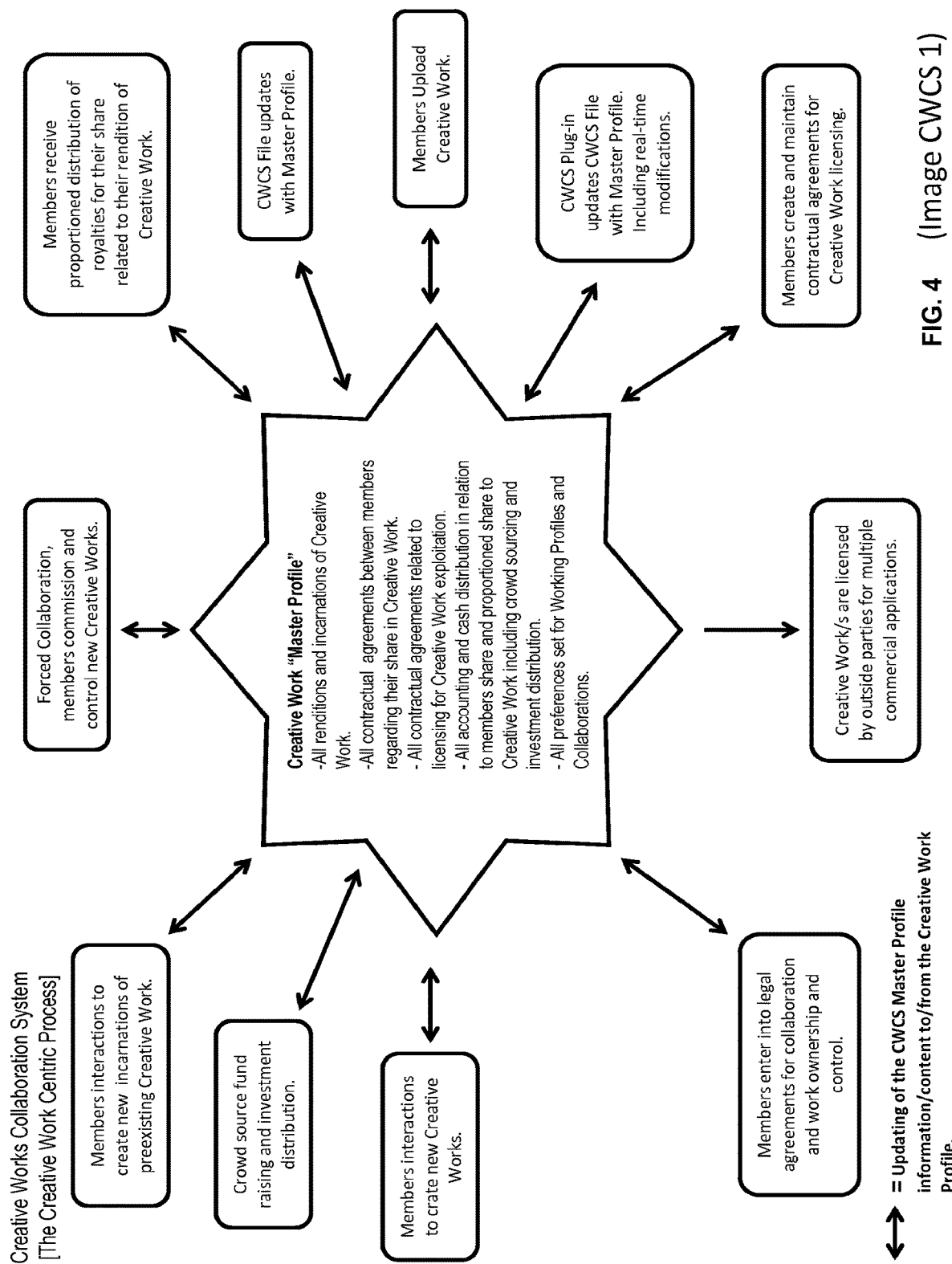
FIG. 4 is a diagram according to an exemplary embodiment, illustrating how interactions with users affect a Master Profile.

Turning to FIG. 4 an illustration of a CWCS according to an embodiment, which, in various embodiments, maintains and/or stores in a storage medium 24 a Master Profile that is affected by Member interaction is depicted in accordance with an example implementation.

In some preferred embodiments, the Master Profile provides to a user various definitional selections to allow works, such as a musical work, or a software collaboration, to have descriptive information associated therewith. According to some embodiments, such definitional selections enable the user to associate, for example regarding a musical work, preselected terms pertaining to the genre, style, tempo, beats-per-minute, etc. In some embodiments, other descriptive information can be associated with the work, including but not limited to, for example concerning a musical Source Work, instrumentation data, music notation, and other information. In some preferred embodiments, a Master Profile work, such as a song or a video, for example, can be auditioned and critiqued.

Some embodiments also include a display of information regarding whether a work or project (e.g., a song) is "Open to Collaboration" or "Closed to Collaboration." In some embodiments, "Open to Collaboration" means a Source Work or Collaboration Work, such as a song, for example, that is open to Invitees for collaboration. In some embodiments, a Source Work or Collaboration Work is Open to Collaboration only to a specified subset of Users, such as, for example, to specifically selected Users, Badged Users, Users with a specified quality rating, or Users for whom the Collaborative Work remains Open to Collaboration by the terms of an associated agreement, etc.

"Closed to Collaboration" means a Source Work or previously created Collaborative Work, such as a song, that is not available to Users to create derivative works from. For example, in some embodiments, songs that are "Closed to Collaboration" are not available to Invitees to manipulate into new incarnations or versions of the song. According to some preferred embodiments, works that are "Closed to Collaboration" are closed by a Content Controller (or in some preferred embodiments, an operator of the CWCS) from any future changes, or from any changes until the Content Controller (or an operator of the CWCS) authorizes or enables such changes to be made. In some embodiments, generally, when a Collaboration is Closed to Collaboration, the Collaboration is not open to any User for Collaboration. However, in some embodiments, a Collaboration is Closed to Collaboration in general but remains Open To Collaboration to one or more Users. In some such embodiments, the "Closed to Collaboration" status is overridden by a setting an option in the Preferences in the Working Profile or by an associated agreement that overrides the Closed to Collaboration status regarding the Collaborative Work concerning certain specified Users, such as, for example, specifically selected Users, Badged Users, Users with a specified quality rating, or Users for whom the Collaborative Work remains Open to Collaboration by the terms of an associated agreement, etc.

In some embodiments, a "Working Profile" is an online interface that is created by, managed by, maintained by, and accessible through the CWCS for Content Controllers and Content Participants who wish to Collaborate on a Source Work to create a new or modified version, incarnation, rendition, etc., of the Source Work. In some embodiments, a Working Profile allows for specific collaboration preferences to be set, such as, but not limited to: time limit to collaboration duration, use of an online CWCS Studio, using a personal offline studio, selecting the type of studio to be used (audio, video, graphic, literary, coding, photo, etc.), ownership of new Collaborative Work, royalty distribution and/or revenue sharing arrangement(s), regarding revenues generated by the exploitation of the resultant, or authorized resultant, Collaborative Work {e.g., as such are specified by the Content Controller for the new collaboration), financing and capitalization data, crowdsourcing opportunities, Crowd Funding opportunities, payment requirements (e.g., "pay-to-play" requirements), Qualification Rating requirements, contribution limitations, whether one or more CWCS Software Plug-ins will be used, and what specifications of such one or more CWCS Software Plug-Ins will be, etc. In some embodiments, messages can be posted, media files can be uploaded and downloaded, and media files can be edited online in association with the Working Profile.

In some preferred embodiments, a Working Profile cannot be created unless the Working Profile Preferences are set and an agreement is digitally signed or otherwise executed by all appropriate parties and such agreement is stored in the CWCS (e.g., in some embodiments, in or in association with the Working Profile itself). In some preferred embodiments, hard copy documents are executed, scanned, and digitally provided to the Master Profile.

In some preferred embodiments, once a Working Profile is closed for a specific Collaborative Work or other Creative Work it cannot be opened again unless a new agreement is created and signed (e.g., via an online authentication and/or execution mechanism). In some preferred embodiments, once a Working Profile is opened, the Working Profile Preferences for the Working Profile cannot be changed without a new agreement being created and signed by the Content Controller and Content Participants. In some embodiments, Working Profiles Preferences cannot be changed once a Working Profile is opened without the execution of a new agreement for any changes to be made. The CWCS Software Plug-in will automatically update nod post changes to the Working Profile if the Working Profile Preferences indicate that one or more Participants are using an offline studio and/or one or more CWCS Software Plug-ins.

According to various embodiments, a "Content Participant" is a user, entity, or user device 12 to which the CWCS has relayed a request to collaborate on one or more specific Creative Works. In various embodiments, the Content Participant is not the Content Controller for the Source Work or for the specific Creative Work the Content Participant is asked to collaborate on.

In some embodiments, a "Qualification Rating" is a rating associated with a user that is appurtenant to the user's collaboration talents, abilities, and/or previous collaboration experience that is provided to other users to assist such other users to evaluate the potential collaboration talents, etc. of the user. In some embodiments, the Qualification Rating is stored by the CWCS in non-transient memory 24. In some preferred embodiments, the qualification rating is awarded by the CWCS through a badging process where the Badge acts as a seal of approval, reflecting that the qualifications and accomplishments that have been certified.

In some embodiments, a "Badge" is a marker that is embedded in a profile or creative work reflecting that all levels of status and/or authentication have been met. In some embodiments, a Badge reflects a quality rating. In various embodiments, "badging" is the process of assigning a Badge to a user, entity, or user device 12.

In some embodiments, work in a Master Profile can be Released or Unreleased by the CWCS. According to various embodiments, "Released" means a Source Work or Collaboration Work made from a Source Work that a CWCS provides so that it is available for auditioning, viewing, experiencing, or the like, by the entire CWCS community. In some preferred embodiments, a Released work is a work that is available for auditioning by a designated subset of the CWCS community.

In various embodiments, "Unreleased" means a Source Work that is unavailable for auditioning or viewing by the entire CWCS Community (except by authorized users). In some embodiments, a Source Work is "Unreleased" if the CWCS makes it unavailable for auditioning/viewing by a preselected or otherwise pre-specified subset of one or more of the CWCS Communities. In some preferred embodiments, an Unreleased Creative Work can be provided by a CWCS to a user device 12 for auditioning/viewing if it is made available privately by the Content Controller for Collaboration.

In some embodiments, a "Content Controller" is a user, entity, or user device 12 that has the right to control specified aspects or features of the collaboration process effectuated via the CWCS or the licensed software of the CWCS. In some embodiments, for example, the Content Controller controls all the Working Profile Preferences for subject Collaborations and/or Source Works for which the person or entity functions as the Content Controller. In some embodiments, the Content Controller has the ultimate authority and ability to accept or reject changes to Working Profile preferences that have been submitted, transmitted, proposed, or otherwise provided by one or more other members. In some embodiments, the CWCS provides an option for the Content Controller to control the Master Profile Preferences and the Working Profile Preferences. For example, in some preferred embodiments, a Content Controller has the right to authorize whether a Source Work or Collaboration Work is Open to Collaboration or Closed to Collaboration. In some embodiments, the Content Controller controls all decision making regarding the Creative Work, including, but not limited to, decision making, and triggered implementation (via the CWCS) of Working Profile preferences set for Collaboration, making a Work Open or Closed to Collaboration making the results of a Collaboration subject to one or more agreements, such as a licensing agreement, crowdfunding agreements, exploitation agreements, revenue sharing agreements, or other types of contracts/agreements.

In some preferred embodiments, the Master Profile includes parts of a work-authorized and accessible for collaboration. In some preferred embodiments, for example, regarding multi-track recordings of music and other sound recordings, one or more tracks are made available within the Master Profile for modification by an authorized Invitee. In some preferred embodiments, an Invitee is authorized to add one or more additional tracks to a recording, for example, to an existing multi-track recording.

In some preferred embodiments, one or more Collaboration Agreements pertaining to the works included in the Master Profile are received by and maintained in the Master Profile. According to some embodiments, a "Collaboration Agreement" is an agreement setting forth the terms of authorized collaboration regarding the creation of one or more Collaboration Works. In some preferred embodiments, the Collaboration Agreement includes terms limiting the amount of time a party has to provide the party's collaborative efforts (for example, a time limit to accept terms in an agreement such as a contract). In some preferred embodiments, a Collaboration Agreement also includes terms regarding authorized and/or agreed-upon the subject Collaboration Work(s), such as how and where a musical work will be published and how remuneration will be paid to parties who have collaborated in the creation of the subject Collaboration Work. In some preferred embodiments, the parties to the Collaboration Agreement execute the Collaboration Agreement document digitally. In some preferred embodiments, the execution of the Collaboration Agreement is authenticated via means such as those used by e-Original.

In some preferred embodiments, the "Collaboration Agreement" is modified by one or more parties, such as through a CWCS receiving information from the user device(s) 12, and regenerated for execution. In some preferred embodiments, specified terms in a digital Collaboration Agreement are separately agreed upon by the parties to the Collaboration Agreement. For example, according to some embodiments, this is accomplished through online "click to agree" contractual agreement. Agreeing to some terms, but not others, in some embodiments, causes the CWCS system to allow or not allow to operate the associated certain specified functions provided in or through the CWCS system.

In some preferred embodiments, Collaboration Agreements are accessed as authorized by an authorizing party (e.g., in some preferred embodiments, the work's owner, it's Content Controller, the CWCS Operator and/or a party to the subject agreement).

In some preferred embodiments, information regarding the exploitation of Collaborative Works is provided to and maintained in the Master Profile. In some preferred embodiments, such recordation of exploitation data provides to the contributors accounting and statistical data regarding the exploitation of Collaboration Works that they contributed to. In some preferred embodiments, accounting information, for example, information including but not limited to, banking account numbers and accounts receivable and accounts payable, are included in the Master Profile. In some preferred embodiments, access to such data is limited to some collaborators but not others based on rights or interests specified in one or more Collaboration Agreements. In some preferred embodiments, the Master Profile includes agreements and/or other data regarding financing for or investment in a collaboration project using the CWCS, a Collaborative Work, and/or company or business associated therewith, including, without limitation, requirements for, and/or status of, Crowd Financing or other types of Crowd Funding for the collaboration project, Collaborative Work and/or associated company and/or business. In some embodiments, Working Profiles and legacy information associated to a Creative Work and/or Collaboration Working Profile are included in their respective Master Profile.

In various embodiments, "Crowd Financing" means any form of raising capital, such as for a project or enterprise, by appealing to a plurality of persons for contribution or investment. In various embodiments, this includes appeal through online communication, such as via the use of the CWCS. The terms "Crowd Funding" and "Crowd Source Financing" are used herein interchangeably, have the same meaning, and shall include the definitions for gifting-type crowdfunding, investment-type crowdfunding, and crowdfunding definitions that are used in or in association with the Entrepreneur Access To Capital Act (HR2930).

In some embodiments, a "CWCS File" is part of the Master Profile. A CWCS File is a file that is readable by a computer or device 10, 12. In some embodiments, a CWCS File can be read and/or manipulated by devices such as audio players, audio editors, text readers, text editors, video players, video editors, image/graphic readers and image/graphic editors, etc.

In some embodiments, files can only be authorized by the CWCS or by a CWCS software Plug-in. In some embodiments, the CWCS File will include all information in the Master Profile. In some preferred embodiments, the CWCS File will include some or parts of the information in the Master Profile. In some embodiments, this is the case when a Collaborative Work only includes the information that pertains to the specific Collaboration and not other Collaborative efforts associated with the Master Profile set by the content controller. In some embodiments, the CWCS File has a date stamp that can be verified, validated, and/or updated with the CWCS system to maintain up-to-date information from the Master Profile.

In various embodiments, a CWCS Software Plug-in is software that can function as a stand-alone Offline Studio or as a plug-in that allows a computer and/or computer software programs to read and play and/or edit a CWCS File. In some preferred embodiments, the CWCS Software Plug-in will allow the user to manipulate the CWCS File as, or in association with, an Offline Studio. In some preferred embodiments, the CWCS Software Plug-in will allow the user to manipulate the CWCS File with other stand-alone computer software programs. In some preferred embodiments, the CWCS Software Plug-in will not allow the user to manipulate the CWCS File or aspects of the file. Some examples of software programs that the CWCS Software Plug-in works with are, according to some embodiments, software associated with the control and/or other use of audio players, audio editors, synthesizers, sound generating devices, text readers, text editors, video players, video editors, image readers, data readers, data editors and image editors.

In some embodiments, a CWCS Software Plug-in renders and authorizes CWCS Files that are automatically updated with the CWCS Master Profile. In some preferred embodiments, the CWCS Software Plug-in will update any changes or renditions made, in real-time, to a Working Profile that is associated with a collaborative Work. In some such embodiments, changes and renditions are automatically posted as to progress in the Working Profile.

In some embodiments, CWCS Software Plug-ins can be programmed and configured to work with computers and/or machines that utilize artificial intelligence ("AI") programming. In some such embodiments, the CWCS allows such configured computers to communicate and collaborate through the CWCS. For example, in some embodiments involving AI configured computers, the CWCS Software Plug-in in conjunction with the CWCS and CWCS File will interpret or translate and allow or disallow specific functionality and sharing and/or collaboration between two or more AI entities. In some preferred embodiments, the functionality and sharing between two or more AI entities is dependent on the Master Profile Preferences and Working Profile Preferences set for a specific Master Profile and CWCS File. In some preferred embodiments, the functionality and sharing between two or more AI entities is not dependent on the Master Profile Preferences and Working Profile Preferences set for a specific Master Profile and CWCS File. In some preferred embodiments, AI collaboration profiles are set manually. In some embodiments, AI collaborative profiles are set automatically. In some embodiments, these preferences allow or disallow actions and modifications taken by AI participants in an AI collaboration. In some preferred embodiments, the CWCS Software Plug-in will request and take direct control of a computer, machine, or AI to facilitate, moderate, communicate, regulate, and/or track changes to a collaborative effort by and for one or more computer, machine, or AI.

In various embodiments, a "Studio" is a physical or virtual device, functionality or facility for sound recording and sound mixing, video work, photograph work, other visual work, textual work, design, logos, trademarks, software, computer application, invention, or other work or project of any kind amenable to collaborative efforts, that provides the means to create, manipulate, modify, and/or otherwise effectuate a Creative Work. In some embodiments, the device, functionality, or facility is (i) physically located in a home, office, or other physical location, (ii) a virtual facility, such as where some or all of the sound recording, sound manipulation, synthesis, editing, etc., is accomplished online, or (iii) a combination of physical and virtual facilities. In some embodiments, the "Studio" includes means to record and process sound information via popular music production programs such as Pro Tools®, Logic®, Cakewalk®, etc. In some embodiments, a Studio is a user device 12 or a server 10.

An "Offline Studio" is a Studio and/or software that allows a collaborator to use features of the CWCS offline. In some embodiments, Offline Studios facilitate manipulation of a Source Work, a Collaborative Work and/or files associated therewith, such as sound recordings, video recordings, text, images, coding, etc. In various embodiments, an Offline Studio is provided substantially offline and not directly by the CWCS through an online means. In some embodiments, one or more Offline Studios that are connected to the Internet still interact with the CWCS. In some embodiments, an Offline Studio is effectuated through a CWCS Software Plug-In. In some embodiments, the data flow between an Offline Studio and the CWCS is effectuated through a user interface that is a part of the CWCS or provided by an operator of the CWCS. In some embodiments, the data flow between an Offline Studio and the CWCS is effectuated through an interface provided in an Offline Studio by a third-party vendor, which in some embodiments is the case if such interface is a part of a third-party program (e.g., Logic®, Pro Tools®, etc.), by a third-party or third-party software.

In some embodiments, an "Online Studio" is a Studio whereby the means by which recordings and other files, associated with one or more Source Works or a Collaborative Works (e.g., sound recordings, video recordings, images, text, code, etc.) are manipulated online or otherwise used through the use of the CWCS, online. In some embodiments, some or all of the features and/or use of the Online Studio is effectuated within, or in digital communication with, the Working Profile. In some embodiments, an Online Studio cannot be accessed by a user unless one or more appropriate online agreements have been entered into by the user.

In some preferred embodiments, if a Member has the appropriate privileges set by the Working Profile, the CWCS File(s) can be modified by members using audio editors, text editors, video editors and image/graphic editors, etc., through the CWCS Software Plug-in. In some preferred embodiments, Members of the CWCS cannot download the CWCS File from a Master Profile unless a Working Profile has been created and the Member has acquired the proper rights to the CWCS File. In some preferred embodiments, the CWCS File can be downloaded by Members for audition/viewing/reading purposes only.

In some embodiments, the CWCS File(s) associated with a Master Profile automatically update information from and to the Master Profile to the CWCS File. In some embodiments, such information is passed to and from databases on a plurality of computers via the Internet or another computer network. For example, in some embodiments, if the Master Profile is changed, all CWCS Files associated with the Master Profile on a plurality of Internet-connected computers are updated. Similarly, in some embodiments, if a CWCS File is changed, through the use of the CWCS (e.g., via the use of a CWCS Software Plug-in), the Master Profile and all other CWCS Files associated with the Master Profile are updated. In some embodiments, this process can be effectuated via a plurality of computers connected via the Internet or another computer network. In some embodiments, a CWCS File is stored in non-transitory memory 24 by the CWCS or by a user device 12.

In some embodiments, if a CWCS File resides on a computer that is not attached to the Internet (or is otherwise not in communication with one or more other networked computers), when and if that file is moved via a portable data storage drive, email, or any other electronic/data file transfer system to a computer that is on the Internet (or other computer networks, as appropriate), data incorporated in, or associated with, that file will "ping" (e.g., signal) the CWCS and update itself or be updated by updating functionality in the CWCS. In some embodiments, if a CWCS File is imported into an audio/video/text editor and/or reader that does not recognize the CWCS File, the user (or a user device 12) is prompted to download the CWCS Software Plug-in, which will then allow the audio players, audio editors, text readers, text editors, video players; video editors, image/graphic readers and image/graphic editors, etc. to read the file. In some preferred embodiments, if a CWCS File is imported into an audio/video/text editor and/or reader that does not recognize the CWCS File, the CWCS Software Plug-in is automatically installed which will then allow the audio players, audio editors, text readers, text editors, video players, video editors, image/graphic readers and image/graphic editors, etc. to read the file.

In some embodiments, the Master Profile and the CWCS File automatically update each other. In some exemplary embodiments, the update is by comparing the data in the Master Profile and the CWCS File and modifying the respective files so they match.

In some preferred embodiments, the CWCS associates with such works a data thread that associates Inviter contribution invitations.

In some preferred embodiments, all of the aforementioned data-thread information is available to Invitees. In some preferred embodiments, only some of the data-thread information is available to Invitees. In some preferred embodiments, Inviters select the kinds of data thread information available to Invitees in the Master Profile. In some preferred embodiments, all of the aforementioned data thread information is available to Inviters. In some preferred embodiments, only some of the data thread information is available to Inviters. In some preferred embodiments, some or all of the data thread information is accessible by Invitees and/or Inviters based on the respective Invitee's and/or Inviter's location, membership status, or criteria or other control set by the Inviter, Content Controller, and/or CWCS Operator.

An "Inviter" is a user, entity, or user device 12 that invites an Invitee to collaboratively create a Collaborative Work using the CWCS. The Inviter controls whether a Source Work or Collaboration Work resulting therefrom is "Open to Collaboration" or "Closed to Collaboration." In some preferred embodiments of the invention, the Inviter is an Owner.

An invitee is a user, entity, or user device 12 that accepts an invitation to collaborate using the CWCS. In some embodiments, invitees do not control the "Open to Collaboration" or "Closed to Collaboration" settings in the CWCS regarding a Source Work or Collaboration Work. In some preferred embodiments, an Owner is an Invitee.

According to various embodiments, an Owner is a user, entity, or user device 12 that owns the rights to upload or otherwise provide to the CWCS a Source Work or Collaborative Work for an audition and/or collaboration. In some embodiments, the Owner changes if the Master Profile Preferences and/or Working Profile Preferences specify such a change of ownership. For example, in some embodiments, ownership is initiated or transferred by or to a crowdfunding entity.

In some preferred embodiments of the invention, the Owner is, concerning a Source Work or a Collaborative Work resulting therefrom, also the Inviter. In some preferred embodiments, however, the Owner is an Invitee. For example, in some embodiments, when an Owner is invited to engage in a collaboration with another party regarding the Owner's work, the Owner is an Invitee. In some embodiments, an Owner can also be invited by another to engage in a collaborative effort to produce a Collaborative Work involving the Owner's work.

Master Profile Preferences are preferences set by the Member who uploads a Creative Work into the CWCS. In some embodiments, the Master Profile Preferences are stored in non-transitory memory 24 by the CWCS. In some embodiments, the Master Profile preferences are rights and restrictions for a creative work. In some embodiments, these preferences include, but are not limited to, indicators of: "Open to Collaboration," "Closed to Collaboration," "Released," "Unreleased," financial data, crowdsourcing opportunities, Crowd Funding opportunities, payment requirements (e.g., pay-to-play", requirements), etc.

In some preferred embodiments, the Member who uploads a creative work sets the Master Profile Preferences. In some preferred embodiments, an operator controlling the CWCS sets the Master Profile Preferences. In some preferred embodiments, Master Profile Preferences can be edited and changed. In some preferred embodiments, the Master Profile Preferences cannot be edited or changed.

In some embodiments, "Working Profile Preferences" mean the CWCS functions that (i) set the search parameter(s) and/or one or more criteria for potential collaborators through Collaborative Matching and (ii) set the restriction(s) and authorization(s) for a new collaborative work. In some embodiments, the aforementioned restrictions and authorizations must be agreed upon and put in a legal document and executed before a Working Profile is opened or created.

In some embodiments, Collaborative Matching is a search algorithm of the CWCS that will use data stored in non-transitory memory 24 of the CWCS and/or in one or more CWCS Communities to calculate and search one or more CWCS Communities, or specified part(s) thereof, to find one or more potential matches for a new collaborative work that is being proposed by a member. In some embodiments, the search algorithm is based on Working Profile Preferences, Personal Profile information, and legacy Portfolio Data, (e.g., past composer and collaborative efforts, used music styles, legal agreements, etc.). In some preferred embodiments, the Collaborative Matching search is not limited to searching data stored in the CWCS and/or the CWCS Community(ies) (or part(s) thereof) only. In some embodiments, such a Collaborative Matching search uses data accessible from one or more databases not including those used by the CWCS or a CWCS Community such as, for example, database(s) accessible via the World Wide Web.

In some embodiments, the Working Profile Preferences include, but are not limited to: time limit to collaboration/collaboration duration, the requirement to using an Online Studio provided by CWCS, the right to use a personal Offline Studio, use of one or more CWCS Software Plug-ins, selection of the type of studio to be used (audio, video, graphic, literary, coding, photo, etc.), ownership rights in and to the new Collaborative Work(s), royalty distribution and/or other financial offers and/or arrangements for exploitation of the resulting Collaborative Work(s) designated assigned by the Content Controller for a new collaboration, making the Collaborative Work project subject to Crowd Funding financing in whole or in part through, determining which users have archive access to the Working Profile, setup of an escrow account and accounting engine, member-specific filtering for terms, creating a new working profile from an old Working Profile, etc.

In some embodiments, the Working Profile Preferences also includes or is associated or linked with a negotiation engine that enables two or more users to negotiate the details associated with the working profile preferences. In some embodiments, the negotiation engine provides functionality through one or more user interfaces.

In some preferred embodiments, the CWCS Operator (a CWCS administrating user) provides to the Content Controller the ability to set, via a user interface to the CWCS, the collaboration rights parameters pertaining to one or more Source Works. In some embodiments, the operator interfaces with the CWCS through a user device 12 or a CWCS server 10.

For example, in some preferred embodiments in which the Source Work is a musical piece, the Content Controller sets collaboration criteria regarding the Source Work to allow Invitee to only add, for example, a guitar part to the Source Work to produce a Collaboration Work. In some preferred embodiments, the CWCS Operator provides to the Content Controller the ability to set, via a user interface to CWCS, one or more remuneration offers and/or other rights limitations regarding the creative contribution(s) to produce a Collaboration Work. For example, the Content Controller could provide through CWCS an offer to Invitees an offer to share revenue generated from the exploitation of the resulting Collaboration Work. For instance, the Content Controller could offer a revenue share of 10% of the monies received by the Content Controller. In other preferred embodiments, the Content Controller could be configured to provide revenue-sharing requirements based on the type of exploitation of resulting Collaborative Works, location of exploitation, duration of exploitation, etc. For example, the Content Controller could offer an Invitee revenue sharing resulting from publishing proceeds only.

Some preferred embodiments enable collaborative contributors, including without limitation, the providers of the Source Works, parties creating derivative works of the Source Works, and parties creating subsequent derivative works thereof, to link back to the Master Profile wherein collaboration requirements and limitations, and exploitation and remuneration details, are accessible, in whole or in part as desired by the Content Controller and/or the CWCS Operator. In some embodiments in which the CWCS File is accessible via the Internet or another wide-area computer network, this link back to the Master Profile is through the CWCS File that automatically updates file information with the Master Profile.

Various embodiments, therefore, provide useful content-centric systems and methods for Content Controllers to initiate, incentivize, nurture, and control collaborative efforts regarding Source Works, such as an offer and Collaboration Works, that includes an agreed on contract. Various embodiments also provide the Content Controller, potential collaborators, and collaborator-users of the CWCS with a fast and efficient means of determining, inter alia, one or more of the following: (i) the criteria for collaboration set by the owner of source content, (ii) the rights associated with the source content, (iii) what the resulting rights profile for content created through the collaboration process will be, (iv) what documents, such as assignment or licensing documents will need to be executed by authorized contributors, (v) the means of exploitation of resulting collaborations that will be authorized by the owner of the source content, (vi) offered remuneration to authorized collaborators; and (vii) other financial information and related documents associated with the content or subject project, including without limitation, crowd financing agreements and related information, such as current status of crowdsourcing capital raised pertaining to the Collaborative Work.

According to various embodiments, "Member Details" include personal information and/or biographical data pertaining to Members. The Members Details, according to some embodiments, also include information pertaining to status and ranking of creative works. The Members Details, in some embodiments, include agreements between the member and the CWCS and/or between Members. In some embodiments, Member Details can be accessed on the Subject Member's page. Member Details, according to some embodiments, are stored by a CWCS in a non-transitory memory 24.

In some preferred embodiments, CWCS provides Members control, via a CWCS interface, which Member Details are accessible via the subject Member's page. In some embodiments, Members can control which of the Member's Member Details are accessible in the CWCS Files associated with a Member.

According to various embodiments, members are grouped into Groups. According to various embodiments, a "Group" is two or more persons, entities, groups, computers, machines, artificial intelligence devices, or any combination of the foregoing that come together to work as a single unit in the CWCS. In some embodiments, a Group belongs to the CWCS community. In various embodiments, a Group need not have any endeavor pertaining to a collaborative effort in order to form. In some embodiments, Groups form to aggregate expertise or capital.

In some embodiments, Groups are governed by formal agreements that are created by the Group Profile Preferences and signed by each group member. In various embodiments, Group membership, responsibilities, capital donations, contracts, and documentation are attached to the Group Profile. In some embodiments, Group ownership and control is dynamic and is controlled by the Group Profile Preferences. In some embodiments, Groups can be controlled by an individual, by a councilor by equally weighted voting.

According to some embodiments, a "Group Profile" is the combination of all information in the Group Details and the Group Portfolio. In some embodiments, all Group membership, responsibilities, capital donations, contracts, and documentation are attached to the Group Profile.

In some embodiments, "Group Details" include personal information and/or biographical data pertaining to the Group. In some embodiments, Group Details includes information pertaining to the status and ranking of creative works. According to some embodiments, the CWCS provides users access to Group Details via a CWCS interface.

In some embodiments, Group Details include agreements between a Group and the CWCS. In some embodiments, Group Details include all agreements between the Group and group members. In some embodiments, Group Details can be accessed on the subject Group's Profile page. In some preferred embodiments, Groups can control which Group Details are accessible via the Groups Profile page. In some preferred embodiments, Groups can control which Group Details are accessible in the CWCS Files associated with Group collaborations/creative works, such as agreements. In some embodiments, Group Details include legacy information, such as past collaborations and/or agreements, etc. In some embodiments, Group Details include group accounting information such as capital assets, investments, dividend payments, etc.

In some embodiments, Group Profile Preferences are preferences that set standards, rules, by-laws or any other functions that define or limit the functions of a specific Group when it operates within the CWCS. In some embodiments, Group Profile Preferences set rules of engagement, interaction, and participation regarding collaborative works associated with the Group. In some embodiments, Group Profile Preferences are not limited to but include: how many members are allowed in a Group, what weight in decision making does each member of the Group hold, will the group have a single leader, will all Group members have the same voting privileges, will all Group member's votes hold the same weight if a Group is led by a chief and if the chief is voted in by a council of members, if royalties/dividends are paid in equal amounts to each Group member if royalties/dividends are paid in amounts determined by the weight of the Group members position in the Group and who in the Group is responsible for looking for creative works to collaborate on, what information a Group member can display on their personal member profile or portfolio about the Group, rules, and guidelines based on investments (e.g. how much a member can invest in a group or how much a Group can invest in a creative work.), etc. In some embodiments, the Group Profile Preferences is associated with a negotiation application that provides an interface enabling two or more Group members to negotiate the details associated with the group profile preferences.

In some embodiments, a "Group Portfolio" is a Group page that includes a list of all the Source Works, such as songs or a software work, for example, that have been uploaded by the Group. In some preferred embodiments, recordings of Source Works can be accessed in the Groups Portfolio. In some preferred embodiments, a Groups Portfolio includes a list of (and in some preferred embodiments, access to) Collaborative Works (such as collaboration songs) that a Group has Collaborated on.

In some preferred embodiments, Content Controllers and other Creators can update legal documents attached to their incarnations of the creative works in, or associated with, the CWCS. In some embodiments, the CWCS is used to market, effectuate and/or facilitate, Crowd Financing or other means of crowdsource capital raising efforts regarding Collaborative Works (such as for a music artist's music project, for a motion picture project, for creation of software for a commercial product, etc.). In some embodiments, one or more capital raising efforts (such as by means of Crowd Funding) are themselves, or otherwise include, one or more Collaborative Works. In some embodiments, the Content Controller makes available for one or more collaborative efforts through the CWCS the ability for CWCS members, other Users, and/or broader CWCS community members, such as visitors, the ability to invest in a project that will exploit one or more Collaborative Works, such as Creative Works.

For instance, according to one embodiment, the CWCS is used to provide a collaborative mechanism to create the Creative Works for a CD project. The CWCS provides the collaborative mechanism to raise the capital required to promote sales of CDs including the Creative Works created via the collaboration functionality of the CWCS.

"Crowd Financing" shall be construed broadly to include all lawful methods of crowd financing, including without limitation, the methods used by Kickstarter™, Indigogo, and the methods that would be subject to the Entrepreneur Access To Capital Act (HR2930).

In some embodiments, the CWCS is used to effectuate the creation of a Collaboration Work by a plurality of persons, entities, computers and/or other devices ("Collaborators") that are remote from one another and connected via the Internet and/or one or more other computer networks. In some embodiments, such collaboration takes place if one or more Collaborators are in the same or materially the same physical location. In some embodiments, such collaborative efforts, i.e., in which one or more Collaborators are in material physical proximity to one another, such as in the same room, is effectuated through the use of Blue Tooth® and/or other near-field communication techniques.

For example, in some embodiments, the functionality of the CWCS, and/or parts thereof, can be provided to users who are musicians composing (or "jamming") an improvised musical work. In some embodiments, at least two of the musicians are at locations near each other, such as in the same room. According to some embodiments, the CWCS is configured to communicate with a musical device. For example, in some embodiments, the CWCS may receive a first live musical work from a first musical device and a second live musical work form a second musical device, such that the two musical devices are near each other. In some embodiments, problems of latency associated with the coordination of the musicians' playing with one another can be effectively addressed. Also, in this example, issues involving ownership of the resulting work, rights regarding exploitation, further modification and/or derivative work generation, etc., can be addressed before, or substantially at, the time the piece is created through the use of the CWCS. This provides much greater rights and exploitation certainty and control to the musicians and/or composers involved than is currently available in such situations. Continuing with the foregoing example, in some embodiments, the musicians' instruments can be configured with digital communication means to directly link to and/or communicate with CWCS. The use of the CWCS in association with Blue Tooth® and/or other near-field communication by one or more Collaborators shall be understood to apply to collaboration regarding all types of Collaborative Works contemplated by this disclosure.

In some embodiments, the CWCS enables persons, such as amateurs or lesser experienced artists, musicians, authors, actors, producers, scriptwriters, programmers, etc., to become Collaborators with other persons who are famous, more well-known, more experienced, etc., than they. In some embodiments, the more experienced or well-known users can set and/or charge a fee for other Users to collaborate with them to create one or more Collaborative Works. Some of the embodiments of the CWCS enable such users to effectuate transactions regarding Collaborative Works so that such lesser experienced or lesser-known artists, etc., can benefit from an association with such greater experienced or better-known artists, etc., and vice versa.

Example 1

An example according to one embodiment in which the Creative Work is a song is described. A CWCS User 1 uses the CWCS to make available to other users of the CWCS a song fragment, and a digital recording thereof, for collaboration to produce a new work (Collaborative Work #1) that will result from the collaborative efforts of CWCS User 1 and one or a plurality of other CWCS users. User 1 provides to the CWCS a recording of the song fragment (Source Work) and the terms of collaboration and use thereof by potential collaborators using the CWCS. CWCS User 2 through the use of the CWCS, subsequently responds to User 1's invitation for collaboration. User 1 and User 2 are provided one or more documents digitally, by the CWCS setting forth their agreement regarding the terms and conditions associated with the collaboration. In this example, according to some embodiments, the terms and conditions are (i) that User 2 can only download the sound recording of the Source Work to effectuate the collaboration, (ii) that the type of collaboration sought is the completion of the song, and (iii) that User 2 will be paid 50% of monies earned from the exploitation of Collaborative Work #1 if User 1 exploits the work. Next, User 2 downloads a CWCS File sound recording of the song fragment that was provided to the CWCS by User 1 and made available to User 2 through authorized access to the Master Profile for the Source Work. User 2 writes two new verses and a bridge for the song, completing it. User 2 then makes a sound recording of the completed song collaboration in User 2's Offline Studio. User 2's sound recording is rendered and prompted to by the CWCS Software Plug-in that the new incarnation of the sound recording will be updated with the Master Profile. Then, the CWCS Software Plug-in updates and uploads the modified Source Work, which now includes Collaborative Work #1, to the Master Profile for the Source Work, for evaluation and possible approval by User 1. User 1 next evaluates Collaborative Work #1 and accepts it. Notification of User 1's acceptance is provided to User 2 through the CWCS. User 1 then exploits Collaborative Work #1 via 'licensing the work for use in a series of television commercials whereby the licensing agreement with the licensee and royalty payments resulting therefrom are reported to the CWCS and made available to User 2 through authorized access to User 1's Master Profile where such data has been aggregated. User 1, through prior agreement with the Operator of the CWCS, has also engaged an option available via the CWCS to allow the Operator to collect royalty payments from the aforementioned licensee resulting from the licensed exploitation of the Collaborative Work #1. The CWCS collects the fees and pays to User 1 and User 2 their respective share of the licensing fee as set forth in the aforementioned agreement executed by User 1 and User 2. All accounting regarding the aforementioned transactions is provided to User 1, User 2, and the Operator through accounting features of the CWCS and are attached to the Master Profile of the Source Work and the associated Collaborative Work #1.

User 1 next uses the Collaborative Work #1 as the Source Work for another round of collaboration in which User 1 has made the work available to CWCS users to add a vocal track to produce Collaborative Work #2.

After both Collaborative Work #1 and Collaborative Work #2 are completed, User #1 is next interested in finding and entering into an agreement with, other CWCS Users to fund a marketing project directed to fund an effort to find additional licensees for Collaborative, Work #1 and Collaborative Work #2.

In some embodiments, the CWCS incorporates, is linked to, or is otherwise is associated with one or more online Crowd Funding portals, Crowd Funding computer applications, and/or Crowd Funding transaction engines, etc. In some embodiments, and for example, continuing with the current example, User 1 could configure the collaboration project in the CWCS to include one or more options for the solicitation of investment capital; the solicitation of monetary donations or gifts, the pre-sale of a product, or the linked sale or a product or service, to generate funds to further develop, market or otherwise exploit the resultant Collaborative Work. For example, the CWCS, in some embodiments, includes, or is linked or associated with, one or more Crowd Funding functionalities of the type, or similar to, that used in association with the business known as Kickstarter (see www.kickstarter.com) or the business known as IndieGoGo. In some embodiments, the CWCS includes functionality to provide one or more Crowd Funding options to an Operator (and/or Users) that are compliant with the regulations set forth by, and in association with, the Entrepreneur Access To Capital Act (HR2930).

Example 2

An example according to one embodiment in which the Creative Work is a comic book text is described. A person who is the creator of a comic book text wishes to collaborate and/or share his text with others and find an artist to illustrate his text. This individual goes online to the CWCS and signs up to become a member of the CWCS. This new CWCS member, User 3, uploads the comic book text he has created with all appropriate documentation and sets up the Master Profile Preferences for this text. The comic book text and documentation is attached to a new Master Profile that is created for the Creative Work/Text. In User 3's Portfolio, the Master Profile that was created for the comic book text is mirrored.

User 3 begins to search the CWCS community to find others who he is able to collaborate with and create new stories/renditions of his comic book and find a graphic artist to illustrate the comic book. After searching the community, User 3 finds another CWCS Member, User 4, who is an artist that has uploaded images of her oil paintings. User 3 likes the artistic work User 4 has done, so User 3 sends a message to User 4 inviting her to work with him on graphics to correspond with his comic book text. After receiving the message, User 4 reviews the Comic Book Text and contacts another member, User 5, whom she believes may also be interested in helping User 3 create graphic images for the Comic Book Text. User 5 informs her (User 4) that User 5 is interested in helping. The artist, User 4, sends a message to the comic book writer, User 3, accepting the invitation and also suggesting that artist User 5 work with them as well.

After hearing about the second artist, User 5, writer User 3 accesses User 5's portfolio using the CWCS interface and views his uploaded graphic art. Liking the work User 5 has done, writer User 3 sends an invitation to artist User 5 to help both himself and artist User 4 work on new graphic images for his comic book text. User 5 accepts the invitation and writer User 3 begins the process of opening a Working Profile by setting the Working Profile Preferences for the new collaborative effort that Users 3, 4, and 5 will be working on together.

After setting the Working Profile Preferences, artist Users 4 and 5 review the Working Profile Preferences. Artist Users 4 and 5 next desire to have the licensing rights percentage to the new collaborative images changed, so they contact User 3 and negotiate new rights using the Working Profile Preferences until they have all agreed on the licensing rights percentage. Once all the Working Profile Preferences are agreed upon, User 3 locks the Working Profile preferences and the CWCS generates an agreement based on the Working Profile Preferences. Users 3, 4, and 5, through the CWCS, agree on terms of collaboration and electronically sign the appropriate documentation, which is subsequently attached to the Master Profile.

Once all documents for collaboration are complete, the CWCS creates a graphic image Working Profile for Users 3, 4, and 5. After sharing ideas and crude sketches that have been scanned and uploaded into the Working Profile, Users 3, 4, and 5 come to a consensus about what the new collaboration graphic images should look like. User 4, using the online studio in the Working Profile begins the process of colorizing and finalizing the details of half the graphic images for the comic book. At the same time, User 5, working in an Offline Studio, begins the process of colorizing and finalizing the other half of the graphic images for the comic book. Once User 5 has finished with his images, he uses the CWCS Software Plug-in to convert the image files and import them into the Working Profile. After reviewing all the work of User 4 and User 5, writer User 3 combines the images and comic book text into a new, completed comic book in the Working Profile Online Studio. Users 4 and 5 review the final version and all three agree that the work is complete. User 3 locks the working profile and saves the new comic book as a Collaboration and part of the original Master Profile. This new comic book Collaboration/ Creative Work then becomes part of the Master Profile and is mirrored in User 3's, User 4's, and User 5's Portfolios.

At this point, writer User 3 elects to sell/distribute Comic Book Collaboration/Creative work to a book publisher, so he attaches pricing information, royalty information, and documentation for the comic book Collaboration/Creative Work to the Master Profile. The book publisher is directed by writer User 3 to view the comic book Collaboration through the CWCS interface.

After reviewing the comic book the publisher agrees to purchase the comic. Through the Comic Book Collaboration Master Profile, the publisher obtains all appropriate documentation and rights for distribution of royalties to User 3, 4 and 5. The book publisher then deposits appropriate payment in the Comic Book Collaboration Master Profile. The CWCS then accepts the fees and royalties and distributes them back to User 3, 4, and 5. Documentation from the beginning of the process through the purchase of the comic by a publisher has been recorded throughout the process by the CWCS and is attached to the Master Profile, and becomes part of the CWCS File.

In some preferred embodiments, in which a Crowd Funding option has been included in the Master Profile, one or more of the Users authorized to engage the Crowd Funding feature could do so to raise funds to further develop, market and/or exploit the Collaborative Work. For example, using the preceding example, User 3 could make his comic book project subject to a Crowd Funding round of investment by specifying the project as such in Master Profile and engaging a Crowd Funding engine in the CWCS to effectuate the communication of one or more Crowd Funding opportunities with respect to the Comic Book project to members of one or more CWCS Communities. In some embodiments, the CWCS will only allow a Crowd Funding functionality to be triggered regarding a Collaborative Work if all or a specified subset of Collaborators also agree to such triggering of one or more CWCS Crowd Funding engines and/or such funding means, etc.

Example 3

An example according to one embodiment in which the Creative Work is a circuit board is described. An aircraft company, John Doe Air, has created a computer that is configured with artificial intelligence functionality, "AI-1." John Doe Air has been designed and programmed to create new avionic circuit boards. AI-1, while attempting to create a new circuit design, has come to a roadblock and cannot resolve several issues that would allow the new circuit design to work. AI-1 requests from its owner, John Doe Air, to be allowed access to the CWCS to attempt to find another individual to collaborate with about the circuit design and resolve the roadblocks. John Doe Air signs up with CWCS as a new member. John Doe Air uses the CWCS Software Plug-in to help AI-1 interface/communicate with the CWCS and set specific preferences for AI-1 to operate in the CWCS.

The preferences set for AI-1 by John Doe Air allow it to set the following preferences: (i) collaboration only with members who are from specific countries: USA, United Kingdom, and Canada; (ii) collaborate only with members who will sign a non-discloser agreement; (iii) collaborate only with members who agree to be paid one time as work-for-hire, based on a dollar amount per percentage of contrition to making a functional circuit board; (iv) collaborate only with members whose personal profiles indicate they have the criteria and educational requirements to work on the circuit board; (v) enact security preferences and firewalls that meet the requirements of John Doe Air.

Once the preferences are set, AI-1 uploads the circuit board design, creating a new Master Profile. AI-1 makes the profile Unreleased so that it is not visible to the CWCS Community. Then, AI-1 begins searching the CWCS community to find a member who meets the requirements set in the CWCS Software Plug-in preferences. After two days of searching, AI-1 finds a member who meets the criteria desires to work with "Member 920." AI-1 sends an invitation to Member 920, asking if Member 920 would like to work on this project under the parameters set by John Doe Air. Member 920 happens to also be a computer that has artificial intelligence. Member 920 happens to belong to a Canadian University Computer Lab and was given membership to the CWCS by the University. Member 920's CWCS Software Plug-in preferences allow it to work with any Member under any conditions. Because of this, Member 920 accepts the invitation to work with AI-1. AI-1 sets the preferences for a Working Profile and requests that Member 920 tighten its security options for this collaboration. Member 920 informs AI-1 that it must obtain permission to make such changes. Member 920 then asks the University if it can change its security parameters for this project. The University agrees to allow Member 920 to change its security parameters for a two-week period, only. Member 920 contacts AI-1 informing it that it only has a two-week window to work on the project under these parameters. AI-1 agrees to the working profile preference change and the CWCS creates an online agreement. The agreement is executed on behalf of John Doe Air and the Canadian University by both AI-1 and Member 920. Once the agreement is executed, a circuit board design Working Profile is created for this new circuit board/Collaboration. Both AI-1 and Member 920 have agreed to work within the Online Studio and they begin the process of making changes to the original design and collaborating back and forth for one week.

Before the design is complete, both AI-1 and Member 920 realize that they will need another collaborator who has experience and knowledge with hydraulics and hydraulic systems. AI-1 requests permission from John Doe Air to add a collaborator to the collaboration. John Doe Air updates the CWCS Software Plug-in preferences to allow an additional collaborator. AI-1 and Member 920 search the CWSC community and find several members who are then sent invitations to work with them on the circuit board design under the current Working Profile Preferences. Only one of the members (Member 1545) agrees to work with AI-1 and Member 920. Member 1545 is human and not a computer. AI-1 resets the Working Profile Preferences to include all three members, and the CWCS generates a new agreement for Member 1545 and amended agreements for AI-1 and Member 920. All three agreements are then digitally signed and executed.

The Working Profile that AI-1 and Member 920 have been working on is opened to Member 1545. After communicating back and forth and reviewing the functions of the circuit board, Member 1545 gives suggestions for changes to the circuit so that it will function properly with hydraulic systems. AI-1 and Member 920 both agree that the new changes will work and the Circuit Board/Collaboration is finalized and completed. The new Circuit Board/Collaboration is added to the Master Profile and is mirrored in John Doe Air Member 920 and Member 1545's Portfolios. Due to Master Profile Preferences, Working Profile Preferences and the Agreements signed by all parties, only limited aspects of the collaboration are shown in the Master Profile and the mirrored Master Profiles as well as the final collaboration is marked unreleased and is unavailable to the CWCS Community.

The CWCS sends an invoice based on the agreements to Joe Doe Air for the money owed to Member 920 and Member 1545. John Doe Air deposits monies in the Master Profile account and the CWCS, in turn, distributes the appropriate shares of money earned to Member 920 and Member 1545.

In some embodiments, the CWCS provides the means to screen potential collaborators for appropriateness regarding their physical location, nationality, security clearance status, etc., through links to other databases and the use of other functionality (such as the use of GPS location means) which are well-known by persons of ordinary skill in the art.

Example 4

An example according to one embodiment in which the Creative Work is a sandal design and the Collaboration is for funding is described (design and funding contracts). A member, "Member 634," of the CWCS Community has made a new design of beach sandal for which he desires to find financing, manufacturing, importing, order fulfillment, website creation, and marketing services.

Member 634/Content Controller uploads pictures, designs, and other specifics for his design to the CWCS and a new Creative Works Master Profile is created. Also, Member 634 opens a new Working Profile Preferences for a new collaboration and sets up a business plan through the Working Profile Preferences. These Preferences include that Member 634 wants 80% of profits, he wants to remain the Content Controller and he wants a $1,000 a month draw agent earnings. In exchange for 20% of the equity, Member 634 wants a $100,000 equity investment.

Member 634, in attempting to find financing, create his website and market his sandals, uses the Collaborative Matching search engine to find possible Members/Groups in the CWCS Community to collaborate with him. He begins his search by using the CWCS to look for CWCS Groups or CWCS individual Members who have indicated that they are interested in financing ventures and start-up companies. Member 634 finds several Groups that specify they are looking for investment opportunities. Member 634 sends invitations to each Group seeking a collaborative effort with his sandal design that will allow him to manufacture, build a website and market the product. Four perspective collaborators respond to Member 634's invitation. After reviewing the groups in more detail, Member 634 finds that Group 240 was formed by ten members with a combination of capital of $100,000 and has expertise in apparel. Member 634/Content Controller decides he wants to work with Group 240 and informs Group 240.

Group 240 studies and reviews the Working Profile Preferences set for the Collaboration and proposes changes be made, using the Working Profile Preferences Negotiation Engine. These changes include a time limit set to find a website designer and build the site, 50% of profits, to be the Content Controller for the Sandal design, to specify who will manufacture the sandals and all accounting receivable and payable and dividends scheduled for payment to be processed through the Group 240 Profile. For this, they will give a $100,000 equity investment. After reviewing the changes desired by Group 240, Member 634 replies through the Negotiation Engine with his revised terms. Member 634 accepts the time limit set to find a website designer and build the site, accepts 50% of profits, accepts Group 240 becoming the Content Controller for the sandal design, accepts Group 240 specifying who will manufacture the sandals and accepts all accounting receivable and payable and dividends scheduled for payment to be processed through the Group 240 Profile, and he accepts the $100,000 equity investment. However, Member 634 requests to increase his monthly draw to $1,500, requests that all purchases and payments be digitally signed off on by both Group 240 and Member 634 through the accounting engine, and requests a guaranteed price point of $10 per pair of sandals on the sandal manufacture and delivery.

Group 240 accepts his revised terms and an agreement is generated by the CWCS and provided to both parties online to sign. Both Member 634 and Group 240 sign the agreement, which is stored in a "Collaboration Sandal 1" Profile and a Working Profile for "Collaboration Sandal 1" is opened. Group 240 deposits $100,000 into the escrow account of the working profile accounting engine for "Collaboration Sandal 1".

Meanwhile, Member 634 searches the CWCS Community with the Collaborative Matching Search Engine and finds a web designer, "Member 22," that he thinks is perfect for the job of building the web store. Member 634, through the Working Profile for "Collaboration Sandals 1," contacts Group 240 and suggests that they hire Member 22 to build the web store and requests that they open a new collaboration, "Collaboration Sandals 2," and a Working Profile, "Collaboration Sandal 2," so he can work with Member 22 on building the site for the sandal design. Group 240 likes his suggestion and, being the new Content Controller, opens Working Profile Preferences for a second collaboration "Collaboration Sandal 2" that is exclusively for building the web store for the sandals.

As part of the Working Profile Preferences "Collaboration Sandal 2," Group 240 states that they will only pay $5,000 to have the site built with 20% paid at the signing of the agreements, that the store must be built within thirty days of the signed agreement, and that Member 634 must oversee the construction, marketing, design, and functionality of the web store. Group 240 sends an invitation to Members 22 and 634 to review each of their specific portions of the Working Profile Preferences for "Collaboration Sandal 2".

Member 634 accepts the Working Profile Preferences for "Collaboration Sandal 2" that he oversees the construction, marketing, design, and functionality of the web store. However, Member 22 opens the Working Profile Preferences Negotiation Engine for "Collaboration Sandal 2" and replies that instead, he would like 5% of the Content Controller/Group 240's profits, he wants 45 days to build the site, and for this, he will spend ten hours a month managing and upgrading the site for ten years.

Group 240 accepts the changes to Member 22's specific portion of the Working Profile Preferences for "Collaboration Sandal 2". The CWCS then generates two unique agreements based on the Working Profile Preferences for "Collaboration Sandal 2" for (Group 240 and Member 634) and (Group 240 and Member 22). Once all agreements are executed digitally, the CWCS opens a new Working Profile web design Studio for "Collaboration Sandal 2".

Group 240 contacts their apparel manufacturer, outside the CWCS, regarding sandal manufacturing. To make the price point at $10 per pair of sandals, the manufacturer demands that 8,000 pairs be ordered, equaling $80,000.

Group 240 agrees on the price and makes a paper agreement outside the CWCS with the manufacturer. Group 240 scans and attaches the manufacturing agreement to the Working Profile "Collaboration Sandals 1" for Member 634 to review and sign as well as Group 240 signing. The Working Profile for "Collaboration Sandals 1" digitally transmits the signed/executed copy of the agreement to the manufacturer. The Manufacturer then prints, signs, and mails via post the signed/executed agreement back to Group 240. Group 240 scans the final agreement that has been executed by all parties and puts it into Working Profile "Collaboration Sandal 1". Group 240 and Member 634 then each digitally confirm an account transfer from Working Profile "Collaboration Sandals 1" for $80,000 to the manufacture.

During a 45-day period, Member 22 has completed the web store and Member 634 has approved the functionality and design of the store. The web store has been set up so that all funds from purchases are automatically deposited into the Master Profile, which is then transferred to Group 240's Profile for distribution. At that point, Member 634 and Member 22 would like to close the working profile for "Collaboration Sandal 2". After Group 240 reviews the site, they make the "Collaboration Sandal 2" locked and closed.

Group 240 and Member 634 open the web store and begin marketing the sandals to the general public. Both Group 240 and Member 634 agree to leave Working Profile "Collaboration Sandals 1" open due to future transactions, purchases and development.

Figure 5:
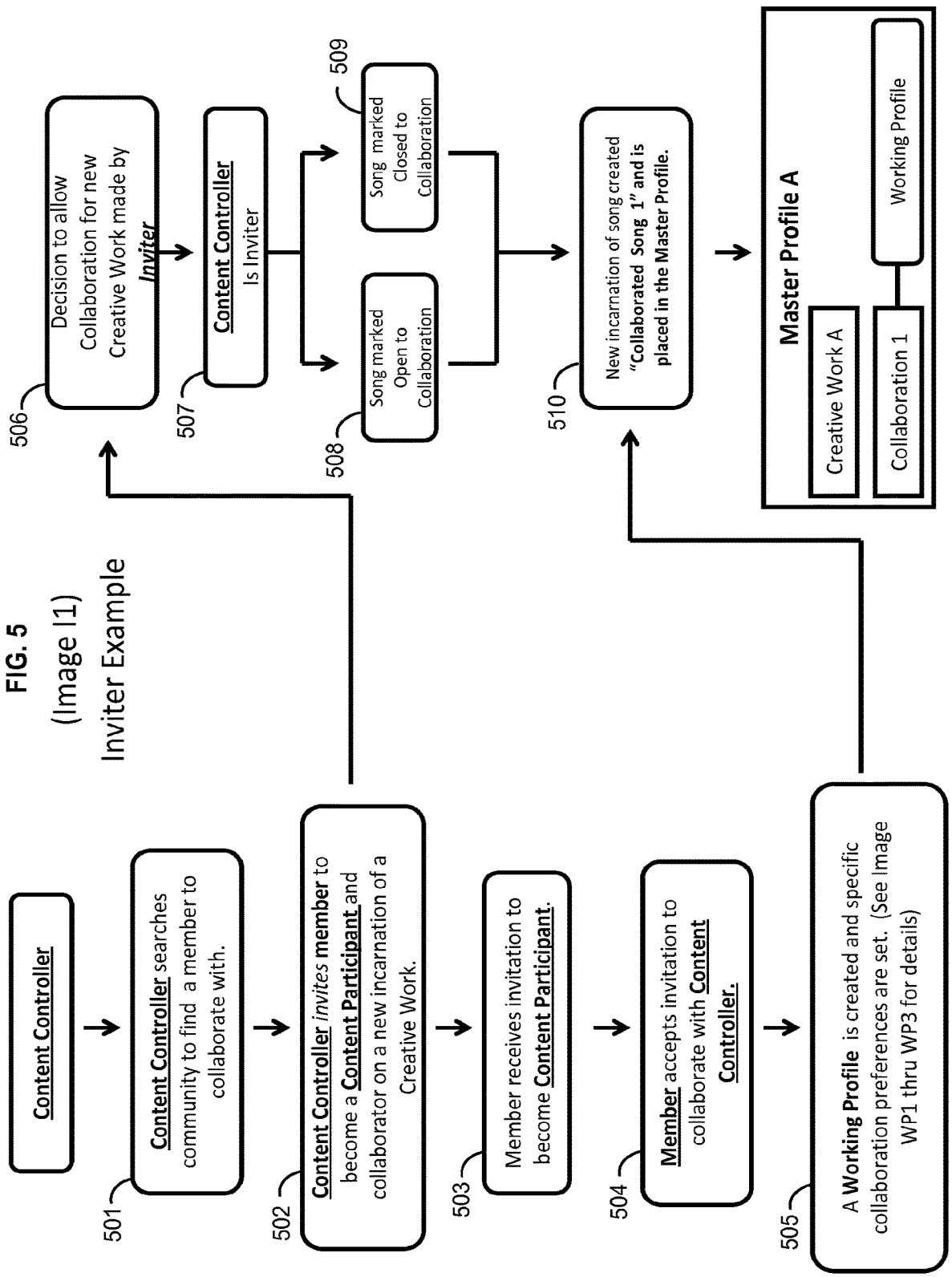
FIG. 5 is a flowchart of a method according to an exemplary embodiment, such that a Content Controller invites a user, entity, or the like to collaborate.

An example according to one embodiment in which the Content Controller is an Inviter is described and illustrated in FIG. 5. With reference to FIG. 5, a method of tracking collaboration according to some embodiments in which the Content Controller is an Inviter is implemented by a computer system (see FIG. 2) according to a process depicted in FIG. 5. A processor 22 executes instructions that instruct information to be saved to a storage medium 24 (see FIG. 2). In this example, the Inviter controls the option for Open or Closed Collaboration for the creative work the collaborators create.

In various embodiments, the tracked information includes one or more documents. In some embodiments, a document describes and/or evidences rights (for example a contract). In some embodiments, such documents include an assignments of rights document, other rights and use agreements pertaining to the Source Work and associated Collaboration Works, creative contribution authorizations, investment agreements, crowd funding agreements, descriptive terms, contribution credits, work drafts, other creations and derivations of the Source Work and/or Collaboration Works, accounting data and other information pertaining to the Source Work and/or related Collaboration Works. In some embodiments, documents and other data regarding rights, licenses, use agreements, and financing agreements associated with the Source Work, Collaboration Works, and recordings thereof are associated with the Source Work and Source Work-related Collaboration Work(s) (if any). The term Source Work includes identification of the product, goods, property, and/or intellectual property that the documents or agreements pertains to that employ the CWCS.

Referring to FIG. 5, the "Content Controller" is the one who created the creative work that was uploaded into the Profile, via the CWCS. In step 501, the Content Controller searches the CWCS community, via a CWCS interface, to find someone to collaborate with. After finding someone to collaborate with, in step 502, the Content Controller sends an invitation, via a CWCS interface, to a Member asking if the Member would like to work together with the Content Controller to create a new incarnation of the original creative work and become a Content Participant.

In some preferred embodiments, the decision to allow collaboration belongs to the Inviter (step 506). In this case, the Content Controller/Invitee invites the Content Participant (step 507) via a CWCS interface. The Content Controller/Invitee decides for the new Collaborated Work to be Open to Collaboration (step 508) or Closed to Collaboration (step 509). Finally, a new Collaborated Work is created through collaboration through the CWCS (step 510).

Alternatively, in step 503, the Content Participant (i.e., an Invitee) receives an invitation, from the Content Controller, through the CWCS, to collaborate. If the Content Participant (i.e., Invitee) accepts the invitation to collaborate with the Content Controller (in step 504), a Working Profile is created with specific collaboration preferences being set (step 505). In the Working Profile, the Content Controller and Content Participant share ideas to create a new incarnation of the original creative work. Finally, in step 510, a new incarnation of a Collaborated Work is created through collaboration.

Figure 6:
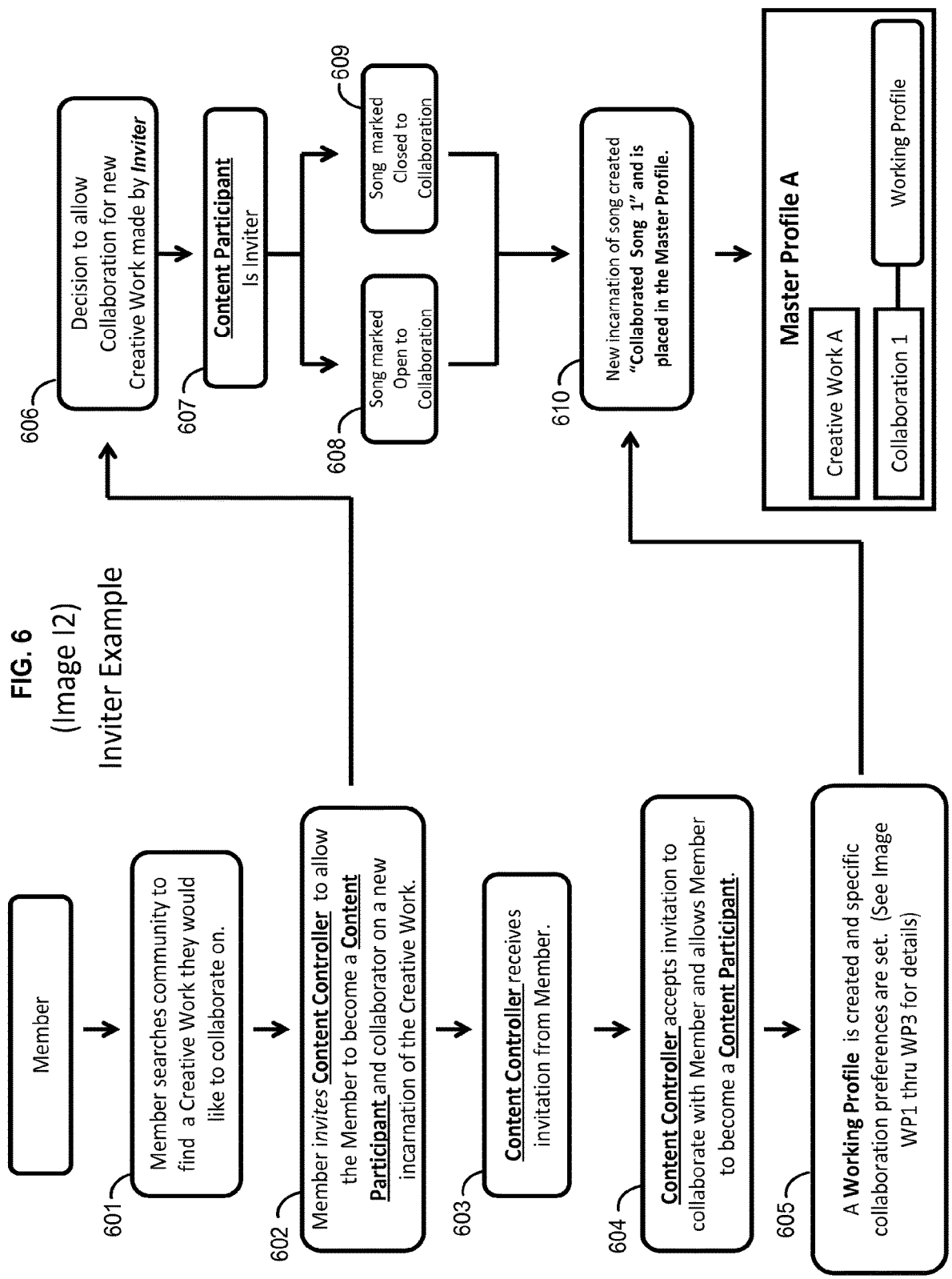
FIG. 6 is a flowchart of a method according to an exemplary embodiment, such that a member invites a Content Controller to allow the member to become a collaborator.

An example according to one embodiment in which the Member is an Inviter is described and illustrated in FIG. 6. With reference to FIG. 6, a method of tracking collaboration according to some embodiments in which the Member is an Inviter is implemented by a computer system (see FIG. 2) according to a process depicted in FIG. 6. A processor 22 executes instructions that instruct information to be saved to a storage medium 24 (see FIG. 2).

In step 601 of FIG. 6, a Member searches the CWCS community, via a CWCS interface, to find a creative work the Member would like to collaborate on. After the Member finds someone to collaborate with (or a work available to collaborate on), in step 602, the Member sends an invitation to the Content Controller, via a CWCS interface, to inquire whether the Content Controller is interested in collaborating with the Member to create a derivative work or other new incarnation of the original creative work (the original work being, e.g., a Source Work or Collaboration Work previously created from a Source Work).

If the Member decides to create a new Creative Work instead of collaborating on existing work (step 606), the Content Participant is the Inviter (in step 607). The Member is the Inviter and makes the decision for the new Collaborated Work to be Open to Collaboration (step 608) or Closed to Collaboration (step 609). Finally, the new work is created through collaboration through the CWCS (step 610).

If instead, the Member decides to collaborate on an existing work, a Content Controller receives the invitation to collaborate from the Member (step 602). If the Member wishes to collaborate on a new incarnation of an existing work, the Member invites the Content Controller to allow the Member to become a Content Participant (see step 603). If the Content Controller accepts the invitation to collaborate with the Member, in step 604, the Member becomes a Content Participant. In step 605, a Working Profile is created with specific collaboration preferences being set. In the Working Profile, the Content Controller and Content Participant share ideas to create a new incarnation of the original creative work (Source Work or Collaboration Work). Finally, the new incarnation of the work is created through collaboration through the CWCS (step 610).

Figure 7:
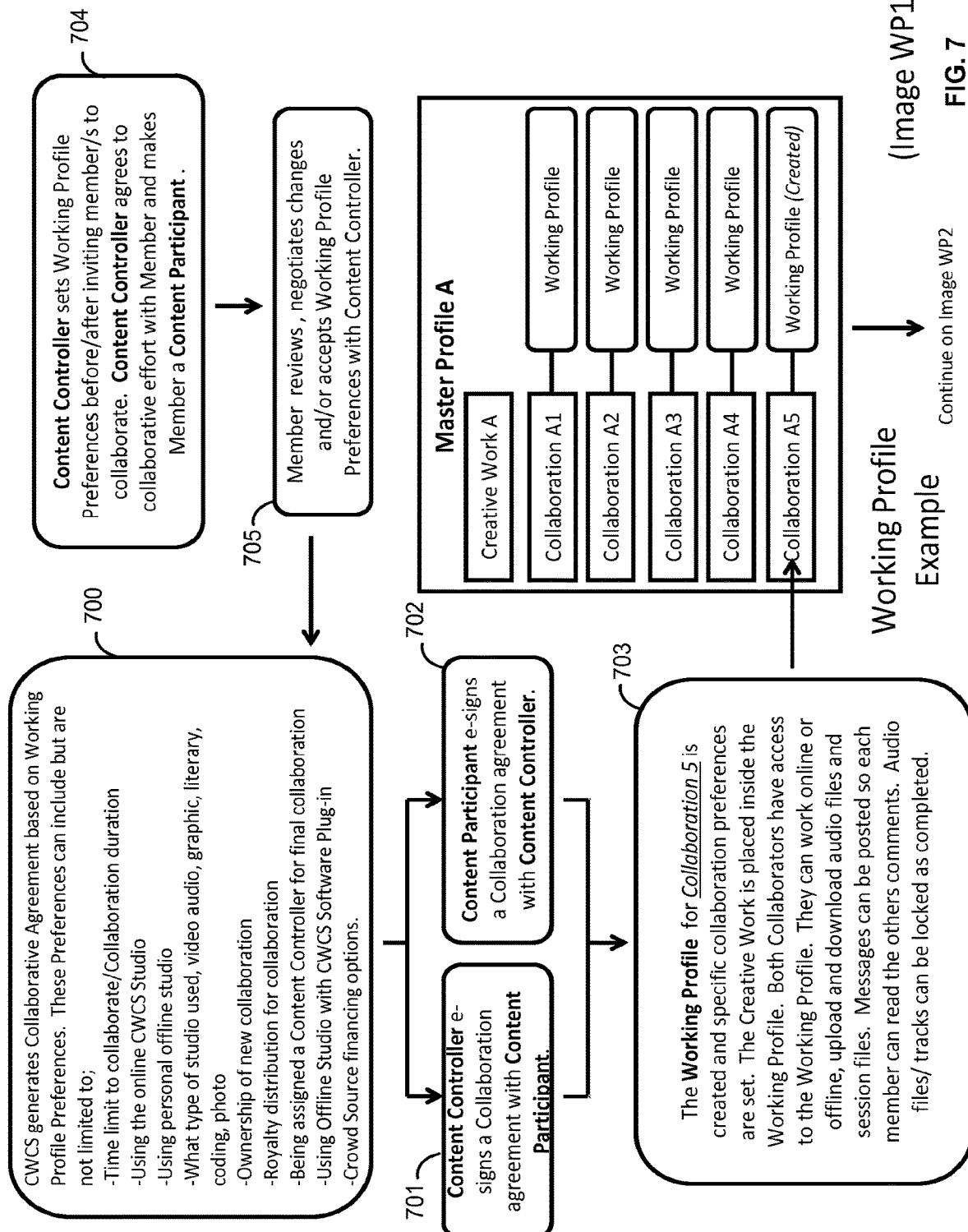
FIG. 7 is a flowchart of a method according to an exemplary embodiment, involving a Working Profile.
Figure 8:
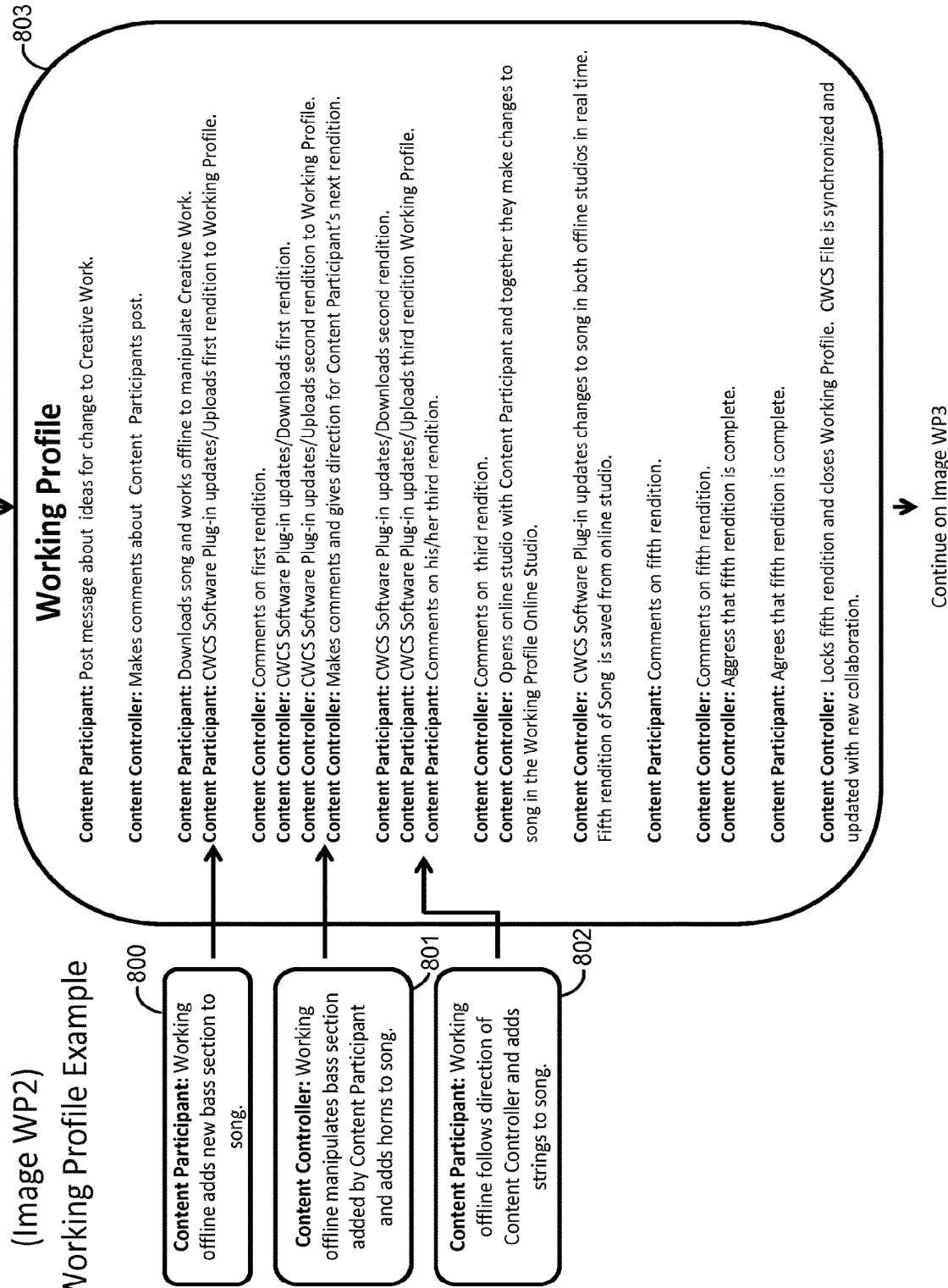
FIG. 8 is a flowchart of a method according to an exemplary embodiment, such that it is a continuation of FIG. 7.
Figure 9:
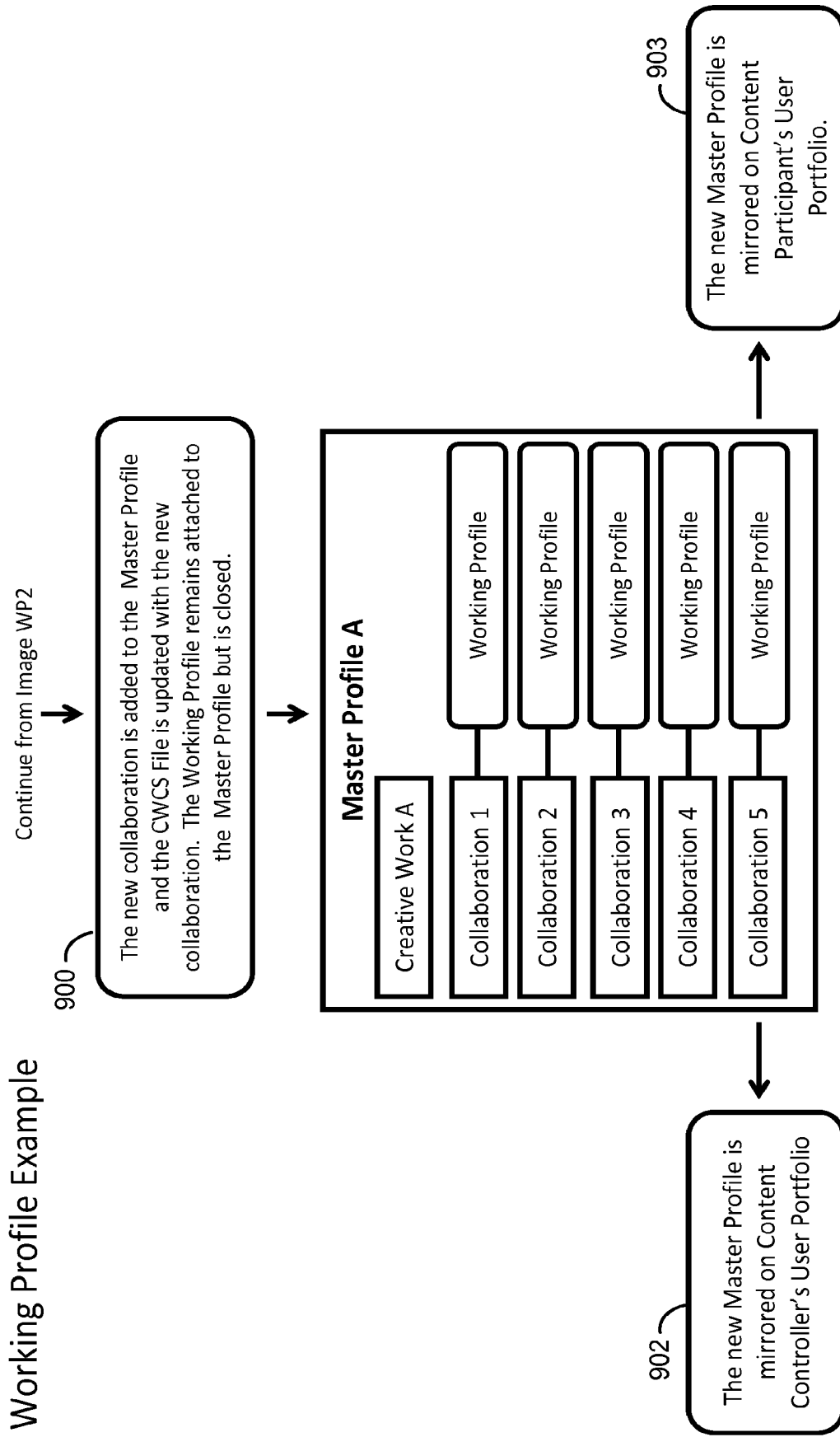
FIG. 9 is a flowchart of a method according to an exemplary embodiment, such that it is a continuation of FIG. 8.

The following is an example according to one embodiment involving a working profile is described and illustrated in FIGS. 7-9. With reference to FIGS. 7-9, a method of tracking collaboration according to some embodiments in which the Member is an Inviter is implemented by a computer system (see FIG. 2) according to a process depicted in FIGS. 7-9. A processor 22 executes instructions that instruct information to be saved to a storage medium 24 (see FIG. 2).

In step 700 of FIG. 7, the CWCS generates a Collaborative Agreement based on Working Profile Preferences. In some embodiments, these Preferences include whether to include a time limit to collaborate, a collaboration duration, whether to use the Online Studio, whether to use the Offline Studio, using the CWCS Software Plug-in, what type of studio used (video audio, graphic, literary, coding, photo, etc.), ownership details of a new collaboration, for the exploitation of the resulting Collaborative Work(s) including all accounting information such as billing and receivables, crowdsourcing accounting, Crowd Funding options and accounting, being assigned a content controller for a new collaboration, qualifications for a collaborator, Qualification Rating, location restrictions, regulatory restrictions (e.g., required permits, licenses, governmental clearances, etc.), who has archive access to the working profile, creating a new working profile from an old working profile, setting restrictions on what a Master Profile can display and/or mirror, etc. A Content Controller sets the Working Profile Preferences about a collaborative effort.

The Content Controller determines whether to agree to a collaborative effort with a Member and makes the Member a Content Participant. The Member determines whether to agree to the collaborative effort with the Content Controller.

In some preferred embodiments, in step 704, the Content Controller sets the Working Profile preferences before inviting someone to Collaborate. In some preferred embodiments, the Working Profile preferences can be set after inviting someone to Collaborate. In some preferred embodiments, the Content Controller and the Content Participant (all parties involved in collaboration) can work together on setting the Working Profile preferences.

If the Member agrees to the Working Profile Preferences (see step 705), the CWCS generates a Collaborative Agreement (such as a contract) based on the Working Profile Preferences. In some embodiments, both the Content Controller (in step 701) and the new Content Participant/Member (in step 702) are able to e-sign the Collaboration Agreement. "E-sign" refers to the providing of a digital signature, a verified or authenticated digital signature (e.g., the type provided by E-Original (see eoriginal.com), and the like.

Once the agreements (for example a contract) are e-signed or otherwise agreed to, a Working Profile is created, in step 703. In some embodiments, the Source Work/CWCS File is placed inside the Working Profile. Both Collaborators have access to the Working Profile. In some embodiments, the Collaborators can work online or offline, upload and download, and/or use the CWCS File and/or CWCS Software Plug-in for updating of files (such as media files, session files, etc.) in real-time. In some embodiments, messages can be posted manually or automatically so that Collaborators can read each other's messages and comments. Media files/tracks/renditions can be locked as completed.

Next, regarding FIG. 8 (which is a flowchart that is a continuation of the flowchart of FIG. 7), some embodiments support a manual update to the Working Profiles, automatically updated changes to the Working Profile, or a combination of those.

As shown in FIG. 8, in some embodiments, the Content Controller and the Content Participant work offline (steps 800, 801, 802) and/or online. In some embodiments, they share messages and/or upload and/or download new renditions of the Source Work.

When the Content Controller and Content Participant agree that a draft (rendition) is finished or complete, in some embodiments, the Content Controller locks the final rendition and closes the Working Profile (step 803).

Next, regarding FIG. 9 (which is a flowchart that is a continuation of the flowchart of FIG. 8), some embodiments support adding the new Collaboration to the Master Profile. In some embodiments support updating with the CWCS File (step 900). Then, in some embodiments, the Working Profile is closed. Finally, in some embodiments, the Master Profile is mirrored and updated on the Content Controller (step 902) and Content Participant's (step 903) User Portfolios.

Figure 10:
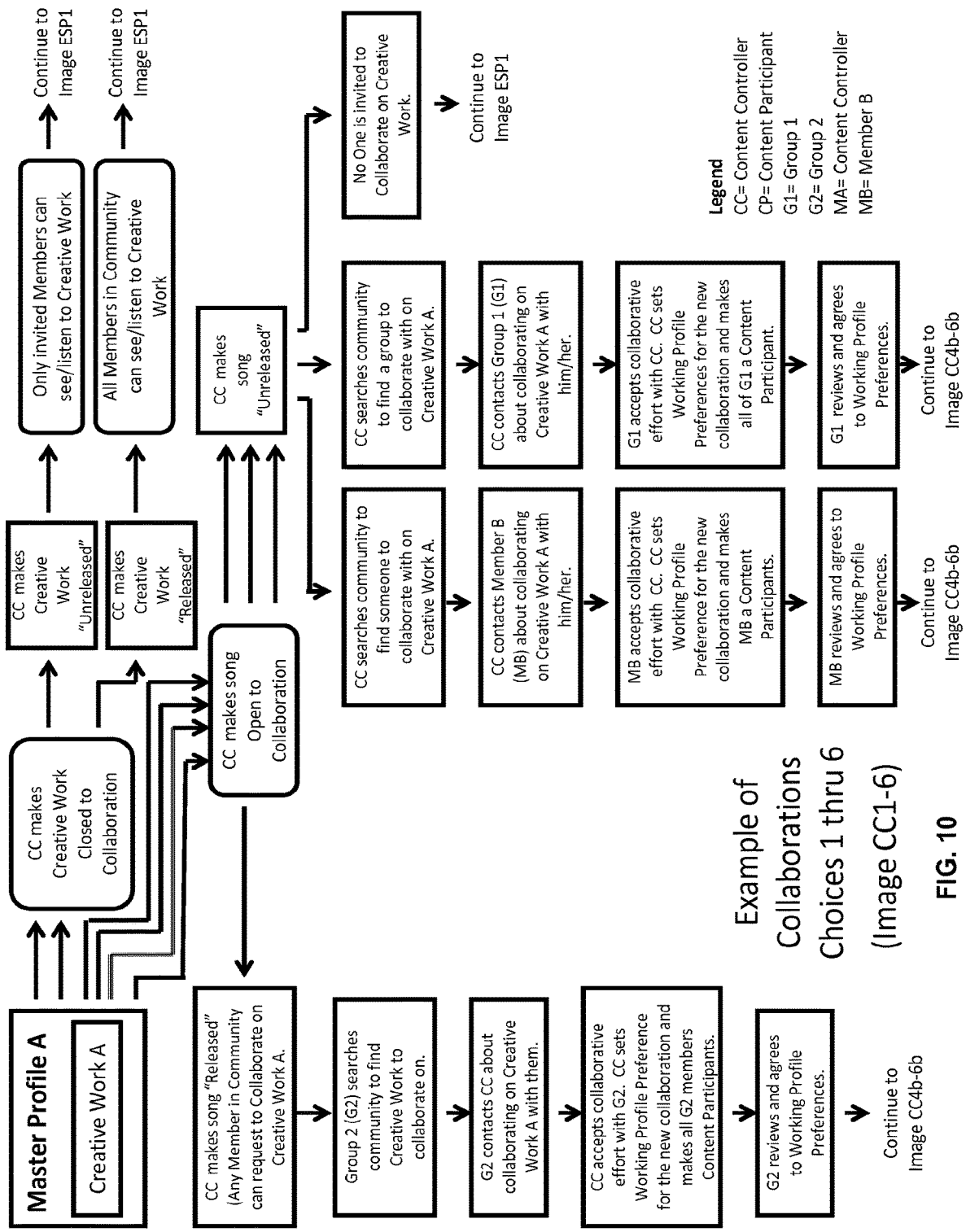
FIG. 10 is a diagram according to an exemplary embodiment, illustrating an example of effects of setup and collaboration choices on a Master Profile.

FIG. 10 illustrates an example according to one embodiment and refers to effects on a Master Profile for Collaboration Choices 1 thru 9. In the exemplary embodiment of FIG. 10, Member A uploads a Creative Work and becomes a Content Controller. The Creative Work is given a unique Master Profile and CWCS File. In this example, it is Master Profile A. The Master Profile A is mirrored in the Content Controllers/Member A's portfolio (located in Member A's Member Portfolio).

In some embodiments, a "Member's Portfolio" is a Member's page that includes a list of the Source Works that have been uploaded by the Member. In some preferred embodiments, recordings of Source Works can be accessed in the Member's Portfolio. In some preferred embodiments, a Member's Portfolio can include a list of, and in some preferred embodiments, access to, Collaborative Works that a Member has Collaborated on.

According to some embodiments, the Master Profile A is mirrored in other Collaborators' portfolios with the Creative Work A as well as other collaborations. In some embodiments, a stand-alone Master Profile, or a mirrored Master Profile in a Member's Portfolio, display the Creative work and all renditions of that Creative Work.

Figure 15:
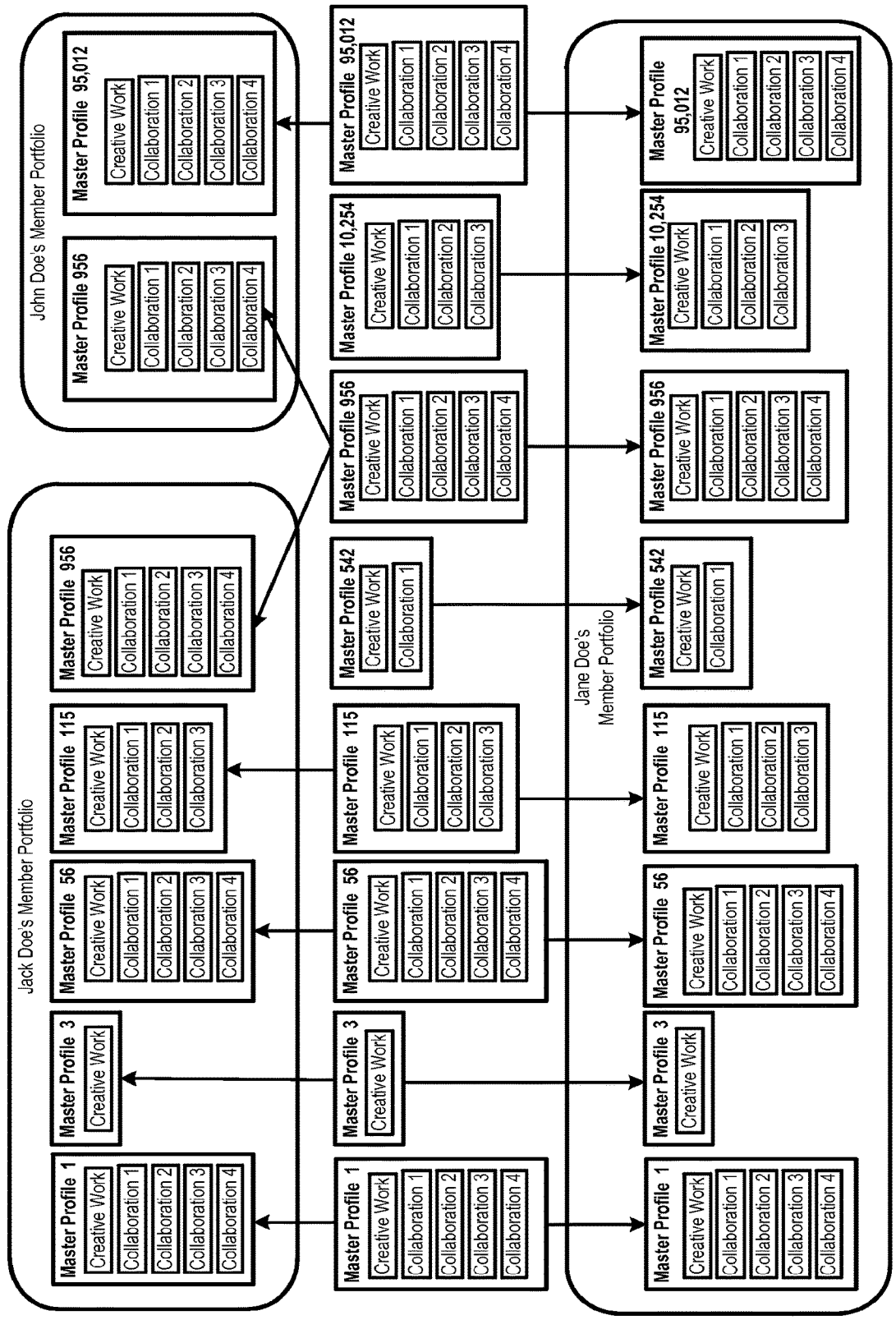
FIG. 15 is a diagram according to an exemplary embodiment, illustrating an example of a Master Profile mirrored on a Member Portfolio.

In the following examples, only one Master Profile is displayed in a Members Portfolio, but, as displayed in FIG. 15, in some embodiments, a Member's Portfolio could have multiple or unlimited number of Master Profiles mirrored in their Member Portfolio.

Example 1

Figure 11:
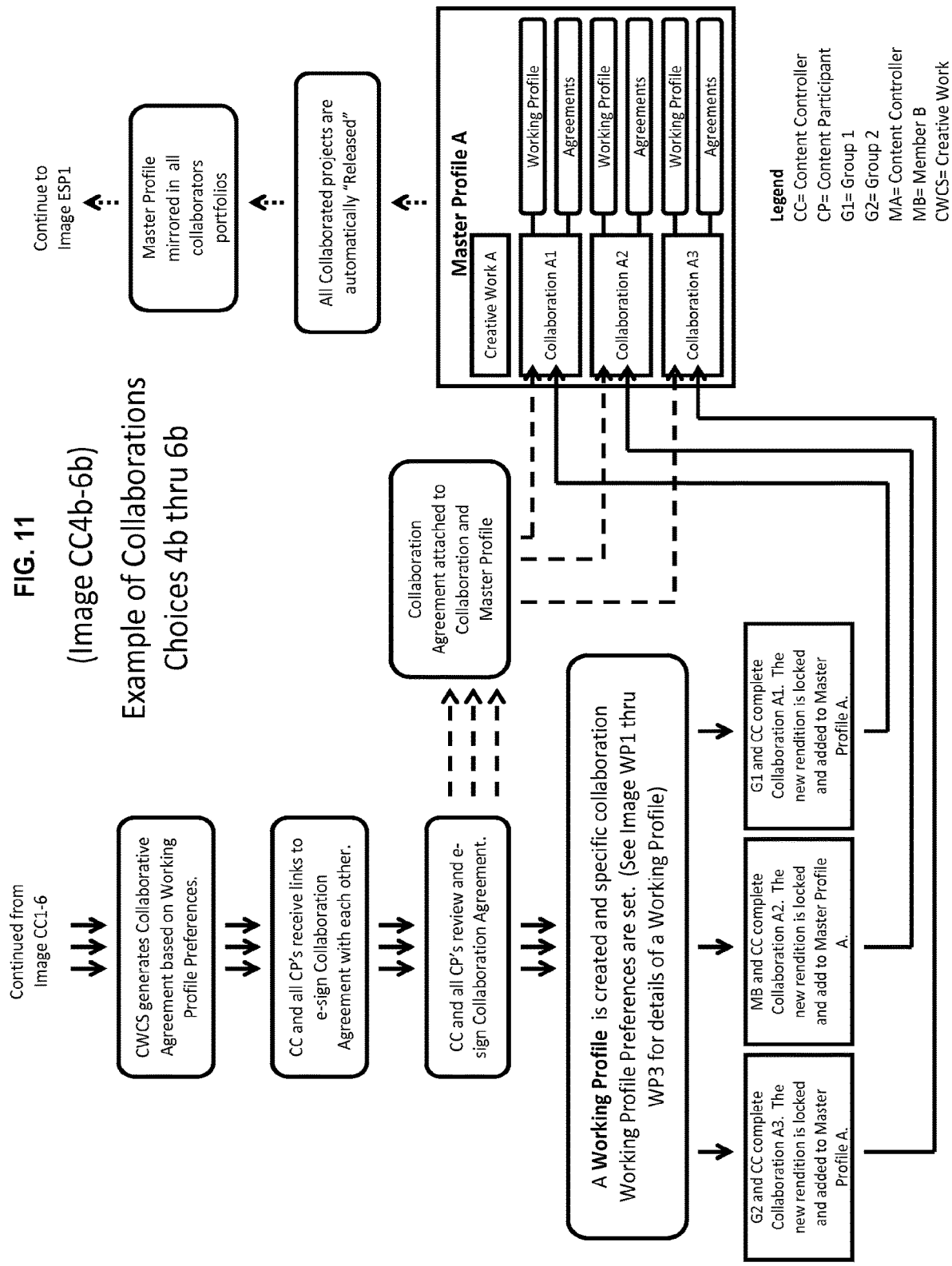
FIG. 11 is a diagram according to an exemplary embodiment, illustrating another example of collaboration choices.

According to the exemplary embodiment of Example 1, Member A has set the Master Profile Preferences to be "Closed to Collaboration" and "Unreleased." With reference to FIG. 11, the Original Composer/Content Controller (Member A) has made Creative Work A Closed to Collaboration. Next, in the exemplary embodiment, Creative Work A is made Unreleased. The result of these two actions makes Creative Work A visible only to Members who are invited to view or audition it. No one is authorized to collaborate on Creative Work A.

Referring to the diagram of FIG. 10 (and noting that in Example 1, the Master Profile A will only include Creative Work A and none of the Collaborations listed in the diagram), choices made by the Original Composer/Content Controller have had no effect on Master Profile A or the mirror of Master Profile A in Members A's Portfolio. Note a stand-alone Master Profile, or a mirrored Master Profile in a Members Portfolio, display the Creative Work and all renditions of that Creative Work.

Example 2

According to an exemplary embodiment of Example 2, illustrated by FIG. 11, Member A has set the Master Profile Preferences to be "Closed to Collaboration" and "Released." We show these as two distinct actions in this example. The Original Composer/Content Controller (Member A) makes Creative Work A Closed to Collaboration. Next Creative Work A is Released. The result of these two actions makes Creative Work A visible to all Members in the community but no one can collaborate on Creative Work A.

Referring again to FIG. 10 (note that in Example 2, the Master Profile A will only include Creative Work A and none of the Collaborations listed in the diagram), choices made by the Original Composer/Content Controller have had no effect on Master Profile A or the mirror of Master Profile A in Member A's Portfolio. Note a stand-alone Master Profile, or a mirrored Master Profile in a Members Portfolio, display the Creative work and all renditions of that Creative Work.

Example 3

According to an exemplary embodiment of Example 3, illustrated by FIG. 11, Member A has set the Master Profile Preferences to be "Open to Collaboration" and "Unreleased" The Original Composer/Content Controller (Member A) makes Creative Work A Open to Collaboration. Next, Creative Work A is made Unreleased. In this example, no one is invited to collaborate on Creative Work A. The result of these actions makes Creative Work A unavailable to anyone to collaborate on. Referring back to FIG. 10 (note that in Example 3 the Master Profile A will only include Creative Work A and none of the Collaborations listed in the diagram), the choices made by the Original Composer/Content Controller have had no effect on Master Profile A or the mirror of Master Profile A in Member A's Portfolio. Note a stand-alone Master Profile, or a mirrored Master Profile in a Members Portfolio, display the Creative work and all renditions of that Creative work.

Example 4

According to an exemplary embodiment of Example 4, illustrated by FIG. 11, Member A has set the Master Profile Preferences to be "Open to Collaboration" and "Unreleased." The Original Composer/Content Controller (Member A) makes the Creative Work A Open Example 1: In Example 1, Member A has set the Master Profile Preferences to be "Closed to Collaboration" and "Unreleased." The Original Composer/Content Controller (Member A) has made Creative Work A Closed to Collaboration. Next Creative Work A is made Unreleased. The result of these two actions makes Creative Work A visible only to Members who are invited to view or audition it. No one is authorized to collaborate on Creative Work A. Referring back to FIG. 10 (note that in Example 1 the Master Profile A will only include Creative Work A and none of the Collaborations listed in the diagram), the choices made by the Original Composer/Content Controller have had no effect on Master Profile A, or the mirror of Master Profile A in Members A's Portfolio. Note a stand-alone Master Profile, or a mirrored Master Profile in a Members Portfolio, display the Creative work and all renditions of that Creative work.

Example 5

Figure 12:
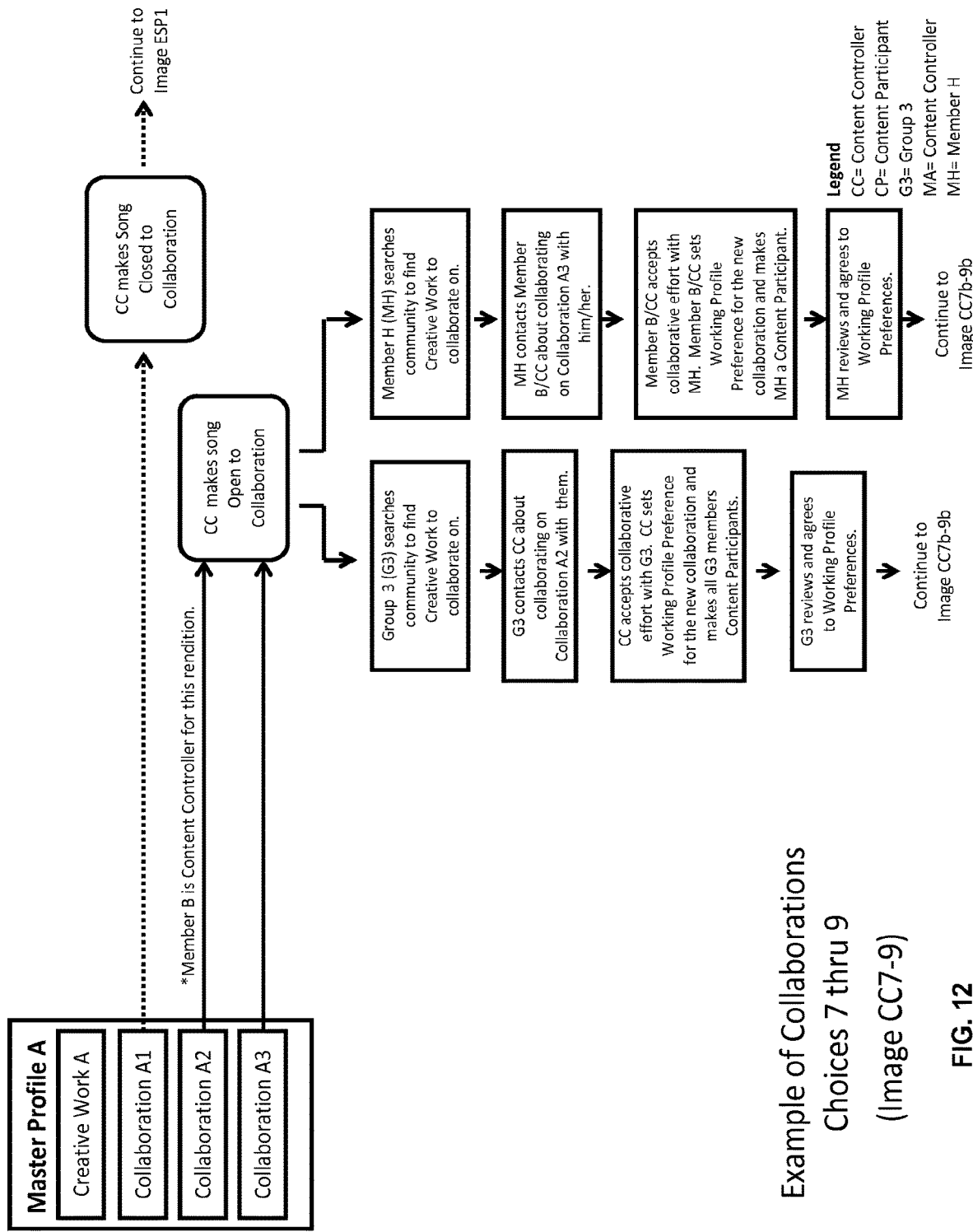
FIG. 12 is a diagram according to an exemplary embodiment, illustrating yet another example of collaboration choices.

In Example 5, according to an exemplary embodiment of Example 5 illustrated by FIG. 11, Member A has set the Master Profile Preferences to be "Open to Collaboration" and "Unreleased." (Note that Example 5 is virtually identical to Example 4 except for the Content Controller collaborating with an individual Member as opposed to a group.) The Original Composer/Content Controller (Member A) makes Creative Work A Open to Collaboration. Next, Creative Work A is made Unreleased. The Original Composer/Content Controller searches the community to find a Member to collaborate with. Next, the Original Composer/Content Controller sends an invitation to Member B to see if Member B would like to collaborate on Creative Work A. Next, Member B accepts the invitation to collaborate with the Original Composer/Content Controller and the Content Controller sets the Working Profile Preferences and makes "Member B" a Content Participant. As part of the Working Profile Preferences, Member A makes Member B the Content Controller for the new collaboration, Collaboration A2. Also as part of this same Working Profile Preferences for Collaboration A2 Member B is allowed to makes Collaboration A2 "Open to Collaboration" (Note, the result of making Member B the Content Controller for Collaboration A2 is displayed in Example 8, below.) Member B/Content Participant reviews the Working Profile Preferences. Referring now to the exemplary embodiment illustrated by FIG. 12, the CWCS generates Collaboration agreements for all the members based on the Working Profile Preferences. Next, both the Content Controller and the Content Participant receive links to e-sign the Collaboration agreements. Both the Content Controller and the Content Participant review and e-sign the Collaboration agreements, which, in some preferred embodiments, is stored in the Creative Works Collaborative System and presented to Member B/Content Participant online. In some preferred embodiments, Member B/Content Participant executes the Collaboration Agreement document digitally. In some preferred embodiments, the execution of the Collaboration Agreement is authenticated via means such as those used by e-Original (See eoriginal.com.) In some preferred embodiments, the execution of the Collaboration Agreement is authenticated via mail or post.

Note that, at this point, two actions happen in parallel, according to some embodiments: (i) the collaboration agreement, in this example, is attached to Creative Work A as Collaboration A2 in the Master Profile A and (ii) a Working Profile is created for Member B/Content Participant and the Original Composer/Content Controller. Next, Member B/Content Participant and the Original Composer/Content Controller complete the collaboration and a new incarnation/rendition of the Creative Work A is created, "Collaboration A2." The new rendition is locked and added to Master Profile A. Next, all collaborated projects are automatically made Released. Finally, Master Profile A is mirrored in all collaborators portfolios.

Now referring again to FIG. 10, Master Profile A includes the new Collaboration A2 as part of Master Profile A. (Note that in Example 5, the Master Profile A will include Creative Work A1 Collaboration A1 and Collaboration A2 listed in the diagram.) The Original Composer/Content Controller and Member B/Content Participant also show the new Collaboration A2 in Master Profile A mirrored in their Member's Portfolio. Note a stand-alone Master Profile or a mirrored Master Profile in a Members Portfolio, display the Creative work and all renditions of that Creative work.

Example 6

According to an exemplary embodiment of Example 6, illustrated by FIG. 11, Member A has set the Master Profile Preferences to be "Open to Collaboration" and "Released". The Original Composer/Content Controller (Member A)

makes Creative Work A Open to Collaboration. Next, Creative Work A is Released to the Community. As a Released Creative Work, any member of the community can request to collaborate on Creative Work A. Group 2 searches the community to find a Creative Work to collaborate on. Next, Group 2 contacts the Original Composer/Content Controller about collaborating on Creative Work A with them. Next, the Original Composer/Content Controller accepts the invitation to collaborate with Group 2 and the Content Controller sets the Working Profile Preferences and makes "Group 2" members Content Participants. Group 2/Content Participants review the Working Profile Preferences. Now referring to the exemplary embodiment illustrated by FIG. 12, the CWCS generates Collaboration agreements for all the members based on the Working Profile Preferences. Next, both the Content Controller and the Content Participants receive links to e-sign the Collaboration agreements.

Both the Content Controller and the Content Participants review and e-sign the Collaboration agreements, which, in some preferred embodiments, is stored in the Creative Works Collaborative System and presented to Group 2/Content Participants online. In some preferred embodiments, Group 2/Content Participants execute the Collaboration Agreement document digitally. In some preferred embodiments, the execution of the Collaboration Agreement is authenticated via means such as those used by e-Original (See eoriginal.com.) In some preferred embodiments, the execution of the Collaboration Agreement is authenticated via mail or post.

Two actions happening substantially simultaneously (in some embodiments) or in parallel: (i) the collaboration agreement, in this example, is attached to Creative Work A as Collaboration A3 in the Master Profile A, and (ii) a Working Profile is created for Group 2/Content Participants and the Original Composer/Content Controller. Next, Group 2/Content Participants and the Original Composer/Content Controller complete the collaboration and a new incarnation/rendition of Creative Work A is created, "Collaboration A3." The new rendition is locked and added to Master Profile A. Next, all collaborated projects are automatically made Released. Finally, the Master Profile is mirrored in all collaborators' portfolios.

Now referring again to FIG. 10, Master Profile A includes the new Collaboration A3 as part of Master Profile A. (Note that in Example 6 the Master Profile A will only include Creative Work A, Collaboration A1, Collaboration A2 and Collaboration A3 listed in the diagram). The Original Composer/Content Controller and Group 2/Content Participants also show the new Collaboration A3 in the Master Profile A mirrored.

Note a stand-alone Master Profile, or a mirrored Master Profile in a Members Portfolio, display the Creative Work and all renditions of that creative work.

Example 7

Figure 13:
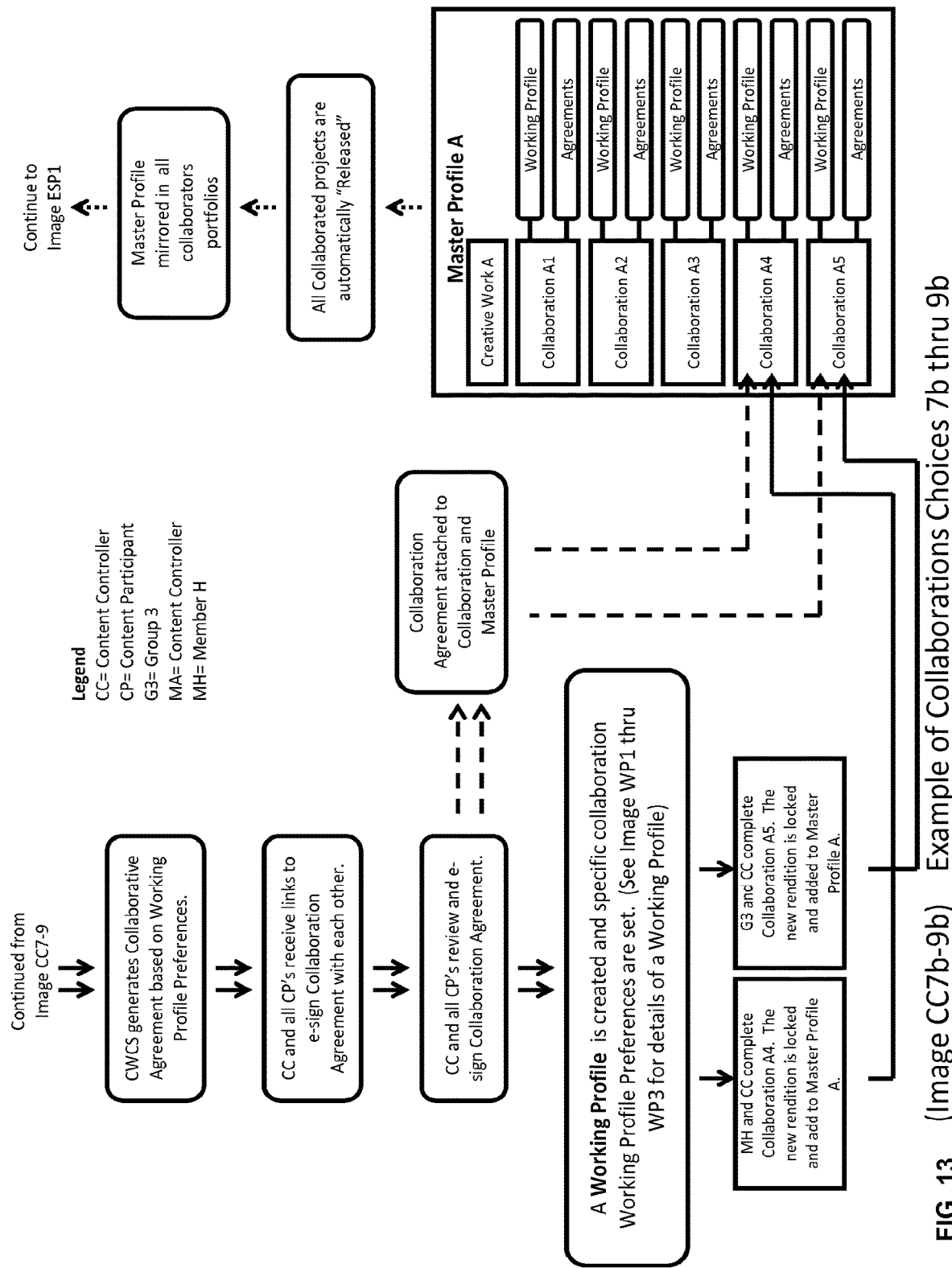
FIG. 13 is a diagram according to an exemplary embodiment, illustrating an example of still more collaboration choices.

According to an exemplary embodiment of Example 7 illustrated by FIG. 13, Member A had set the Working Profile Preferences for Collaboration A1 to be "Closed to Collaboration." (Note that, Master Profile A has the three Collaborative efforts attached to the profile.) The Content Controller (Member A) for Collaboration A1 has made Collaboration A1 Closed to Collaboration. Referring again to FIG. 10 (Note that in Example 7 the Master Profile A will only include Creative Work A, Collaboration A1, Collaboration A2 and Collaboration A3 listed in the diagram), there have been no changes to Master Profile A because no new collaborations were made due to the decision of the Content Controller to make Collaboration A1 Closed to Collaboration. Note a stand-alone Master Profile, or a mirrored Master Profile in a Members Portfolio, display the Creative work and all renditions of that Creative work.

Example 8

Figure 14:
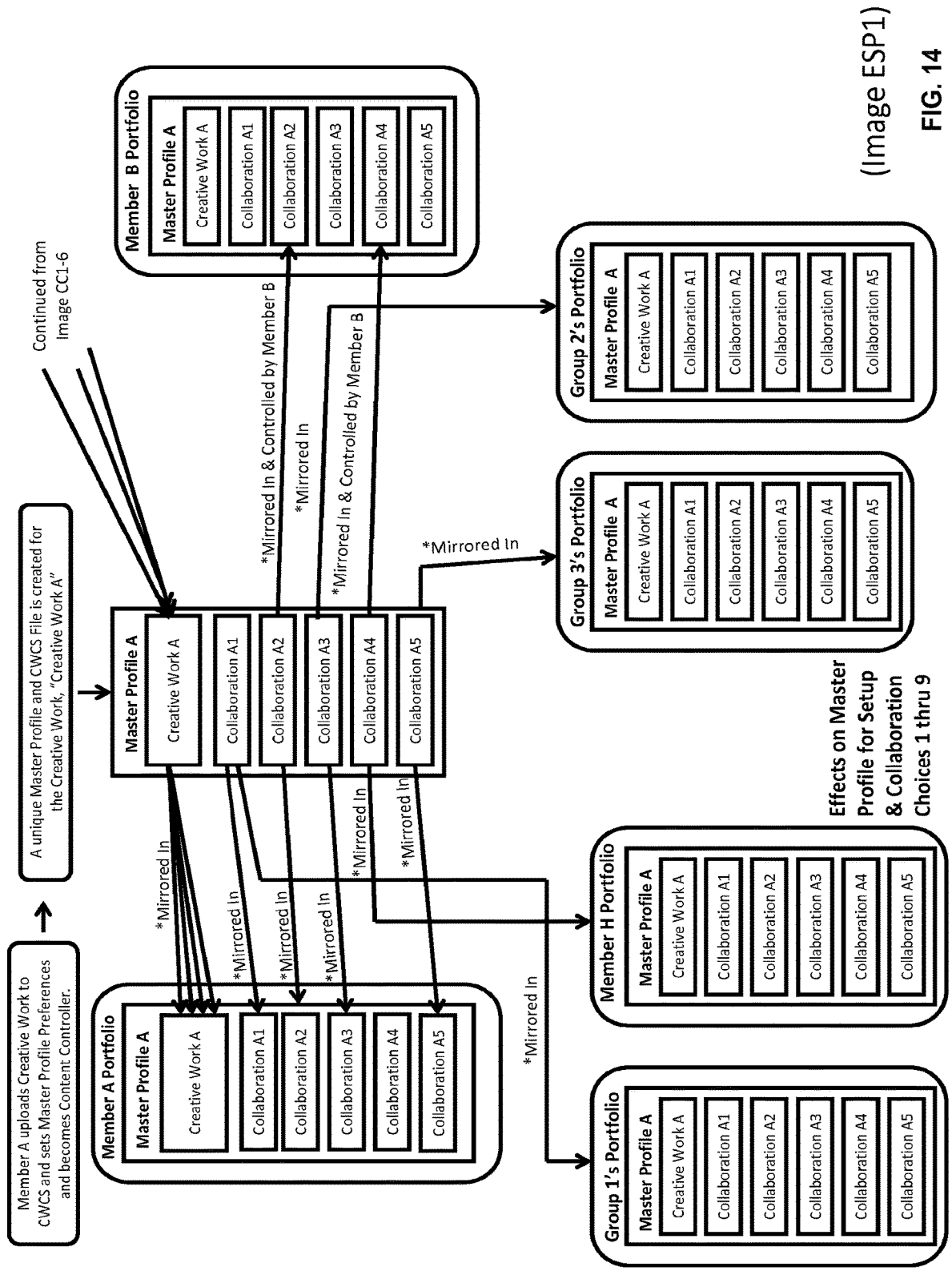
FIG. 14 is a diagram according to an exemplary embodiment, illustrating still another example of collaboration choices.

According to an exemplary embodiment of Example 6 illustrated by FIG. 13, Member A had set the Working Profile Preferences for Collaboration A2 to make Member B the Content Controller for Collaboration A2 as described in Example 5. Member B made Collaboration A2 "Open to Collaboration" in the Working Profile Preferences for Collaboration A2. The Content Controller/Member B makes the Collaboration A2 Open to Collaboration. Member H searches the community to find a Creative Work to collaborate on. Next, Member H contacts the Content Controller/Member B about collaborating on Collaboration A2 with the Content Controller/Member B. Next, the Content Controller accepts the invitation to collaborate with Member H and the Content Controller/Member B sets the Working Profile Preferences and makes "Member H" a Content Participant. Next, Member H/Content Participant reviews the Working Profile Preferences. Referring now to the exemplary embodiment of FIG. 14, the Creative Works Collaboration System generates Collaboration agreements for all the members based on the Working Profile Preferences. Next, both the Content Controller and the Content Participants receive links to e-sign the Collaboration agreements. Both the Content Controller and the Content Participants review and e-sign the Collaboration agreements, which, in some preferred embodiments, is stored in the Creative Works Collaborative System and presented to Member H/Content Participant online.

In some preferred embodiments, Member H/Content Participant executes the Collaboration Agreement document digitally. In some preferred embodiments, the execution of the Collaboration Agreement is authenticated via software, such as via software similar to that of e-Original. In some preferred embodiments, the execution of the Collaboration Agreement is authenticated via mail or post.

At this point, in some embodiments, two actions happening substantially simultaneously or in parallel in some embodiments: (i) the collaboration agreement, in this example, is attached to Creative Work A as Collaboration A4 in the Master Profile A, and (ii) a Working Profile is created for Member H/Content Participant and the Content Controller/Member B. Next, Member H/Content Participant and the Content Controller/Member B complete the collaboration and a new incarnation/rendition of Collaboration A2 is created, "Collaboration A4." The new rendition is locked and added to Master Profile A. Next, all collaborated projects are automatically made Released. Finally, the Master Profile A is mirrored in all collaborators portfolios. (Note that in this example the Member B/Content Controller for Collaboration A2 has now become the Content Controller for 'Collaboration A4 as well.) Now referring again to FIG. 10, Master Profile A includes the new Collaboration A4 as part of Master Profile A. (Note that in Example' 8 the Master Profile A will only include Creative Work A, Collaboration A1, Collaboration A2, Collaboration A3 and Collaboration A4 listed in the diagram). The Content Controller/Member B has Collaboration A4 mirrored in that member's Member Portfolio. Member H/Content Participant also shows the new Collaboration A4 in the Master Profile A mirrored in that member's Member Portfolio. Note a stand-alone Master Profile or a mirrored Master Profile in a Members Portfolio, display the Creative work and all renditions of that Creative work.

Example 9

According to an exemplary embodiment of Example 9 illustrated by FIG. 13, Member A had set the Working Profile Preferences for Collaboration A3 to be "Open to Collaboration." The Content Controller/Member A makes Collaboration A3 Open to Collaboration. Group 3 searches the community to find a Creative Work to collaborate on. Next, Group 3 contacts the Content Controller/Member A about collaborating on Collaboration A3. Next, the Content Controller/Member A accepts the invitation to collaborate with Group 3 and the Content Controller/Member A sets the Working Profile Preferences and makes "Group 3" Content Participants. Now referring to FIG. 14, the CWCS generates Collaboration agreements for all the members based on the Working Profile Preferences. Next, both the Content Controller and the Content Participants receive links to e-sign the Collaboration agreements.

Both the Content Controller and the Content Participants review and e-sign the Collaboration agreements, which, in some preferred embodiments, is stored in the CWCS and presented to Group 3/Content Participants online. In some preferred embodiments, Group 3/Content Participants execute the Collaboration Agreement document digitally. In some preferred embodiments, the execution of the Collaboration Agreement is authenticated via means such as those used by e-Original (See eoriginal.com.) In some preferred embodiments, the execution of the Collaboration Agreement is authenticated via mail or post.

In some embodiments, two actions happen substantially simultaneously or in parallel: (i) the collaboration agreement, in this example, is attached to Creative Work A as Collaboration A5 in the Master Profile A, and (ii) a Working Profile is created for Group 3/Content Participants and the Content Controller. Next, Group 3/Content Participants and the Content Controller/Member A complete the collaboration and a new incarnation/rendition of Collaborations A3 is created, "Collaboration A5." The new rendition is locked and added to Master Profile A. Now, all collaborated projects are automatically made Released. Finally, the Master Profile A is mirrored in all collaborators portfolios.

Now referring again to FIG. 10, Master Profile A includes the new Collaboration A5 as part of Master Profile A. (Note that in Example 9 the Master Profile A will only include Creative Work A, Collaboration A1, Collaboration A2, Collaboration A3, Collaboration A4 and Collaboration A5 listed in the diagram.) The Content Controller/Member A has Collaboration A5 mirrored in their Member Portfolio. Group 3/Content Participants also show the new Collaboration A5 in the Master Profile A mirrored in their Member Portfolio. Note a stand-alone Master Profile or a mirrored Master Profile in a Members Portfolio, display the Creative work and all renditions of that Creative work.

In some embodiments, a Member Portfolio has the potential to have multiple or even an infinite number of Master Profiles mirrored in the Member Portfolio. According to an exemplary embodiment illustrated by FIG. 15, a Master Profile's Mirrored on Members Portfolio Example, three Member Portfolios and the eight unique Master Profiles ranging from 1 to 95,012 are mirrored in their Member Portfolios. For Example: In Master Profile 1 Jack Doe collaborated on Collaboration's 1, 2, and 3. Jane Doe collaborated on Collaboration 1. In Master Profile 3, Jack Doe and Jane Doe created the Creative Work for this Master Profile. In Master Profile 56, Jack Doe was involved in creating Creative Work, Collaboration 2, and Collaboration 3. Jane Doe was involved in creating Collaboration 4. In Master Profile 115, Jack Doe was involved in creating Collaboration 2 and Jane Doe was involved in Collaboration 2. In Master Profile 542, Jane Doe was involved in creating Collaboration 1. In Master Profile 956, Jack Doe was involved in creating Collaboration 2. John Doe was involved in creating the Creative Work, Collaboration 2, and Collaboration 3. Jane Doe was involved in creating Collaboration 3. In Master Profile 10,254, Jane Doe was involved in creating the Creative Work and Collaboration 3. In Master Profile 95,012, John Doe was involved in creating Collaboration 3 and Collaboration 4. Jane Doe was involved in creating the Creative work, Collaboration 1, 3, and 4.

As described herein, the CWCS may include or operate with a negotiation engine (NE) to assist one or more CWCS users in the negotiation of a right, duty, or other aspects of a Collaborative Work, Source Work, or other aspects of a Collaboration.

The NE is configured to provide one or more user interfaces, processing and/or data management functions for allowing a CWCS user to negotiate on various matters relating to a Collaboration or proposed Collaboration with one or more other CWCS users. In certain embodiments, the user interfaces, processing and/or data management functions of the NE are configured to allow multiple CWCS users or groups of users to negotiate together with one or more other users or groups of users. In certain embodiments, the user interfaces, processing and/or data management functions of the NE are configured to allow one or more CWCS users to negotiate with network users or entities outside of the CWCS.

In particular embodiments, the NE may include software, hardware, firmware, or combinations thereof, in the server 10 or one or more of the user devices 12 (FIG. 1), that controls one or more processors in the server 10 or user device(s) 12, to perform functions of the NE described herein. In particular embodiments, the NE includes software stored on the user device(s) 12, or software stored at the server 10 and downloaded to one or more of the user device(s) 12. In other embodiments, the NE software, hardware, firmware or combinations thereof reside on one or more network devices and is accessible by the server 10 and/or user devices(s) 12 over the communication network.

In some embodiments, the NE is included in or is external to the CWCS, and interfaces with and functionally operates in association with one or more components of the CWCS, including without limitation, one or more Working Profile, one or more Agreement Engines, and/or one or more databases as described herein. In some embodiments the NE is configured to interface and/or functionally operate in association with one or more systems and/or databases that are not a part of CWCS (such as, but not limited to a third-party database, a crowdfunding website or computer system, a crowdsourcing website or a third party computer system).

In some embodiments, for example, the NE interfaces and/or functionally operates in association with one or more components of one or more Working Profile Preferences and allows one or more users to create settings and create an online negotiation environment that may include, without limitation, offers and/or ongoing or updated status of negotiations between users or others regarding a Work, a Collaboration, equitable ownership of a Collaboration or a Work, and/or one or more parts thereof (e.g., stock or membership ownership), payments to a collaborator or one or more other persons, rights, collaboration work distribution details, one or more contracts or other agreements or covenants, etc.

It is to be understood that the NE engine can be configured to assist users of the CWCS and/or persons or entities (including without limitation, other network-connected users and systems) to negotiate any aspect of a Collaboration or related matter that is amenable to human, automated or partially automated negotiation, including without limitation, terms that define or are otherwise associated with one or more of the following negotiation scenarios:

(i) financing creation, completion, modification, promotion or other aspects of one or more Collaboration Works;

(ii) capitalization of a Collaboration Work (such as, but not limited to a collaborative creation of a company or business project);

(iii) non-financial aspects of the creation of a Collaboration Work or other work, or portions thereof (including, without limitation, artistic requirements or preferences, the timing of completion of a Collaboration Work or a defined portion thereof, or the like);

(iv) ownership, licensing and/or usage of a Collaboration Work or other work or portions thereof;

(v) exploitation or other use (or rights associated therewith) of one or more Collaboration Works, other works, or portions thereof; or (vi) enforcement of rights associated with one or more Collaboration Works, other works, or portions thereof.

In some embodiments, such assistance includes providing one or more user interfaces, for allowing a user to select or enter terms, or information associated with terms to the CWCS. Such interfaces may include, but are not limited to, one or more display screens that are displayable on a user device 12 and that provide selectable items (selectable text, icons, soft buttons, or the like), menus of selectable items or fields, or other input mechanisms for entering information in the form of text, images, audio, video or combinations thereof. In particular embodiments, the NE may include and provide one or more display screens for each of one or more selectable negotiation scenarios such as, but not limited to, scenarios (i)-(vi) listed above. Each of such display screens may include selectable text, icons, soft buttons, or the like, menus of selectable items and/or information that relates to a specific negotiation scenario. The display screen(s) associated with any (or each) of the above scenarios (i)-(vi) or other suitable scenarios, may also include text, links to audio or video information or the like, that explains one or more (or each) of the selectable negotiation scenario options.

In particular embodiments, one or more display screens are provided for allowing a CWCS user to select or create terms associated with the desired negotiation scenario. For example, a first display screen may provide a user with a plurality of selectable items (icons, a menu of items or the like) to identify a desired negotiation scenario. In particular embodiments, the plurality of selectable scenario items may include an icon or other selectable item associated with some (or each) of the above-listed scenarios (i)-(vi). In other embodiments, selectable scenario items (icons, a menu of items or the like) may include other negotiation scenarios (other than those described above as example scenarios (i)-(vi)). In particular embodiments, the first display screen (or other display screens) may also allow the CWCS user to specify one or more other CWCS users (or other network users outside of the CWCS) as another party to the negotiation.

Once a user selects a scenario item from the plurality of selectable scenario items, the user is provided with one or more further display screen(s) associated with the selected scenario item. The further display screen(s) display a plurality of selectable text, icons, soft buttons or the like, associated on a one-to-one basis with a corresponding plurality of different options for terms relating to the selected scenario item. The further display screen(s) may also include one or more fields in which the user may enter text to define one or more terms that may not be associated with any of the selectable text, icons, soft buttons, or the like.

Thus, one or more further display screen(s) associated with scenario (i), above may include a plurality of selectable text, icons, soft buttons or the like, associated on a one-to-one basis with a corresponding plurality of different options for financing terms. Similarly, one or more further display screen(s) associated with scenario (ii), above may include a plurality of selectable text, icons, soft buttons or the like, associated on a one-to-one basis with a corresponding plurality of different options for terms for capitalization.

Similarly, one or more further display screen(s) associated with scenario (iii), above may include a plurality of selectable text, icons, soft buttons or the like, associated on a one-to-one basis with a corresponding plurality of different options for terms for artistic requirements, timing requirements, or the like (including, but not limited to: artistic genre, size or duration of a Collaborative Work or a specified portion thereof, completion dates or specified time of completion in hours, days, weeks, months, or years.

Similarly, one or more further display screen(s) associated with scenario (iv), above may include a plurality of selectable text, icons, soft buttons or the like, associated on a one-to-one basis with a corresponding plurality of different options for terms for ownership, licensing and/or usage rights, or the like (including, but not limited to: defining percentages or other divisions of shared ownership in portions or all of a Collaborative Work, defining portions of a Collaborative Work that are owned by particular users or entities, license royalties, limitations on licensed use or publication of a Collaborative Work.

Similarly, one or more further display screen(s) associated with scenario (v), above may include a plurality of selectable text, icons, soft buttons or the like, associated on a one-to-one basis with a corresponding plurality of different options for exploitation or other use of a Collaborative Work, including, but not limited to: one or more specified modes of exploitation (such as but not limited to: licensing, sales of copies, sale of copyright), one or more specified sales venues (such as but not limited to: one or more specified stores, distributors and/or distribution channels), one or more time periods for exploitation (such as specified in hours, days, weeks, months, or years).

Similarly, one or more further display screen(s) associated with scenario (vi), above may include a plurality of selectable text, icons, soft buttons or the like, associated on a one-to-one basis with a corresponding plurality of different options for terms for enforcement (including, but not limited to: terms specifying one or more lawyers or law firms to handle enforcement, which user(s) is (are) to share in any proceeds resulting from an enforcement action and the amount (percentage, or other division) of sharing of such proceeds among users, which user(s) is (are) responsible for financing enforcement actions, for managing an enforcement action, for determining whether or not to proceed with enforcement.

In particular embodiments, a first CWCS user may select one or more term options from a plurality of different options for terms associated with a selected negotiation scenario, by selecting display screen icons as discussed herein. The first CWCS user may propose one or more of those terms to one or more further CWCS user (or other network users outside of the CWCS) by communicating the selected negotiation term(s) to the one or more further CWCS users (or other network users), over the network. For example, the further CWCS user may be provided with a display screen (on a user device 12) that provides information corresponding to (or identical to) the term(s) selected by the first CWCS user. In particular embodiments, the CWCS allows the further CWCS user (or other network users) to alter the negotiation term(s), for example, by deleting, replacing or modifying the text of the term(s) selected by the first CWCS user. The further CWCS user (or other network users) may be provided with access to selectable text, icons, soft buttons or the like, associated on a one-to-one basis with the same or another set of options for terms corresponding to the negotiation scenario selected by the first CWCS user, and may select one or more of those options to modify or replace one or more terms proposed by the first CWCS user. Alternatively, or in addition, the further CWCS user (or other network users) may be allowed to enter text (via a keyboard or the like) to modify, delete or add to one or more terms proposed by the first CWCS user.

In such embodiments, the CWCS provides the first CWCS user with the modified (or otherwise changed) term(s) from the further CWCS user (or other network users), for example, like how the term(s) were (was) initially provided to the further CWCS user (or other network users). In this manner, the CWCS allows the first CWCS user and the further CWCS user (or other network users) to communicate one or more proposed terms and revisions between each other (or back and forth to each other) until the term(s) appear acceptable to both the first CWCS user and the further CWCS user, or until one or both parties disengage from the negotiation. In other embodiments, the CWCS allows the further CWCS user to make only one round of revisions (or a specified number of rounds of revision), after which the revised term(s) is (are) provided to the first CWCS user to accept or refuse. In that embodiment, if the first CWCS user refuses the revised version of the term(s) provided by the further CWCS user, then the negotiation is automatically terminated.

In some embodiments of the invention, assistance is provided by tracking or otherwise recording the elements, components, steps, rounds or progress of the negotiation. For example, the CWCS may store each version of the proposed term(s) communicated between the first CWCS user and the further CWCS user (or other network users) as discussed above. In such embodiments, the stored versions may be accessible, through the CWCS, by a specified one or more (or each) of the first CWCS user and the further CWCS user (or other network users). Such access can allow a user to view the history and progress of a negotiation and, in some instances, to retrieve an earlier version of one or more terms.

In particular embodiments, the CWCS automatically protects the above-discussed negotiation communications between users by implementing suitable security measures, such as but not limited to encryption of some or all of the negotiation content communicated between users, limiting access of negotiation communications to users (the first CWCS user and each further CWCS user) having a specified authority title or level, password, biological condition detectable by biosecurity, geographic location, IP address, or other predefined characteristics, or any combination thereof. Alternatively or in addition, other suitable means of privacy protection, online security, digital document security and/or computer security may be employed in connection with such communications.

The NE engine may, in some embodiments, such as when used in association with the Agreement Engine (AE), provide one or more CWCS users (or network users outside of the CWCS) associated with the Collaboration, with one or more templates of contracts, or parts thereof. In particular embodiments, CWCS users (or network users outside of the CWCS) may be provided with access to user-selectable, or CWCS system-selectable template contract provisions. For example, the CWCS may include or operate with a database of pre-stored contract templates or portions of contract templates (templates for contract terms, contract sections, or the like), where each template includes text for a complete contract term, contract section or complete contract.

In further embodiments, some or each template includes text for a contract term, contract section or complete contract, where one or more portions of the term, section or contract is not completed (or not fully completed), to allow the user to enter additional information to complete that portion of the term, section or contract, to form a complete term, section or contract. The template portion not completed may be, for example, a portion that specifies a particular value, share amount, percentage, money amount, name, address, title, or the like.

In particular embodiments, one or more display screens are provided for allowing a CWCS user to select a desired contract type. For example, one or more first display screens may provide a user with a plurality of selectable items (icons, a menu of items or the like) that identify a corresponding plurality of types of contracts, such as, but not limited to, assignment and ownership contracts, joint development contracts, distribution contracts, or the like. Alternatively or in addition, the first display screen(s) may provide a user with a plurality of selectable items that identify a corresponding plurality of types of contract terms, such as, but not limited to, assignment of rights terms, ownership terms, confidentiality terms, payment terms, arbitration terms, or the like. In such embodiments, the CWCS user may select a desired contract or one or more desired contract terms by selecting the corresponding selectable item on the first display screen. In response to a selection, the CWCS provides the CWCS user with an editable template corresponding to the selected contract or contract term(s).

In that manner, the CWCS user may obtain a contract template (or form a contract template with one or more contract term templates). In particular embodiments, the CWCS user may perform other operations with that template, including, but not limited to storing the template in an electronic storage device associated with (in or otherwise accessible to) the user device 12, printing the template, transmitting the template by email or otherwise, or the like. The CWCS user may edit the contract template and form a proposed contract to present to one or more other CWCS users (or network users outside of the CWCS).

In certain embodiments, the CWCS user may selectively send the contract to other CWCS users (or other network users). In other embodiments, the CWCS user may post the contract in an electronic forum accessible by other CWCS users (or other network users), or accessible by a predefined limited group of CWCS users (or a predefined limited group of other network users). In particular embodiments, the predefined other CWCS user or group may be defined by the CWCS user that forms the draft contract. For example, the first display screen (or another display screen) may allow the CWCS user to specify one or more other CWCS users (or other network users outside of the CWCS) as another party (or potential party) to the contract. In such example, the CWCS may automatically send a completed draft contract to each CWCS user or group of users specified as being another party (or potential party) to the contract, for example, upon completion of a draft contract from templates and/or upon entry of an input (defined keystroke, icon selection or the like) by the CWCS user that indicates that the draft contract is complete and ready to distribute to other parties or potential parties.

In some embodiments of the invention, assistance is provided by tracking or otherwise recording the versions, edits, and progress of the development of a contract. For example, the CWCS may store each version of the proposed contract, where the stored versions may be accessible, through the CWCS, by a specified one or more (or each) of the CWCS users (or other network users) who are a party (or proposed party) to the contract. Such access can allow a user to view the history and progress of the development and editing of a contract and, in some instances, to retrieve an earlier version of the contract. Accordingly, in some embodiments, the CWCS, through the use of the NE and/or the Agreement engine, can provide partial and/or full, draft, version and/or final, contract assembly, as well as tracked or recorded sequential agreement or contract drafts, sequential negotiation progress, and the like.

In particular embodiments, the NE and/or the AE is configured to accumulate results of negotiations (including final versions of a plurality of negotiated terms) and combine them to form a draft contract or agreement. In further embodiments, the NE and/or the AE retrieve one or more contract templates or contract term templates and incorporates the results of negotiations (including final versions of a plurality of negotiated terms) into such templates to form the draft contract or agreement. Thus, the NE and/or the AE may be configured to create one or more provisional, draft or final contracts or agreements based on the results of negotiations.

In some embodiments, the NE and/or the AE can be configured to transmit a draft, progress recordation, negotiation tracking data, or another version of one or more such agreements, partial agreements, drafts, or the like, to an attorney or other service provider for review, legal assistance, negotiation assistance, determining compliance with the law, editing, or the like. In such embodiments, the aforementioned attorney or other service providers need not be a user of the CWCS or a part of negotiation regarding a Collaboration. In particular embodiments, the CWCS automatically protects such communications with attorneys or other service providers, by implementing suitable security measures, such as but not limited to encryption of some or all of the contract data communicated to or from the attorney or other service provider, limiting access of contract data to attorneys or service providers having a specified authority title or level, password, biological condition detectable by biosecurity, geographic location, IP address, or other predefined characteristics, or any combination thereof. Alternatively or in addition, other suitable means of privacy protection, online security, digital document security and/or computer security may be employed in connection with such communications.

Accordingly, particular embodiments of the present invention include configurations of the NE that provide transmission of negotiation data and Collaboration-related agreements or contracts generated within the CWCS, to one or more persons or entities outside the CWCS, in a secure fashion. In some embodiments of the invention, one or more draft and/or final agreements that are created by or with the CWCS are created using the Agreement Engine.

In some embodiments, the NE can be configured to enable one or more CWCS users to finalize a negotiation or designated part thereof. In particular embodiments, the NE can be configured to enable one or more users to finalize a negotiation or part thereof at one or more predetermined times. In some embodiments, the NE can be configured to be selectively reopened for additional or future negotiations or can be selectively closed to future negotiations. In particular embodiments, one or more of the CWCS users (such as but not limited to the first CWCS user in the above-described examples) is provided with authority to selectively open or close the NE for future negotiation of a particular agreement or contract, once the agreement or contract has been drafted.

In some embodiments the NE can be used by one or more CWCS users with one or more other CWCS users, one or more non-CWCS network users, and/or one or more virtual entities or automated devices or systems. In some embodiments the NE can be used by one or more virtual entities or automated devices or systems (for example, on behalf of one or more CWCS users) and one or more other users, one or more non-CWCS network users, and/or one or more virtual entities or automated devices or systems. In some embodiments, one or more avatars may operate as users that interact with the NE or with other users through the NE.

In some embodiments, the NE provides an audio and/or visual interface for users to interact to conduct negotiations using the NE. Such interfaces include, without limitation, video-conferencing systems, including without limitation multi-party video-conferencing systems. In some embodiments, the NE provides a virtual world negotiation environment in which one or more users may conduct negotiations (such as described above) through digital avatars or other digital representations of the one or more users. In such embodiments, such digital representations may appear on the display screen provided to one or more users (or each of the users) involved in a negotiation through the NE.

In some embodiments, the NE may be accessed and employed by a single user, for example, to create offer documents, proposed negotiation terms, and/or templates for an offer, negotiation terms or a contract. In some embodiments, the NE records or otherwise saves all or a predetermined part of negotiation information (such as but not limited to, each version, draft, commentary communications or final draft of a term, contract or agreement) for each negotiation relating to a particular Collaborative Work, in the Master Profile for the Work.

In some embodiments, the NE operates to assist an individual online negotiation in one or more Working Profiles. In some other embodiments, the NE operates to assist with multiple negotiations, simultaneously, in association with one or more Collaborations and/or one or more Working Profiles. For example, and without limiting the foregoing, one negotiation assisted by the NE for a Collaborative Work may be directed to negotiating ownership rights or other matters pertaining to the Collaborative Work or one or more parts thereof, while another negotiation (e.g., relating to the same Collaborative Work or another Collaborative Work) may be directed to payment for participation in the creation or exploitation of a Collaborative Work.

In some embodiments, the NE provides an interactive online platform for blind bid negotiations. For example, and without limiting the foregoing, if an Initiator sets up a Working Profile for a Collaboration and such Initiator wants only one person to collaborate on the subject Collaboration project, but there is or might be a plurality of responding users for the Initiator to select from, the Initiator may configure the NE to allow the plurality of users to submit a blind negotiation bid so the Initiator can select which user will be authorized to participate in the Collaboration. In such embodiments, the NE may be configured to receive input from one or more responding users, where the input corresponds to a bid amount or other information associated with a bid. In particular embodiments, such other information may include qualification information, text, narrative explanation, audio data, video data or combinations thereof, that explain or show a level of talent or other characteristics of the responding user, that may assist the Initiator to select a responding user (or reject a responding user) for participation in the Collaboration.

In some embodiments, the CWCS, or parts thereof, such as the NE, is(are) configured to interface with a third party, or non-CWCS user, databases, systems, websites, etc. For example, and without limiting the foregoing, in some embodiments, the NE is configured to interface with non-CWCS entities, such as but not limited to non-CWCS websites, systems and databases such as one or more crowdfunding websites, one or more crowdsourcing websites, one or more databases providing CCE-useful Information (as that term is defined below), one or more virtual or cryptocurrency systems (e.g., Virtual Money, Bitcoin, etc.), one or more online gaming platforms, and/or one or more online virtual world systems. In some embodiments, the CWCS provides currency exchange calculations for cost evaluations, payouts to one or more persons when the CWCS is used as a payment facilitator. In some embodiments the CWCS interfaces with one or more non-CWCS collaboration platforms, engines, collaboration tools, and/or rights licensing utilities, etc. In particular embodiments, the CWCS is configured to post requests for collaboration, requests for funding, transfer funds for payments, and perform other tasks through such interfaces with non-CWCS entities, based on terms of a completed contract that has been negotiated, stored or otherwise included in the CWCS in association with a Collaborative Work.

In some embodiments, the NE send offers and/or other negotiation invites to potential collaborators, which, in some embodiments of the invention comprise initial negotiation offers or options. In some embodiments of the NE, the NE includes, but is not limited to, a Settlement Moderator Engine (SME) or a plurality of SMEs. The SME allows users who have used the NE to create an agreement to use the SME to settle a dispute that may arise in the collaboration of a Work in accordance with pre-agreed upon terms. In some embodiments, the CWCS creates or otherwise generates one or more agreements for one or more Collaborators and/or potential Collaborators. In particular embodiments, one or more such agreements are created by one or more AEs.

An AE may include software, hardware, firmware, or combinations thereof, in the server 10 or one or more of the user devices 12 (FIG. 1), that controls one or more processors in the server 10 or user device(s) 12, to perform functions of the AE described herein. In particular embodiments, the AE includes software stored on the user device(s) 12, or software stored at the server 10 and downloaded to one or more of the user device(s) 12. In other embodiments, the AE software, hardware, firmware or combinations thereof reside on one or more network devices and is accessible by the server 10 and/or user devices(s) 12 over the communication network. In particular embodiments, the AE configures an associated processor to generate one or more agreements pertaining to, or otherwise associated with, one or more Collaborations, one or more Collaborative Works, and/or one or more related matter.

In some embodiments of the invention, the creation of one or more agreements pertaining to, or otherwise associated with, one or more Collaborations, one or more Collaborative Works, and/or one or more related mattes, is itself a Collaboration directed to the creation of one or more Collaborative Works comprising said one or more agreements. An "agreement collaborative work" ("ACW") comprising the agreement to create one or more other Collaborative Works, is, in some embodiments of the invention, generated in addition to one or more other Collaborative Works that is/are the subject of one or more ACWs.

In some embodiments of the invention, the AE can but is not required to, automatically generate a copyright application regarding the ACW. In such embodiments, the AE may generate a copyright application document, by populating a pre-stored copyright application template with information obtained by one or more users, including, but not limited to one or more of copyright work author name and address, copyright owner name and address, date of origination, date of publication, copyright work title and appropriate specimens of copyright work to include in the copyright application. The AE may seek copyright owner approval and signature (electronic signature or hand signature) on a completed copyright application, via one or more network communications. Upon receipt of such approval and signature, the AE may communicate the application to an appropriate law office, or other service providers for filing with an appropriate copyright office (such as, but not limited to the U.S. Copyright Office), or maybe configured to communicate the application directly to the appropriate copyright office.

In some embodiments, the AE will track and keep a record of any existing agreement to which a user of the CWCS is a party. In some embodiments, AE will compare and verify one or more newly generated agreements with pre-existing agreements relating to a particular Collaboration, Collaborative Work, party or user, for potential conflicts with another ACW or another existing agreement associated with the particular Collaboration, Collaborative Work, party, user or other aspects of the CWCS.

In some embodiments of the invention, ACWs are generated through the use of one or more AEs (individually or collectively referred to herein as the AE). In some embodiments, the AE is configured to search for, acquire and incorporate into the ACWs user-selected or desired, or AE-suggested, clauses and/or other provisions for the subject ACW(s). In some embodiments the AE stores copies of ACWs or parts thereof. In still other embodiments the AE stores versions of the ACW created, during the process of creating the ACW.

In some embodiments, the AE is configured to enable a CWCS user to choose from and use provisions stored in one or more databases associated with the AE, including, but not limited to provisions associated choice of laws provision(s), provisions addressing contractual integration issues, liquidated damages provisions, or the like. For example, in particular embodiments, the AE is configured to provide one or more user interfaces, for allowing a user to select or enter input corresponding to user selections, search terms or other information that the AE employs in the performance of operations described herein. Such interfaces may include, but are not limited to, one or more display screens that are displayable on a user device 12 and that provide selectable items (selectable text, icons, soft buttons, or the like), menus of selectable items or fields, or other input mechanisms for entering information in the form of text, images, audio, video or combinations thereof.

For example, and without limiting the foregoing, in certain embodiments, the AE is configured to provide one or more display screens are provided for allowing a CWCS user to select or create contract templates, contract clauses or sections, or the like, for a desired contract type. The AE may provide one or more display screens, where each display screen may include one or more selectable text, icons, soft buttons, or the like, menus of selectable items and/or information that relate to types of contracts, contract clauses or sections, tutorial or explanatory information regarding types of contracts or contract clauses or sections, or the like.

For example, one or more first display screens may show and provide a user with a plurality of selectable items (icons, a menu of items or the like), where each selectable item is associated with and/or identifies a desired type of contract, type of contract clause or section, or the like. Alternatively or in addition, the first display screen may provide a field or other mechanism for entering search information, such as, but not limited to, search terms, words or phrases associated with or likely included in a type of contract or contract clause or section of interest.

In such embodiments, the AE may be configured to provide one or more second display screens, in response to a user selection of a selectable item and/or entry of search information on the first display screen(s). The one or more second display screens include at least one display screen having a contract, contract clause or section, or template for the same, tutorial or explanatory information for same, or any combination thereof, corresponding to the selectable item and/or search the information that is associated with and/or identifies a desired type of contract, clause, section, or the like.

In such embodiments, the AE may include or operate with one or more databases which store items including contracts, contract clauses or sections and templates, therefore, for contracts of different types, where the AE (or database(s)) associates each stored item with a corresponding user-selectable item of the first display screen(s). Items in the database(s) may be pre-stored and may include sample items drafted by persons of suitable authority, experience, and skill relating to the subject matter of the item. Alternatively or in addition, the database(s) may learn, include and store new or revised items that are drafted or received from a CWCS user in connection with a negotiation or contract developed in the AE or NE. In such embodiments, the AE or NE may be configured to store additional items in the database(s), as such items are received from a CWCS user, e.g., through the AE or NE.

The AE may be configured to retrieve one or more associated stored items associated with the user-selectable item of the first display screen(s), and display the retrieved item(s) on the second display screen(s), in response to a user selecting a corresponding user-selectable item on the first display screen(s). Alternatively or in addition, the AE may include or employ a search algorithm that searches database entries for particular words, phrases or other information that a user may enter into a search field or other search input mechanism as described above.

In that manner, the CWCS user may obtain a complete contract or complete clause or section of a contract, or a template for a contract, contract clause or section, or the like. In particular embodiments, the CWCS user may perform other operations with that information, including, but not limited to storing the information in an electronic storage device associated with (in or otherwise accessible to) the user device 12, printing the information, transmitting the information by email or otherwise, or the like. The CWCS user may edit the information and form a proposed contract to present to one or more other CWCS users (or network users outside of the CWCS). In certain embodiments, the CWCS user may selectively send the contract to other CWCS users (or other network users). In other embodiments, the CWCS user may post the contract in an electronic forum accessible by other CWCS users (or other network users), or accessible by a predefined limited group of CWCS users (or a predefined limited group of other network users). In particular embodiments, the predefined other CWCS user or group may be defined by the CWCS user that forms the draft contract. For example, the first display screen (or another display screen) may allow the CWCS user to specify one or more other CWCS users (or other network users outside of the CWCS) as another party (or potential party) to the contract. In such example, the CWCS may automatically send a completed draft contract to each CWCS user or group of users specified as being another party (or potential party) to the contract, for example, upon completion of a draft contract from templates and/or upon entry of an input (defined keystroke, icon selection or the like) by the CWCS user that indicates that the draft contract is complete and ready to distribute to other parties or potential parties.

In particular, the AE is configured to assist with the CWCS user with drafting a contract, clause or section of a contract, or a template for a contract, contract clause or section, or the like, by employing and accessing one or more databases which store items including contracts, contract clauses or sections and templates, therefore, as described herein. In certain embodiments, each of the items stored in the database(s) (e.g., each contract, contract clause or section, and/or each template) is associated with or contains one or more key terms or phrases. A key term or phrase may include one or more predefined words, typographical symbols, combinations of words or symbols (or both), predefined combinations of words or symbols occurring in series, predefined combinations of words or symbols occurring within a predefined number of words or symbols of each other, or predefined combinations of words or symbols occurring in the same paragraph, document or section of a document. The AE may be configured to perform syntax association, or other suitable processes, to recognize or identify such key terms or phrases in items stored in the database(s), such that the AE may identify one or more of such items (e.g., contracts, contract clauses or sections, and/or templates) that contain one or more of such key terms or phrases.

In addition, the AE or NE may be configured to receive and detect input from a CWCS user corresponding to one or more user-selected keywords, symbols or phrases. In particular embodiments, the AE or NE provides a user interface (as described herein) to allow the CWCS user to enter the one or more user-selected keywords or phrases, e.g., through a user device 12. The AE or NE receives such one or more user-selected keywords or phrases entered by the user. Alternatively, or in addition, the AE or NE may be configured to automatically recognize one or more keywords or phrases being used by a CWCS user in one or more communications with one or more other users (such as but not limited to, negotiation communications through the NE or AE). For example, the AE or NE may be configured to conduct a syntax evaluation (or another suitable process) on content (messages, communications with other CWCS users, draft clauses, draft contracts, draft templates or other information received from a CWCS user through the AE or NE) and detect one or more keywords or phrases used in such content.

The AE or NE may be configured to identify and select one or more items (e.g., contracts, contract clauses or sections, and/or templates) from the database(s) that include or are otherwise associated with the one or more keywords or phrases entered by the user, or recognized as being in one or more communications between CWCS users. The AE or NE may be configured to display the one or more selected items to the user, e.g., on a user device 12 (or display, on the user device 12, a menu of icons, descriptive information or other information associated with each selected item, from which a user may select one or more of the selected items).

In some embodiments of the invention, assistance is provided by tracking or otherwise recording the versions, edits, and progress of the development of a contract. For example, the CWCS may store each version of the proposed contract, where the stored versions may be accessible, through the CWCS, by a specified one or more (or each) of the CWCS users (or other network users) who are a party (or proposed party) to the contract. Such access can allow a user to view the history and progress of the development and editing of a contract and, in some instances, to retrieve an earlier version of the contract. Accordingly, in some embodiments, the CWCS, through the use of the NE and/or the Agreement engine, can provide partial and/or full, draft, version and/or final, contract assembly, as well as tracked or recorded sequential agreement or contract drafts, sequential negotiation progress, and the like.

In particular embodiments, the AE may be configured to accept entries from a CWCS user to store in the one or more databases of contracts, contract clauses, sections, tutorials, and templates, therefore, for future access by the same CWCS user or access by one or more other CWCS users. In certain embodiments, the AE is configured to accept entries from any CWCS user. In other embodiments, the AE is configured to accept entries only from pre-defined CWCS users (such as certain CWCS users that are approved by a CWCS administrator, or the like).

In some embodiments of the invention, users that provide clauses or other entries into the AE database are provided with a credit or another type of reward or compensation. In some embodiments, the AE dynamically creates a database of accumulated clauses, statements, contractual language, contracts, templates, tutorials and other information that can be accessed by users of the CWCS to generate one more ACWs.

In some embodiments, the AE is self-learning in that the AE generates suggested clauses or other provisions to propose to users (display by an electronic message on the display screens of a user device 12, or in other manners), while the users are in a process of collaborating through the CWCS to generate an ACW. In some embodiments, the AE is configured to "learn" and record which clauses or other provisions are used frequently, which are used in association with the creation of different types of Collaborative Works.

For example, in such embodiments, the AE can receive user input (or obtain and analyze such input from information entered by the CWCS users in the process of creating an ACWS for a Collaborative Work) to determine a type of Collaborative Work (from among a plurality of predefined types) that is the subject of the ACWS. The AE can retrieve one or more contracts, contract clauses or sections, templates, tutorials or other information from one or more databases, where such retrieved information is associated with the type of Collaborative Work determined to be the subject of the ACWS. In such embodiments, the database(s) may include a plurality of different contracts, contract clauses or sections, templates, tutorials or other information, each associated with a different type of contract. In particular embodiments, the AE is configured to retrieve and display to the CWCS users, one or more contracts, contract clauses or sections, templates, tutorials or other information, clauses or other provisions that are associated with the type of contract that is the subject of the ACWS and/or that the AE has "learned" to be frequently used or associated with the particular type of Collaborative Work for which the ACWs is being created.

In some embodiments, the AE is configured to translate an ACW and/or an ACW in-progress, into another language, such as a non-English language. In some embodiments, the AE is configured to translate the ACW into sign language provided either by the CWCS through a digital display system or by live videoconferencing effectuated by means described in U.S. Pat. No. 7,792,676, which is incorporated herein by reference, in its entirety.

In some embodiments of the invention, the AE is configured to provide to CWCS users a means of diminishing the need for attorneys to negotiate and/or draft agreements of the type may be associated with a Collaboration. In this regard, in some embodiments, the AE collects and arranges clauses and other parts from existing agreements in the CWCS. According to such embodiments, each time a new contract, clause, statement, template or other information is added to the CWCS the AE will analyze and may incorporate some or all of the new contracts, clauses, statements, templates or other information into one or more databases and catalogs them with other contracts, clauses, statements, templates or other information previously stored in the database(s).

It particular embodiments, the Collaborative Matching features described herein may be employed, but are not limited, to provide useful assistance directed to identifying and matching the talents of people, groups, investors, designs, creative works, collaboration, or the like, either in and outside of the CWCS. One or more of the Collaborative Matching features described herein may include, and/or be associated with, a Collaborative Compatibility Engine ("CCE"). In some embodiments, the CWCS, or one or more parts thereof, includes or otherwise interfaces with one or more CCEs to operate as described herein.

A CCE may include software, hardware, firmware, or combinations thereof, in the server 10 or one or more of the user devices 12 (FIG. 1), that controls one or more processors in the server 10 or user device(s) 12, to perform functions of the CCE described herein. In particular embodiments, the CCE includes software stored on the user device(s) 12, or software stored at the server 10 and downloaded to one or more of the user device(s) 12. In other embodiments, the CCE software, hardware, firmware or combinations thereof reside and operate on one or more other network devices, and is accessible by the server 10 and/or user devices(s) 12 over the communication network.

A CCE can be configured to provide, in part, additional efficiency of, or to, the CWCS, users, and/or collaborative efforts resulting from or otherwise involving the CWCS. Such additional efficiency can be provided through the use of one or more computer programs or systems configured to analyze various factors and determine one or more matches based on the factors and analysis. In particular embodiments, the CCE includes or operates with one or more computer (or processor) systems configured as one or more multifactor analytic and/or algorithmic systems.

In particular embodiments, such systems are configured to operate to define, determine, predict, evaluate, track, record, and/or report one or more measures of potential or actual collaborative appropriateness, collaborative goodness of fit, collaborative efficiency, collaborative effectiveness, collaborative success and/or level of collaborative quality, and/or the like, for, or otherwise in regard to, (i) the potential working together, and/or actual, working together, and/or other collaborative work efforts, of two or more persons, such as, without limitation, two or more persons that might potentially collaborate regarding one or more Collaborative Works, persons that already are or have been collaborators, and/or combinations thereof, for the purpose of creating, modifying, exploiting and/or using one or more Collaborative Works, (ii) the likelihood that one or more desired or anticipated collaborations by, between, or in association with the efforts of two or more actual or potential collaborator persons, or one or more combinations of actual and potential collaborator persons, will create, generate, or otherwise produce one or more Collaborative Works (such as, for example, one or more specified desired Collaborative Works, such as Collaborative Works created in association with the use of the CWCS) as desired or anticipated, and/or that such one or more Collaborative Works will comprise, meet, achieve, fit, exhibit, be defined by, and/or otherwise can be characterized by one or more predetermined specifications (e.g., one or more quality levels, functional characteristics, aesthetic characteristics, cost limitations, time constraints, etc.), and/or (iii) one or more collaborative relationships involving one or more actual or potential Collaborative Works. Each of such one or more measures being a "Collaborative Compatibility Level."

The CCE is configured to calculate or otherwise determine one or more Collaborative Compatibility Levels pertaining to two or more persons and/or one or more Collaborative Works, and/or information associated therewith (or a combination thereof).

In particular embodiments, the CWCS is configured to employ the CCE calculated Collaborative Compatibility Level in connection with one or more pre-defined operations of the CWCS. Such one or more pre-defined operations may include, but are not limited to, selecting one or more other CWCS users (or other users) to present to the CWCS user as possible, or potentially appropriate, collaborators for a proposed or ongoing Collaborative Work or collaboration. In such embodiments, the CWCS may be configured to select one or more other CWCS users (or other users) that have a CCE calculated Collaborative Compatibility Level that is greater than a pre-defined threshold value, and to provide the CWCS user (on a user device 12) with a display on a screen, page, audio message, or the like, that shows or identifies the selected other CWCS users (or other users). In one example, the CWCS provides the CWCS user with a display screen on the user device 12, showing information about each selected other CWCS user (or other user), where such information may include, but is not limited to, a name, identification or user code, photograph, a sample of a work, descriptive text or the like for each selected other CWCS user (or another user). In particular embodiments, the CWCS provides the CWCS user with a display of such information for a plurality of selected other CWCS users (or other users) that have a CCE calculated Collaborative Compatibility Level that is greater than a pre-defined threshold value.

In other embodiments, the CWCS is configured to employ the CCE calculated Collaborative Compatibility Level in connection with the selection or drafting of a clause, contract, template or portions or sections thereof. In such embodiments, the CWCS is configured to employ the CCE calculated Collaborative Compatibility Level to generate or propose one or more values, terms, conditions or other parameters of a clause, contract, template or portions or sections thereof. For example, the CWCS employs the calculated Collaborative Compatibility Level to determine or propose a compensation amount or type of compensation and, may generate and provide a sample clause, contract, template or portions or sections thereof, that include the determined or proposed compensation amount or type.

For example, a first compensation amount or type may be determined or proposed for a first other CWCS user that has a calculated Collaborative Compatibility Level of a first value, while a second compensation amount or type may be determined or proposed for a second other CWCS user that has a calculated Collaborative Compatibility Level of a second value. In such an example, the first value may be greater or higher (e.g., a greater amount of compensation or a higher value of compensation type) than the second value, where the calculated Collaborative Compatibility Level for the first other user is higher than that of the second other user. Thus, the CWCS will generate or propose a higher compensation amount or value for other CWCS users that scores higher Collaborative Compatibility Levels, relative to other CWCS users that score lower Collaborative Compatibility Levels. In further examples, the CWCS will generate or propose a first (or lower) compensation amount or value for each other CWCS user (or other users) that has a calculated Collaborative Compatibility Level at or below a predefined threshold value but will generate or propose a second (or higher) compensation amount or value for each other CWCS user (or other users) that has a calculated Collaborative Compatibility Level above the predefined threshold value.

Similarly, the CWCS may be configured to generate or propose other values, terms, conditions or other parameters of a clause, contract, template or portions or sections thereof (or to propose entire clauses, contracts, templates or portions or sections thereof) based on the CCE calculated Collaborative Compatibility Level. For example, a first clause, contract, template or portions or sections thereof may be determined or proposed for a first other CWCS user that has a calculated Collaborative Compatibility Level of a first value, while a second (different) clause, contract, template or portions or sections thereof may be determined or proposed for a second other CWCS user that has a calculated Collaborative Compatibility Level of a second (different) value. Thus, for example, the CWCS may generate or propose clauses relating to revenue sharing, management roles or duties, or other roles or duties for a first other CWCS user that has a calculated Collaborative Compatibility Level of a first value, but does not generate or propose such clauses for a second other CWCS user that has a calculated Collaborative Compatibility Level of a second (different) value (higher, or lower, than the first value). In such embodiments, the CWCS may include or operate with one or more databases (as described herein) that include one or more values, terms, conditions or other parameters, clauses, contracts, templates or portions or sections thereof, each associated with one or more (or a threshold) of Collaborative Compatibility Levels, such that the CWCS may select one or more values, terms, conditions or other parameters, clauses, contracts, templates or portions or sections thereof that correspond to Collaborative Compatibility Levels (or thresholds of such Levels).

Thus, the CWCS may be configured to perform a process, in which the CWCS determines a CCE calculated Collaborative Compatibility Level for at least one other user. Such other users may be another CWCS user (or other users) who responded to a collaboration request or invitation from a CWCS user. Alternatively, or in addition, the other user may be another CWCS user (or other users) who has registered with the CWCS (e.g., but not limited to a CWCS Member) or is otherwise recognized by the CWCS.

The process further includes selecting or generating one or more values, terms, conditions or other parameters of a clause, contracts, templates or portions or sections thereof, based on the CCE calculated Collaborative Compatibility Level for the other user. For example, the CWCS may select or generate a predefined first compensation level or type (or a first compensation clause, compensation contract or portion, or section thereof), in response to a CCE calculated Collaborative Compatibility Level of a first value (or that meets or exceeds a first predefined threshold). In addition, the CWCS may select a predefined second compensation level or type (or a second compensation clause, compensation contract or portion, or section thereof), in response to a CCE calculated Collaborative Compatibility Level of a second value (or that falls below the first predefined threshold).

In further embodiments, the CWCS may employ more than one threshold, such that additional compensation levels or types (or additional compensation clause, compensation contract or portion or section thereof), may be selected or generated in response to a CCE calculated Collaborative Compatibility Level meeting, exceeding or falling below each further threshold. Thus, for example, more than two different values, terms, conditions or other parameters of a clause, contracts, templates or portions or sections thereof may each be associated with a different respective CCE calculated Collaborative Compatibility Level or range of Levels, or threshold, such that the CWCS selects one or more different respective values, terms, conditions or other parameters of a clause, contracts, templates or portions or sections thereof, in response to each different CCE calculated Collaborative Compatibility Level.

The process further includes presenting the one or more values, terms, conditions or other parameters of a clause, contracts, templates or portions or sections thereof, that were selected. In particular embodiments, the CWCS presents such values, terms, conditions or other parameters of a clause, contracts, templates or portions or sections thereof to the CWCS user by displaying such values, terms, conditions or other parameters of a clause, contracts, templates or portions or sections thereof on a user device 12 of the CWCS user. Alternatively or in addition, the CWCS may provide such values, terms, conditions or other parameters of a clause, contracts, templates or portions or sections thereof on a webpage, network location or electronic storage medium accessible to the CWCS user (e.g., through a user device 12). Alternatively or in addition, the CWCS may provide such values, terms, conditions or other parameters of a clause, contracts, templates or portions or sections thereof to the CWCS user, by email, text messaging, audio messaging or other electronic communication.

While the above embodiments are described with respect to one or more other users, each having a CCE calculated Collaborative Compatibility Level, other embodiments may calculate and employ a Collaborative Compatibility Level calculated for a group of other CWCS users (or other users). In such embodiments, the addition or subtraction of one or more CWCS users (or other users) to the group can cause the calculated Collaborative Compatibility Level of the group to change. Thus, groups of different users (or different combinations of users) can have different calculated Collaborative Compatibility Levels.

In particular embodiments, the CCE is configured to calculate or determine Collaborative Compatibility Levels, through the use of one or more predefined processes, algorithms, routines or the like. In certain embodiments, such Collaborative Compatibility Levels and/or processes, algorithms, routines or the like may be configured based, at least in part, on analysis and advice of doctors, researchers, professionals in relevant industries or other individuals trained and/or experienced in analyzing matches for particular types of Collaborative Works.

Calculation or other determination of one or more Collaborative Compatibility Levels may be carried out by the server 10, one or more user devices 12, or other computing devices that utilize CCE-usable Information about, relating to, or associated with, (i) one or more persons, (ii) one or more actual or desired Collaborative Works and/or Collaborative Works in-progress, (iii) one or more other existing and/or desired works, and/or (iv) one or more human endeavors of a type that comprises or is associated with, collaboration. It is to be understood that the term "CCE-usable Information" in the preceding sentence shall be broadly construed, and CCE-usable information may be any kind of information that has causative or correlative relevance to one or more calculations of one or more Collaborative Compatibility Levels.

In particular embodiments CCE-usable information may, for example, and without limitation, be, any one or combination of the following: (i) information regarding a person's prior collaborative efforts with one or more other persons, including, without limitation, for example, information (such as but not limited to numerical or other values, ratings, descriptions, comments or valuations from other collaborating users or peers, other persons, communities or the CWCS) regarding a person's contribution share, evaluation of the person's collaboration contribution quantity, quality, style, ease, difficulty, and ability to work effectively with other collaborators, activities by other collaborators, and previously generated Collaboration Compatibility Level data involving or relating directly or indirectly to the person; (ii) information as cited in (i) or other information regarding a person's prior collaborative efforts regarding one or more existing Collaborative Works and/or one or more Collaborative Works in-progress (such as, for example, and without limitation, such works created in association with the CWCS); (iii) information (such as, but not limited to numerical or other values, ratings, descriptions, comments or valuations from other collaborating users or peers, other persons, communities or the CWCS) regarding a person's prior collaborative efforts regarding one or more works that are (a) similar to works of the type referenced in (ii), (b) similar to specified works or types of works (such as, for example, without limitation, a work of the type that a user intended to become a Collaborative Work), (c) similar to other specified works; (d) similar to works where the similarity is determined by subjective means (by one or more persons, such as, for example, a Content Controller and/or a CWCS Operator), (e) similar to other works where the similarity is determined by objective criteria or algorithmic systems (such as, for example, by systems described herein as Collaborative Work Similarity Evaluation Means); (f) similar to other works where the similarity is determined by a combination of (e) and (e); (iv) information (such as but not limited to numerical or other values, ratings, descriptions, comments or valuations from other collaborating users or peers, other persons, communities or the CWCS) regarding a person's abilities, including without limitation, information regarding a person's level of skill, talent and/or artistry, including for example, without limitation, one or more numerical or other values or other ratings by the CWCS, one or more other persons, one or more communities, or one or more other entities; (v) business or professional information regarding a person, such as, for example, and without limitation, information regarding the person's fees and/or other acceptable compensation for completion of a specified task and/or the providing of a specified product or service, information regarding preferred methods of doing business, information regarding personal or professional limitations, etc.; (vi) information (such as but not limited to numerical or other values, ratings, descriptions, comments or valuations from other collaborating users or peers, other persons, communities or the CWCS) regarding a person's prior works, Collaborative Works, creations and/or other accomplishments; (vii) Personal Information of any suitable kind, including, for example, and without limitation, information (such as, but not limited to numerical or other values, ratings, descriptions or comments) comprising or relating to a person's occupation, education, marital status, abilities, talents, age, gender, ethnicity, language(s) spoken, genetic information, physical attributes, disabilities, medical information, psychological information, sexual identity, sexual preferences, religious affiliation(s), political affiliation(s), other group affiliation(s), vocation(s), hobby(ies), avocation(s), food preferences, sexual preferences, music preferences, motion picture preferences, game preferences, literature preferences, other entertainment preferences, type(s) of entertainment consumed, art preferences, travel preferences, leisure activity preferences, likes, dislikes, fears, phobias, attitudes, opinions, motivations, income, socio-economic status, other socio-economic information, assets, liabilities, residence location(s), work location(s), family, alleged, adjudicated and/or resolved civil litigation matters and/or criminal matters, personal location information, and/or historic information regarding any and/or all of the foregoing (any and all of the foregoing types of information in this section (vi) is referred to herein as "Personal Information"); (viii) Personal Behavior information comprising, pertaining or relating to, or otherwise associated with, a person's behavior, including, without limitation, product purchase information, service purchase information, product usage information, service usage information, (including, for example, without limitation, entertainment product, and service consumption information), information associated with interactions with one or more other persons (such as for example, communications with other persons, social network communications and other interactions with one or more persons), information regarding online searches conducted, other online activity information, bandwidth usage, (any of the foregoing types of information in this section (viii) is referred to herein as "Personal Behavior Information"); (ix) Predefined digitally stored information, including, without limitation, Personal Information digitally stored by or for the CWCS, and/or Personal Behavior Information stored by or for the CWCS. In particular embodiments, such digitally stored information may include any or all information of the type referred to in U.S. patent application Ser. No. 13/668,304 "Automatic Online Diary For Electronic Device" (which is incorporated herein by reference, in its entirety), that is usable by, or in association with, one or more computers and/or other digital devices (all of the foregoing types of information is also referred to herein as "Digitally Stored Information"); (x) location-based and/or location-associated information, including, without limitation, geographic location information or other location information (including, but not limited to, GPS, IP address, triangulated location information or the like) associated with any of the information referred to in any of (i) through (ix) above or a combination thereof; (xi) information (such as but not limited to numerical or other values, ratings, descriptions, comments or valuations from other collaborating users or peers, other persons, communities or the CWCS) pertaining to compatible and/or incompatible personality types; (xii) information (such as but not limited to numerical or other values, ratings, descriptions, comments or valuations from other collaborating users or peers, other persons, communities or the CWCS) pertaining to compatible and/or incompatible behaviors; (xiii) information of the type set forth in (i)-(xii) regarding, related to, or otherwise associated with one or more "First Degree Associated Persons" directly or indirectly associated with a person; information of the type set forth in (i)-(xii) regarding, related to, or otherwise associated with one or more Second Degree Associated persons directly or indirectly associated with the aforementioned person and/or one or more First Degree Associated persons; and information of the type set forth in (i)-(xii) regarding, related to, or otherwise associated with other levels of N(+1)-Degree Associated persons directly or indirectly associated with one or more N-Degree Associated Persons, inter-associations thereof, and/or inter-associations with one or more Second Degree Associated Persons, one or more First Degree Associated Persons and/or the aforementioned person; (xiv) information (such as but not limited to numerical or other values, ratings, descriptions, comments or valuations from other collaborating users or peers, other persons, communities or the CWCS) about one or more works, including, without limitation, for example, one or more Collaborative Works and/or one or more Collaborative Works in-progress; (xv) information (such as but not limited to numerical or other values, ratings, descriptions, comments or valuations from other collaborating users or peers, other persons, communities or the CWCS) regarding one or more genres, styles, categories, or types, of works, including without limitation, for example, information regarding characteristics, elements or components pertaining to a type or style of work; (xvi) information (such as but not limited to numerical or other values, ratings, descriptions, comments or valuations from other collaborating users or peers, other persons, communities or the CWCS) regarding collaboration style, methods of collaboration, or preferred collaboration modes or preferences, including without limitation, for example, information regarding one or more collaboration styles, etc., including without limitation, for example, information regarding characteristics, elements or components pertaining to a style of collaboration; or (xvii) any other data, information and/or data processing means, including for example, without limitation, one or more additional, substitute, alternate, assisting, associated, modifying, and/or interfacing programs, routines, algorithms and/or other processing components that are, or might be, useful to define, determine, calculate, record, report and/or use one or more Collaboration Compatibility Levels.

In some embodiments, CCE-usable Information may be provided by one or more persons, including, for example, a user of the CWCS, a database and/or module or component of the CWCS, and/or one or more third-party computers and/or databases, to the CCE via one or more data inputting devices. In some embodiments, the type(s) and/or amounts of CCE-usable information entered into the CCE to generate one or more Collaboration Compatibility Levels is controlled or limited by one or more computing devices and/or one or more other persons.

It is to be understood that in some embodiments of the invention, the CCE may use one or more different algorithms, routines and/or programs, including without limitation, one or more that may be tailored for specific types of collaborations, Collaborative Works and/or Collaborative Communities. For example, the CCE may include or use a first set of one or more algorithms, routines and/or programs for musical types of collaborations, Collaborative Works and/or Collaborative Communities, and a second set of one or more algorithms, routines and/or programs for textual (including, but not limited to stories, poems or other literature) types of collaborations, Collaborative Works and/or Collaborative Communities. In further embodiments, a third set of one or more algorithms, routines and/or programs for technical (including, but not limited to electronic, software, architecture or other technical design) types of collaborations, Collaborative Works and/or Collaborative Communities. Other embodiments may employ some, but not all of the above sets and/or additional sets of one or more algorithms, routines and/or programs for other types of collaborations, Collaborative Works.

In further embodiments, any one or more of the above-cited sets may be replaced with more refined sets corresponding to more specific types of collaborations, Collaborative Works and/or Collaborative Communities. For example, instead of (or in addition to) a set of one or more algorithms, routines and/or programs for musical types of collaborations, Collaborative Works and/or Collaborative Communities, the CCE may include or use a first music set of one or more algorithms, routines and/or programs for a first music type (such as but not limited to, first music genre, style, or musical instrument), a second music set of one or more algorithms, routines and/or programs for a second musical type (such as but not limited to, second music genre, style, or musical instrument), and so forth. Similarly, instead of (or in addition to) a set of one or more algorithms, routines and/or programs for text types of collaborations, Collaborative Works and/or Collaborative Communities, the CCE may include or use a first text set of one or more algorithms, routines and/or programs for a first text type (such as, but not limited to, first genre, style, or literature format), a second text set of one or more algorithms, routines and/or programs for a second text type (such as but not limited to, second music genre, style, or literature format), and so forth. In each of the above examples, each different set of one or more algorithms, routines and/or programs includes at least one algorithm, routine and/or program that is different from at least one of the other (or some or each of the other) sets of algorithms, routines and/or programs. In particular embodiments, each different set of one or more algorithms, routines and/or programs is different from each of the other sets of algorithms, routines and/or programs.

In some embodiments, one or more different algorithms, routines and/or programs may be used by the CCE serially, simultaneously or a combination of the foregoing. In some embodiments, one or more algorithms, routines, and programs may be configured to account for, and/or include, information that reflects discoveries, research and/or theories pertaining to factors, influences, causes and/or correlates associated with differential levels of collaboration compatibility of two or more persons, and/or groups of persons, etc.

In some embodiments information comprising and/or associated with one or more Collaboration Compatibility Levels generated by the CCE is outputted directly or substantially directly to one or more CWCS users, for example, to the user device 12. In some embodiments, such information is provided to one or more other people and/or one or more other components of the CWCS for use in association therewith. In some embodiments, such information is provided to a third party and/or a third party person, such as a computer system for further processing, to provide, for example, without limitation, direct or indirect refinement and/or enhanced reliability of Collaboration Compatibility Level(s).

Example 10 a non-limiting example of a process involving the CCE in association with the CWCS is described.

Content Controller, Songwriter Alpha, with the use of a user device 12, has engaged the use of the CWCS on the server 10, with the intent to collaborate the composition of a song with another songwriter under specified terms set forth in the Song Profile (Working Profile for the song). Songwriter Alpha publishes a request and/or other information regarding her desire to create a Collaboration Work in the form of a completed pop song with the assistance of one or more other songwriters through the use of the CWCS. For example, Alpha may submit a message, sample and/or other information (including, but not limited to text, video and/or audio data) to the CWCS, for the CWCS to make available to other CWCS users or a selected set of CWCS users (and/or non-CWCS network users), for display on user devices 12 associated with such other users, for example, but not limited to, by email, website posting, text message or other messaging, posting or data distribution mechanism provided by the CWCS. To assist Songwriter Alpha in publishing a request, the CWCS may provide an interface display screen (displayable on Songwriter Alpha's user device 12) for selecting an option for publishing a collaboration request and for submitting information regarding or relating to the request. The CWCS server 10 may be configured to receive information (including, but not limited to text, video and/or audio data) associated with the request from Songwriter Alpha's user device 12, through the network. In response to receiving the request information, the CWCS server 10 is configured to publish the request, for example, by sending one or more emails or text messages (or other network-communicated messages) of the request to other users (other CWCS users or non-CWCS network users), by posting the request on one or more predefined websites, or other messaging mechanisms.

In the present example, the CWCS provides, and Songwriter Alpha receives, several responses to her request, from other users, through the CWCS. For example, Songwriter Alpha's user device 12 (or the CWCS server 10, or both) may receive a reply message, sample and/or other information from each of multiple CWCS users and/or non-CWCS network users, by email, website posting, text message or other messaging, posting or data distribution mechanism provided through the CWCS.

Songwriter Alpha engages the use of the CCE to evaluate the Collaborative Compatibility Level of several of the songwriters that have responded to her request publication. For example, Songwriter Alpha may select a selectable item on a CWCS interface display screen displayed on Songwriter Alpha's user device 12, where the selectable item selects the option to engage the CCE. Once engaged, the CCE receives the reply messages, samples and/or other information from the multiple CWCS users and/or non-CWCS network users who responded to Songwriter Alpha's request publication. In particular embodiments, Songwriter Alpha designates or selects which reply messages, samples and/or other information to submit to the CCE. In other embodiments, the CWCS and/or CCE are configured to automatically submit to the CCE all (or selected ones) of the reply messages, samples and/or other information received through the CWCS, in response to Songwriter Alpha's published request.

In the present example, one of the songwriters that have responded to Songwriter Alpha's request publication is Songwriter Beta. Also in the present example, both Songwriter Alpha and Songwriter Beta submit to the CCE, certain CCE-usable Information via the CWCS. In this example, the CCE-usable Information includes each of their respective age, gender, music style preferences, physical location, and/or other information. Songwriter Beta also submits to the CCE via the CWCS, information regarding the cost of his music songwriting services.

In this example, the CWCS and/or CCE is configured to obtain additional CCE-usable information, via one or more CCE program routines, from one or more third-party databases (outside of the CWCS). Such additional CCE-usable information may include, but is not limited to, information regarding the web browsing habits and/or search engine use behaviors of both Songwriter Alpha and Songwriter Beta over a predefined period of time (e.g., the latest one or more months, years, or other defined period), the contents of each of their respective electronic music libraries (such as but not limited to iTunes® music libraries), and/or their music streaming history for a predefined period of time (e.g., the latest one or more months, years or other defined period).

The foregoing information processed by the CCE using an algorithm, routine or program that has been designed or demonstrated (for example, with reproducible evidence-based results) to provide a measure regarding the likely collaboration compatibility of persons for songwriting based on correlative evidence pertaining to the data of the types acquired by the CCE above. The CCE processes the aforementioned information using the aforementioned algorithm, routine or program and generates a Collaboration Compatibility Level measure, such as a numerical value or other indicators. In the present example, a Collaboration Compatibility Level measure of 8.243 on a scale of 10 is generated (for Songwriter Alpha and Songwriter Beta as collaboration partners), which data is electronically transmitted to Songwriter Alpha. Other Collaboration Compatibility Level measures may be generated for one or more (or each of) the other songwriters who responded through the CWCS to Songwriter Alpha's published request. This data can be used by Songwriter Alpha to assist her in her efforts to choose a songwriting collaboration partner from a group of respondents to her published request. In particular embodiments, the CWCS selects one or more songwriters who responded to Songwriter Alpha's request as being compatible collaborators, based on the determined Collaboration Compatibility Level measure for such responding songwriters. In one example, the CWCS may select each responding songwriter having a Collaboration Compatibility Level measure that is above a predefined threshold level, as being a compatible collaborator. In other embodiments, other algorithms or routines that employ the Collaboration Compatibility Level measure for selecting one or more responding songwriters as compatible collaborators may be employed.

In some embodiments of the invention, the Collaborative Work may involve one or more sessions between collaborators, a course of treatment, or part thereof, such as, but not limited to psychotherapy, life coaching or another type of counseling for which counselor-client compatibility is important. In some such embodiments of the invention, the Collaborative Compatibility Level (as between counselor and client) is directed to providing useful predictive, evaluative or other information regarding, for example, without limitation, the likelihood that a particular therapist, counselor, coach, etc., will be able to establish an effective counseling relationship in a specified period of time.

In some embodiments of the invention, the Collaborative Work comprises a desired interpersonal relationship, such as a successful dating or marital relationship or other social, quasi-social or virtually social relationship between two or more persons. In some such embodiments, the CCE is used to generate Collaboration Compatibility Level information that can be used to assist persons in regard to the creation of the Collaborative Work, i.e., the aforementioned desired interpersonal relationship.

In some embodiments, the CCE operates in association with one or more Collaboration Work Similarity Evaluation Systems ("CWSES"). A CWSES may include software, hardware, firmware, or combinations thereof, in the server 10 or one or more of the user devices 12 (FIG. 1), that controls one or more processors in the server 10 or user device(s) 12, to perform functions of the CWSES described herein. In particular embodiments, the CWSES includes software stored on the user device(s) 12, or software stored at the server 10 and downloaded to one or more of the user device(s) 12. In other embodiments, the CWSES software, hardware, firmware or combinations thereof reside and operate on one or more other network devices, and is accessible by the server 10 and/or user devices(s) 12 over the communication network.

The CWSES is configured to determine whether, and how much one or more works are similar to one or more Collaboration Works and/or Collaboration Works in-progress, and to provide data corresponding to such determinations. Data provided by the CWSES may be employed by or in association with the CWCS in connection with one or more CWCS operations, including, without limitation:

(i) to provide useful information to one or more users of the CWCS, such as, for example, without limitation, one or more Content Controllers, one or more Collaboration Operators, and/or one or more actual or potential Collaborative Work or Collaborative Work in-progress collaborators, indicating or notifying the user(s) that a subject Collaborative Work or Collaborative Work in progress is similar to another work such that such work might potentially raise issues of infringement of intellectual property (such as but not limited to the copyright, trademark, and/or patent infringement); (ii) to generate CCE-usable Information for generation of Collaborative Compatibility Level data; (iii) to provide useful information as to whether a Collaborative Work or a Collaborative Work in-progress is sufficiently similar to an exemplar work or a specified genre as desired by Content Controller and/or other users of the CWCS; (iv) to provide useful information to one or more CWCS users regarding whether a Collaborative Work, a Collaborative Work in-progress, or a part thereof, is different enough from another work to trigger one or more payment obligations, crediting obligations, or other rights, duties or obligations; (iv) to provide other useful information associated with the determination of whether through the application and/or other use of one or more criteria for the comparative determination of similitude of two or more works are similar.

In some embodiments, the CWSES is configured to compare two or more digital files containing two or more subject works, and determine whether, and how much the two or more works are similar to each other, based on common binary data. In some embodiments, the degree of similarity of such binary data to constitute "sufficiently similar" works can be set to a predetermined level by a user, for example, through a user interface (such as but not limited to a display screen) provided on a user device 12. In some embodiments, artificial intelligence systems or processes of analysis, such as but not limited to component extraction and comparison, is used by the CWSES to determine similarity.

Example 11

The following is an example of the use of the CWCS in an instance where one Collaborative Work is a sandal design and another Collaborative Work is the funding of a business. In the instant example, a member "Member 634" of a CWCS Community has made a new design of a beach sandal product that he desires to find assistance with financing, manufacturing, importing/fulfillment, creation of a website and marketing of the product to the public.

Member 634 (acting as a Content Controller) uploads pictures, designs, and other information relating to his design to the CWCS (for example, from a user device 12 to the CWCS server 10). The CWCS receives such information and creates a new Creative Works Master Profile for his Sandals (Creative Work "Sandals"). In particular embodiments, the CWCS may provide a user interface (such as but not limited to one or more display screens on the user device 12), to assist the user in uploading the information to the CWCS and creating a new Creative Works Master Profile.

In addition, through the CWCS, Member 634 opens Working Profile Preferences (titled "Sandals") for a new collaboration and sets up a business plan through the working profile preferences. The working profile preferences may include one or more proposed terms or preferences for a collaboration, where the terms or preferences may relate to the collaborative services for which Member 634 seeks assistance (which, in the instant example include financing, manufacturing, importing/fulfillment, creation of a website and marketing of the product to the public, but which can be other services in other embodiments) and/or financial arrangements for receiving such services. In particular embodiments, Member 634 selects or enters terms in the Working Profile Preferences for "Sandals." In particular embodiments, the CWCS may provide a user interface (such as, but not limited to one or more display screens on the user device 12), to assist the user in creating Working Profile Preferences and selecting or entering terms or preferences in the Working Profile Preferences for "Sandals."

As a non-limiting example of such terms or preferences, based on the instant "Sandals" example, such terms may include one or more of the terms described herein (or other terms). Such terms or preferences may include a defined equity or profit share arrangement, that defines shares of equity in a Collaborative Work (or a business associated therewith) or shares of profit in sales of products that include, relate to or are made with the Collaborative Work. For example, Member 634 may specify that he is willing to keep or share a defined percentage (such as but not limited to keep 80% of profits and share 20% of profits) in any or specified proceeds from product sales or other profits, in return for a specified collaboration.

Such terms or preferences may include one or more defined CWCS roles or other roles relating to the Collaborative Work (or a business associated therewith). For example, Member 634 may specify that he (or other identified person) has a specific role in the collaboration or business (such as but not limited to CWCS Content Controller or President of the business).

Such terms or preferences may include a defined monetary draw or other compensation for one or more specified persons involved in the Collaborative Work (or a business associated therewith). For example, Member 634 may specify that he will receive a particular compensation on a monthly or other periodic bases.

Such terms or preferences may include a defined amount and/or type of financing (or financial equity) requested in return for a defined amount of equity in the Collaborative Work (or in a business associated therewith) or in profits from sales of products resulting from the Collaborative Work (or business). For example, Member 634 may specify that he is willing to share a specified percentage (such as, but not limited to 20%) of profits from sales of the products, in return for a specified equity amount of investment (such as but not limited to a specified dollar amount).

Member 634 in attempting to find financing, create his website and market his sandals, may use the Collaborative Matching search engine to find possible Members/Groups in the CWCS Community to collaborate with him. He may begin his search by using the CWCS to look for CWCS groups or CWCS individual members who have indicated that they are interested in financing ventures and start-up companies. In particular embodiments, the CWCS includes one or more databases of such CWCS groups or CWCS individual members and provides Member 634 with access to such database(s). Alternatively or in addition, the CWCS includes or employs one or more network sites on which such CWCS groups or CWCS individual members post information regarding the groups or individuals and/or their interest in financing, and provides Member 634 with access to such posts. In particular embodiments, the CWCS may provide a user interface (such as, but not limited to one or more display screens on the user device 12), to assist the user (e.g., Member 634) in using the CWCS and accessing the database(s), posts or other information identifying CWCS groups or CWCS individual members who have indicated that they are interested in financing ventures and start-up companies.

In the instant example, from the database(s), postings or other sources, Member 634 may identify several Groups that specify they are looking for investment opportunities. Member 634 sends one or more invitations to each Group, seeking a collaborative effort with his sandal design that will allow him to manufacture, build a website and market the product. In particular embodiments, such invitations are sent through email, text messaging, posting on a specified website page, or other network communication or messaging mechanism, through the CWCS. In particular embodiments, the CWCS may provide a user interface (such as, but not limited to one or more display screens on the user device 12), to assist the user in creating, addressing, sending or delivering invitations to each of the identified Groups.

In the instant example, Member 634 may receive a number of responses (for multiple different Groups) to the invitations. In particular embodiments, such responses are sent and received through email, text messaging, postings on a specified website page, or other network communication or messaging mechanism, through the CWCS. In particular embodiments, the CWCS may provide a user interface (such as but not limited to one or more display screens on user devices 12), to assist the user (e.g., a Group or Group member) in creating, addressing, sending or delivering responses to invitations. Member 634 may review information about each responding Group (for example, the information provided by each Group or provided by the CWCS about each Group), and may select one of the Groups for collaboration.

For example, Member 634 may find that information provided about one or more of the Groups appears to favorable to Member 634. As a non-limiting example, Member 634 may have decided that Group 240 appears favorable, based on a review (by Member 634) of information indicating that Group 240 was formed by 10 members with a combination of capital that matches or corresponds to the amount of Member 634's capital equity investment request, and has expertise in apparel.

Accordingly, Member 634 (as the Content Controller) informs Group 240 of a desire to collaborate, in connection with the Creative Work ("Sandals"). In particular embodiments, Member 634 informs Group 240 by communicating one or more electronic messages, for example, through email, text messaging, postings on a specified website page, or other network communication or messaging mechanism, through the CWCS. In particular embodiments, the CWCS may provide a user interface (such as but not limited to one or more display screens on the user device 12), to assist the user in creating, addressing, sending or delivering such message(s) to the selected Group (e.g., Group 240).

Group 240 (or a member of Group 240) may review the Working Profile Preferences "Sandals" set for the collaboration and may propose changes to be made, using the Working Profile Preferences Negotiation Engine, as described herein. In a non-limiting example, these changes may include one or more specified time periods (such as, but not limited to a time period set to find a website designer and build the site). These changes may include one or more defined amounts (or changes in Member 634's proposed amounts) of equity in the Collaborative Work (or in a business associated therewith) or in profits from sales of products resulting from the Collaborative Work (or business). For example, Group 240 may propose to take 50% of sales profits (instead of the 20% initially offered by Member 634), in return for providing a defined amount of financial equity. The changes may include one or more defined roles (or changes in Member 634's proposed roles). For example, Group 240 may propose to be the Content Controller for the Sandal design, to specify who will manufacture the sandals. The changes may include additional proposed terms or preferences. For example, Group 240 may propose to require all accounting receivable and payable and dividends scheduled for payment to be processed through the Group 240 Profile. In addition, Group 240 may confirm the amount of equity investment (or propose a different amount) that the Group 240 will provide. For example, Group 240 may propose (or confirm) to provide $100,000 in equity investment capital.

Member 634 may review the changes or other responses provided (for example, through the NE) by Group 240. After reviewing the proposed changes from Group 240, Member 634 may reply (for example, through the NE) with further revised terms, an acknowledgment to accept some or all of the changes proposed by Group 240, a refusal to accept some or all of such changes, or another suitable response. In a non-limiting example, Member 634 accepts the time limit set to find a website designer and build the site, accepts 50% of profits, accepts Group 240 becoming the Content Controller for the Sandal design, accepts Group 240 specifying who will manufacture the sandals and accepts all accounting receivable and payable and dividends scheduled for payment to be processed through the Group 240 Profile and he accepts the $100,000 equity investment. In addition, Member 634 may propose further changes or additional terms or preferences (for example, through the NE), in responding to the proposed changes from Group 240. In a non-limiting example, Member 634 requests are to increase his monthly draw to $1500, requests that all purchases and payments be digitally signed off by both Group 240 and Member 634 through the accounting engine, and a guaranteed price point of $10 per pair of sandals on the sandal manufacture and delivery.

Group 240 (or a member of Group 240) may review (for example, through the NE) the acknowledgment or acceptance (or refusal) of some or all of Group 240's latest proposed changes, and any further changes or additions to the terms or preferences proposed by Member 634. Group 240 may accept or refuse (for example, through the NE) the latest accepted changes and any further proposed changes or additions from member 634. If Group 240 accepts the latest accepted terms and preferences and accepts each changed or additional term or preference proposed by Member 634, then an agreement can be generated by the CWCS (for example, through the AE). The CWCS (for example, through the AE) may provide the generated agreement to each party (for example, to the Member 634 and the Group 240) for review and signature. In particular embodiments, the agreement is accessible by the Member 634 and the Group 240, on respective user devices 12 (for example, for downloading to the user device 12, display on a display screen associated with the user device 12, print on a printing device associated with the user device 12, or store on a non-transient electronic storage medium associated with the user device 12), through the CWCS.

In certain embodiments, the agreement is accessible through the CWCS, for execution by each party to the agreement (e.g., by Member 634 and Group 240). In particular embodiments, the CWCS receives a digital signature on or for the agreement, a digital copy of a signed version of the agreement, or other predefined input representing the acceptance by each party (such as, but not limited to, input representing that the party has clicked or otherwise selected an acceptance icon or the like on a display screen provided through the AE. Upon one or both parties (Member 634 and Group 240) executing the agreement, the executed (or partially executed) agreement is stored in the "Collaboration Sandal 1" Profile, and the CWCS opens a Working Profile for "Collaboration Sandal 1."

The parties (e.g., Member 634 and Group 240) may, then, proceed to perform tasks in accordance with the terms of the agreement. In a non-limiting example, Group 240 deposits $100,000 into an escrow account of the working profile accounting engine for "Collaboration Sandal 1".

Meanwhile, Member 634 searches the CWCS Community with the Collaborative Matching Search Engine to find a web designer (for example, "Member 22") that he believes would be appropriate for building a web store for the collaboration. Member 634 through the Working Profile for "Collaboration Sandals 1" contacts Group 240 and suggested that they hire Member 22 to build the web store and requests that they open a new collaboration "Collaboration Sandals 2" and a Working Profile "Collaboration Sandal 2" so he can work with Member 22 on building the site for the sandal design.

Group 240 (being the Content Controller) opens Working Profile Preferences for a second collaboration "Collaboration Sandal 2" that is exclusively for building the web store for the sandals. As part of the Working Profile Preferences "Collaboration Sandal 2," Group 240 may specify terms or preferences, such as but not limited to terms relating to payment amounts, time requirements, or other duties or requirements. In a non-limiting example, Group 240 specifies that they will pay $5000 to have the site built with 20% paid at the signing of the agreements, that the store must be built within 30 days of the signed agreement, and that Member 634 must oversee the construction, marketing, design, and functionality of the web store.

Group 240 sends an invitation to Member 634 and Member 22 to review each of their specific portions of the Working Profile Preferences for "Collaboration Sandal 2". Member 634 may accept (or refuse) the Working Profile Preferences for "Collaboration Sandal 2" that he oversees the construction, marketing, design, and functionality of the web store. Member 22 may open the Working Profile Preferences Negotiation Engine for "Collaboration Sandal 2" and may reply with an acceptance, refusal or propose further changes or additions to the terms or preferences. In a non-limiting example, Member 634 accepts the Working Profile Preferences, while Member 22 proposes that instead, he would take 5% of the Content Controller (Group 240's) profits, the time period would be 45 days to build the site and that he would spend 10 hours a month managing and upgrading the site for 10 years. Group 240 accepts the changes to Member 22's specific portion of the Working Profile Preferences for "Collaboration Sandal 2". The CWCS Working Profile Preferences "Collaboration Sandal 2" then generates 2 unique agreements (for example, through the AE) based on the Working Profile Preferences for "Collaboration Sandal 2" for (Group 240 and Member 634) and (Group 240 and Member 22). The agreements are provided to the respective parties for review and signature, for example, in a manner as discussed above. Once all agreements are executed digitally, the CWCS opens a new Working Profile web design studio for "Collaboration Sandal 2."

Thus, in accordance with the terms, rights, and duties under the contracts in the instant non-limiting example, two sets of events may transpire.

In accordance with a first set of events, Group 240 contact's their apparel manufacturer, outside the CWCS, regarding the sandal manufacturing. To make the price point in the agreement ($10 per pair of sandals), the manufacturer demands that a specified number of pairs of sandals be ordered, at the price point amount (for example, but not limited to 8,000 pairs be ordered, equaling $80,000). Group 240 agrees on the price and may make a paper agreement outside the CWCS with the manufacturer. Group 240 scans and inputs the manufacturing agreement into the CWCS and attaches the manufacturing agreement to the Working Profile "Collaboration Sandals 1" for Member 634 to review and sign (and for Group 240 to sign). The Working Profile for "Collaboration Sandals 1" digitally transmits the signed/executed copy of the agreement to the manufacturer. The manufacturer then prints, signs, and mails via post the signed/executed agreement back to Group 240. Group 240 scans and inputs the final signed/executed agreement (that has been executed by all parties) into the CWCS and attaches it to Working Profile "Collaboration Sandal 1." Group 240 and Member 634 then each digitally confirm an account transfer from Working Profile "Collaboration Sandals 1" for the amount to be paid to the manufacturer (for example, but not limited to the $80,000 amount noted above).

In accordance with the second set of events (which may occur simultaneous or in series with some or all of the first set of events), Member 22 develops the web store, in accordance with the agreements made with respect to "Collaboration Sandal 2." For example, during a 45 day period specified in that agreement, Member 22 completes the web store and Member 634 approves the functionality and design of the store. The web store has been set up so that all funds from purchases are automatically deposited into Master Profile Sandals which is then transferred to Group 240's Profile for distribution. Upon completion of the development and approval of the web store, Member 634 and Member 22 determine that they would like to close the working profile for "Collaboration Sandal 2." After Group 240 reviews and approves of the web store site, the parties make the "Collaboration Sandal 2" locked and closed. In addition, Group 240 and Member 634 open the web store and begin marketing the sandals to the general public. Both Group 240 and Member 634 agree to leave Working Profile "Collaboration Sandals 1" open due to future transactions, purchases and development.

In some embodiments or use of the invention, the works generated by, from, or in association with, the functioning of the CWCS, may comprise non-physical, intangible objects or works, such as virtual objects, such as, for example, without limitation, virtual products. In some embodiments of the invention, the CWCS collaboration environment includes one or more virtual reality platforms or environments for the creation of Collaborative Works that comprise in whole or in part, virtual products, services provided in, or in association with, one or more virtual worlds, or tangible products or services designed in, or with the assistance of a virtual world.

It is to be understood that the term Collaboration Works and the term Creative Works as used herein can apply to virtual products that are collaboratively created. Additionally, it is to be understood that activities depicted in a virtual world, including gameplay on a computer game, can also comprise a Collaboration and/or a Collaboration Work created by the players.

In some embodiments, Collaboration Works can include products designed with, or made on, one or more 3-D printers, as well as the design of such products.

In some embodiments described herein, the CWCS may track (identify, record, or perform other predefined operations on) information about rights, sales, distribution, authorship, so assist with appropriate compensation to appropriate users or service providers. In particular embodiments, the CWCS can track other variables or perform other functions, depending on the Working Profile or Agreements associated with the Working Profile. The CWCS may be configured to identify and track any variable depending in a collaboration depending on a setting of the CWCS in the Agreement and/or the Working Profile.'

For example, each Agreement or Working Profile in the CWCS may include (or be associated with) a stored setting (value, keyword, or other predefined designators), where the stored setting is associated by the CWCS with a predefined tracking variable. In particular, a plurality of different settings may be associated, on a one-to-one basis, with a corresponding plurality of different tracking variables. In such embodiments, the CWCS may be configured to determine a tracking variable and/or a tracking or other function (for a Collaborative Work that is the subject of or otherwise associated with the Agreement or Working Profile), based on the setting stored with or in association with an Agreement or Working Profile.

The terms defined herein, and grammatical variations thereof, are intended to be construed broadly so that the meanings will reasonably effectuate the broadest interpretation of all of the parts of this disclosure in which they are used.

For example, the term "updating" refers to simultaneous or substantially simultaneous updating in some embodiments and non-synchronous updating in some embodiments. For example, in general, and in many of the embodiments of the invention disclosed, updating of a file or other feature of the CWCS is intended to occur as soon as possible after an event requiring updating occurs. But in some instances regarding the use of the CWCS, such as where an approval is required, updating, according to some embodiments, is non-synchronous or delayed until the happening of one' or more other events, such as the obtaining of approval, a signed agreement, etc.

After various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

All reasonable variants of the examples and other parts of this disclosure are intended to be and shall be deemed to be, set forth herein as if incorporated herein in full.

The above-described embodiments can be implemented using hardware, software, or a combination thereof. When implemented in software, the software code can be executed on any suitable processor or collection of processors, whether provided in a single computer system ("computer") or distributed among multiple computers.

Further, it should be appreciated that a computer may be embodied in any of a number of forms, such as a rack-mounted computer, a desktop computer, a laptop computer, a server computer, a cloud-based computing environment, a tablet computer, etc. According to various embodiments, a computer includes one or more of any of those options, or the like, or is embedded in a device not generally regarded as a computer but with suitable processing capabilities, including a Personal Digital Assistant (PDA), a smartphone, or any other suitable portable or fixed electronic device.

Various embodiments include hardware devices, as well as program products including computer-readable, non-transient storage media for carrying or having data or data structures stored thereon for carrying out processes as described herein. Such non-transient media, in various embodiments, are any available media that can be accessed by a general-purpose or special-purpose computer or server. By way of example, such non-transient storage media include, in various embodiments, random-access memory (RAM), read-only memory (ROM), erasable programmable read-only memory (EPROM), electrically erasable programmable read-only memory (EEPROM), field-programmable gate array (FPGA), flash memory, compact disk, or other optical disk storage, magnetic disk storage or other magnetic storage devices, or any other medium which can be used to carry or store desired program code in the form of computer-executable instructions or data structures and which can be accessed by a general-purpose or special-purpose computer. Combinations of the above are also be included within the scope of non-transient media, in some embodiments. In various embodiments, volatile computer memory, non-volatile computer memory, or combinations of volatile and non-volatile computer memory is included within the scope of non-transient storage media. Computer-executable instructions according to various embodiments include, for example, instructions and data that cause a general-purpose computer, special-purpose computer, or special-purpose processing device to perform a certain function or group of functions.

In addition to a system, various embodiments are described in the general context of methods and/or processes, which are implemented in some embodiments by a program product including computer-executable instructions, such as program code. These instructions, according to various embodiments, are executed by computers in networked environments. The terms "method" and "process" are synonymous unless otherwise noted. Generally, program modules according to various embodiments, include routines, programs, objects, components, data structures, or the like, that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

In some embodiments, the method(s) and/or system(s) discussed throughout are operated in a networked environment using logical connections to one or more remote computers having processors. Logical connections according to some embodiments include a local area network (LAN) and a wide area network (WAN) that are presented here by way of example and not limitation. Such networking environments are commonplace in office-wide or enterprise-wide computer networks, intranets, and the Internet. Those skilled in the art will appreciate that such network computing environments encompass many types of computer system configurations in some embodiments, including personal computers, hand-held devices, multi-processor systems, microprocessor-based or programmable consumer electronics, network personal computers, minicomputers, mainframe computers, and the like.

In some embodiments, the method(s) and/or system(s) discussed throughout are operated in distributed computing environments in which tasks are performed by local and remote processing devices that are linked (such as by hardwired links, wireless links, or by a combination of hardwired or wireless links) through a communications network. In a distributed computing environment, according to some embodiments, program modules are located in both local and remote memory storage devices. Data, in various embodiments, is stored either in repositories and synchronized with a central warehouse optimized for queries and/or for reporting, or stored centrally in a database (e.g., dual-use database) and/or the like.

According to various embodiments, various methods or processes outlined herein are coded and executable on one or more processors that employ any one of a variety of operating systems or platforms. Additionally, such software is written using any of a number of suitable programming languages and/or programming or scripting tools, and, according to some embodiments, compiled as executable machine language code or intermediate code that is executed on a framework or virtual machine. In various embodiments, the computer-executable code includes code from any suitable computer programming or scripting language or is compiled from any suitable computer-programming language, such as, but not limited to, ActionScript, C, C++, C#, Go, HTML, Java, JavaScript, JavaScript Flash, JSON, Objective-C, Perl, PHP, Python, Ruby, Visual Basic, or XML.

In this respect, various inventive concepts are embodied as a computer-readable storage medium (or the multiple computer-readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. The recitation of a module, logic, unit, or circuit configured to perform a function includes discrete electronic and/or programmed microprocessor portions configured to carry out the functions. For example, in various embodiments, different modules or unit that perform functions are embodied as portions of memory and/or a microprocessor programmed to perform the functions.

Additionally, it should be appreciated that according to one aspect, one or more computer programs that, when executed, perform methods of the present invention, need not reside on the single computer or processor, but are distributed in a modular fashion amongst a number of different computers or processors to implement various aspects of the present invention.

In various embodiments, displaying information includes outputting the information from a server 10 to a user device 12. In some of those environments, at least some of the information output to the user device 12 is provided to a user, or related information is provided to the user. In some embodiments, displaying information includes outputting information to a display, such as but not limited to, a monitor, LCD screen, plasma screen, projector, television.

The indefinite articles "a" and "an," as used herein in the specification and the claims, unless indicated to the contrary, should be understood to mean "at least one."

Although the foregoing is described in reference to specific embodiments, it is not intended to be limiting or disclaim subject matter. Rather, the invention as described herein is defined by the following claims, and any that may be added through additional applications or other proceedings. The inventors intend no disclaimer or other limitation of rights by the foregoing technical disclosure.

It will be understood and is appreciated by persons skilled in the art, that one or more processes, sub-processes, or process steps described in connection with the figures may be performed by hardware and/or software (non-transient machine-readable instructions). If the approach is performed by software, the software may reside in software memory in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in an analog form such as analog circuitry or an analog source such an analog electrical, sound or video signal), and may selectively be embodied in any computer-readable medium for use by or in connection with an instruction execution system, apparatus, or devices, such as a computer-based system, processor containing system, or another system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer-readable medium may selectively be, for example, but is not limited to, an electronic, magnetic, optical, electromagnetic, or semiconductor system, apparatus or device. More specific examples, but a non-exhaustive list, of tangible computer-readable media, would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the tangible computer-readable medium may even be paper (punch cards or punch tape) or another suitable medium upon which the instructions may be electronically captured, then compiled, interpreted or otherwise processed in a suitable manner if necessary, and stored in computer memory.

It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A system of updating at least one profile, comprising:
an environment on a communication network for collaboration between at least two users on one or more agreements accessible by a processor; and
a non-transient, computer-readable storage medium that is operatively coupled to the processor, each configured to store information regarding at least one of the agreements in the non-transient, computer-readable storage medium;
the processor further configured to:
receive input data including at least a portion of one or more source agreements, and store the input data into a master profile associated with the portion of the one or more source agreements, the portion of the one or more source agreements including at least a link to initial content for use in at least one collaboration of at least two users to form the at least one agreement, the master profile including at least one profile for the at least one agreement, where the at least one agreement is stored in the master profile in association with at least one profile;
receive input data associated with the at least one or more working profiles, and store the input data, wherein the at least one agreements is by at least two users for the at least one work associated with the at least one working profile; and
access, in the master profile, data associated with at least one agreement that is based on the portion of the source agreement inputted into the master profile, each work including additional information provided by at least one of the at least two users or at least one modification of the source agreement by the at least one of the at least two users, in accordance with the at least one agreement associated with the at least one working profile for the at least one work.

2. The system of updating a profile of claim 1, where one of at least two users belongs to a group.

3. The system of updating a profile of claim 2, where the group has members with predetermined permissions.

4. The system of updating a profile of claim 1, where the at least one agreement is associated with goods, wherein the goods are digital goods.

5. The system of updating a profile of claim 4, where agreement records data associated with the goods.

6. The system of updating a profile of claim 1, where the at least one agreement is associated with first goods and a second agreement is associated with second goods.

7. The system of updating a profile of claim 1, where the at least one agreement is esigned by at least two users.

8. The system of updating a profile of claim 1, where one or more profile copies reside separately from the profile accessible by a remote processor located in the communication network; and an update to the one or more profile copies by the remote processor occurs in response to a change in the profile.

9. The system of updating a profile of claim 8, where the update to the at least one profile is secured.

10. The system of updating a profile of claim 9, where the update to the at least one profile is secured by a digital signature.

11. The system of updating a profile of claim 9, where the update to the at least one working profile indicates that the agreement is closed to further collaboration.

12. The system of updating a profile of claim 11, where closure to further collaboration further includes data security.

13. The system of updating a profile of claim 11, where the update to the profile is secured by at least one digital signature.

14. The system of updating a profile of claim 1, including at least one profile copy being updated by at least one remote processor to match at least one updated profile in response to the remote processor receiving update information regarding the at least one updated profile via the communication network.

15. The system of updating a profile of claim 1, where the profile includes security of the profile.

16. The system of updating a profile of claim 1, where the at least one agreement is a sales agreement of digital goods.

17. A method of updating a profile, comprising:

accessing with a processor an environment on a communication network for collaboration between at least two users on one or more agreements; and receiving input data including at least a portion of at least one source agreement, and storing the input data into a master profile associated with the portion of the at least one source agreement, the portion of the at least one source agreement including initial content for use in at least one collaboration of at least two users to form the at least one agreement, the master profile including at least one profile for the at least one agreement, where the at least one agreement is stored in the master profile in association with the at least one profile;

receiving input data associated with the at least one profile, and storing the input data, wherein the at least one agreement is between at least two users for the at least one agreement associated with the profile, wherein the input data relates to at least one a link to the source of the at least one agreement; and accessing data associated with at least one agreement in the master profile, that is based on the portion of the one or more source agreements inputted into the master profile, the at least one agreement including additional content provided by at least one of the at least two users with at least one modifications of the at least one source agreements by at least one of the at least two users, in accordance with the profile for the at least one agreement.

18. The method for updating a profile of claim 17, where one of at least two users belongs to a group.

19. The method for updating a profile of claim 18, includes setting predetermined permissions for the members of the group.

20. The method for updating a profile of claim 17, where the at least one agreement is associated with goods and signed with esignatures.

21. The method for updating a profile of claim 20, includes associating records for the at least one agreement with the goods.

* * * * *